(12) United States Patent
Cosley et al.

(10) Patent No.: US 12,735,876 B2
(45) Date of Patent: Sep. 15, 2026

(54) FIXTURE OUTLET BOX

(71) Applicant: RELIANCE WORLDWIDE CORPORATION, Atlanta, GA (US)

(72) Inventors: James Cosley, Ramona, CA (US); Virgil O'Neil, San Diego, CA (US); Dennis Hart, Reno, NV (US)

(73) Assignee: Reliance Worldwide Corporation, Atlanta, GA (US)

( * ) Notice: Subject to any disclaimer, the term of this patent is extended or adjusted under 35 U.S.C. 154(b) by 0 days.

(21) Appl. No.: 18/935,438

(22) Filed: Nov. 2, 2024

(65) Prior Publication Data

US 2025/0059736 A1 Feb. 20, 2025

Related U.S. Application Data

(62) Division of application No. 17/730,059, filed on Apr. 26, 2022, now Pat. No. 12,168,861.

(Continued)

(51) Int. Cl.
*F16L 5/00* (2006.01)
*E03B 7/09* (2006.01)

(Continued)

(52) U.S. Cl.
CPC .............. *E03C 1/021* (2013.01); *E03B 7/095* (2013.01); *F16L 3/105* (2013.01); *F16L 3/1211* (2013.01);

(Continued)

(58) Field of Classification Search
CPC ..... F16L 3/137; F16L 5/00; F16L 5/10; E03B 7/095

(Continued)

(56) References Cited

U.S. PATENT DOCUMENTS 1,196,928 A 9/1916 Bylund
2,109,344 A 2/1938 Selger (Continued)

FOREIGN PATENT DOCUMENTS

CA 1321079 C 8/1993
CA 2592623 A1 10/2000

(Continued)

OTHER PUBLICATIONS

Supplementary Partial EP Search Report in EP Application No. 22838427.7, mailed May 20, 2025.

(Continued)

*Primary Examiner* — Kevin F Murphy
(74) *Attorney, Agent, or Firm* — Barnes & Thornburg LLP

(57) ABSTRACT

An outlet box assembly includes a base and a connection assembly. The base defines a base through-hole. The connection assembly is configured to attach to the base through the base through-hole and includes a connector and an adapter. The connector includes a connector body. The connector body includes an inner surface that defines a passage with one or more internal threads positioned along the inner surface. The adapter includes one or more external threads configured to engage with the one or internal threads of the connector body. The adapter defines a longitudinally-extending adapter through-hole configured to receive one of a fitting or a tubing. The adapter further defines at least one longitudinal slot configured to allow the adapter to radially compress when the adapter is attached to the connector.

16 Claims, 44 Drawing Sheets

Related U.S. Application Data

(60) Provisional application No. 63/180,987, filed on Apr. 28, 2021.

(51) Int. Cl.
*E03C 1/02* (2006.01)
*F16L 3/10* (2006.01)
*F16L 3/12* (2006.01)
*F16L 3/137* (2006.01)

(52) U.S. Cl.
CPC ................ *F16L 3/137* (2013.01); *F16L 5/00* (2013.01); *E03C 2201/60* (2013.01)

(58) Field of Classification Search
USPC ...................................... 248/74.1, 74.2, 74.3
See application file for complete search history.

(56) References Cited

U.S. PATENT DOCUMENTS 2,331,020 A 10/1943 Frances
2,628,799 A 2/1953 Aaby
3,494,373 A 2/1970 Horak et al.
3,495,276 A 2/1970 Suess
3,862,433 A 1/1975 Rousselet
4,008,824 A 2/1977 Renoux
4,158,471 A 6/1979 Logsdon
4,564,249 A 1/1986 Logsdon
4,716,925 A 1/1988 Prather
4,865,072 A 9/1989 Logsdon
4,934,410 A 6/1990 Humber
5,155,957 A 10/1992 Robertson et al.
5,261,444 A 11/1993 Childers
5,305,785 A 4/1994 Humber
5,931,200 A 8/1999 Mulvey et al.
5,983,923 A 11/1999 Hobbs et al.
6,125,881 A 10/2000 Hobbs et al.
6,129,109 A 10/2000 Humber
6,148,850 A 11/2000 Kopp et al.
6,155,286 A 12/2000 Geary
6,234,193 B1 5/2001 Hobbs et al.
D474,483 S 5/2003 Humber et al.
6,629,676 B1 10/2003 Gretz
6,695,001 B2 2/2004 Dicosola
7,077,156 B1 7/2006 Humber et al.
7,193,152 B2 3/2007 Moselle
7,193,153 B2 3/2007 Hemingway et al.
7,208,677 B2 4/2007 Moselle
7,270,144 B2 9/2007 Minnick
7,348,484 B1 3/2008 Ackerman et al.
7,357,148 B1 4/2008 Gibson
7,360,553 B1 4/2008 Ismert
D570,292 S 6/2008 Schulz et al.
7,614,419 B2 11/2009 Minnick
7,735,511 B1 6/2010 Ismert
7,812,253 B2 10/2010 Moselle
7,854,337 B1 12/2010 Ismert et al.
D635,098 S 3/2011 Ismert
8,020,581 B1 9/2011 Julian et al.
8,061,390 B2 11/2011 Condon et al.
8,141,831 B2 3/2012 Julian et al.
8,356,778 B2 * 1/2013 Birli ........................ F16L 3/237
248/65
8,434,587 B2 5/2013 Era et al.
8,648,256 B1 2/2014 Rose
D721,041 S 1/2015 Badowski
9,022,326 B2 5/2015 Brown et al.
9,057,460 B2 6/2015 Ismert et al.
D749,521 S 2/2016 Badowski
9,258,919 B1 2/2016 Rose
9,290,917 B2 3/2016 Condon et al.
9,388,555 B2 7/2016 Whitehead et al.
9,394,674 B2 7/2016 Whitehead et al.
9,518,381 B2 12/2016 Whitehead et al.
9,528,636 B2 * 12/2016 Beele ........................ F16L 5/10
9,534,709 B2 1/2017 Wilson et al.
9,627,871 B2 4/2017 Bowman et al.
9,650,765 B2 5/2017 Whitehead et al.
9,650,766 B2 5/2017 Whitehead et al.
9,656,622 B2 * 5/2017 Lee ........................ F16L 3/137
9,725,892 B2 8/2017 Ismert et al.
9,806,509 B1 10/2017 Heinis et al.
9,954,348 B2 4/2018 Rose
10,060,102 B2 8/2018 Zahuranec et al.
10,190,706 B2 1/2019 Mentink
10,236,668 B2 3/2019 Stahl et al.
10,348,075 B2 7/2019 Rose
10,683,645 B2 6/2020 Brown et al.
10,777,932 B2 9/2020 Mechteridis et al.
10,865,550 B1 12/2020 Sampson
10,975,983 B2 4/2021 Zhang et al.
11,473,276 B2 10/2022 Ismert
2004/0112433 A1 6/2004 Dicosola
2005/0229304 A1 10/2005 Doverspike
2008/0190505 A1 8/2008 Condon et al.
2008/0265571 A1 10/2008 Gallardo et al.
2010/0000614 A1 1/2010 Zahuranec et al.
2011/0210222 A1 9/2011 van Walraven
2012/0061529 A1 3/2012 Hill
2014/0263867 A1 9/2014 Brown et al.
2014/0352798 A1 12/2014 Clarke et al.
2015/0225931 A1 8/2015 Zahuranec et al.
2015/0259891 A1 9/2015 Ismert et al.
2018/0283576 A1 * 10/2018 Zhang ..................... F16K 27/00
2019/0360181 A1 11/2019 O'Neill et al.
2023/0011516 A1 1/2023 Cosley et al.
2023/0212840 A1 7/2023 Cosley

FOREIGN PATENT DOCUMENTS

CA 2770019 A1 3/2013
CA 2914207 C 12/2014
CA 2877399 C 1/2015
CA 2892865 A1 5/2015
DE 102008061269 A1 6/2009
DE 102017123765 A1 4/2019
JP H09228633 A 9/1997
KR 20180094649 A 8/2018
WO 2014197621 A1 12/2014
WO 2018064609 A1 4/2018

OTHER PUBLICATIONS

Supplementary EP Search Report in EP Application No. 22796567.0, mailed Feb. 17, 2025.
IPS Corporation; Right Hand Wide Mouth Outlet Boxes; May 2018; available at ipsplumbingproducts.com.
Oatey; 2020 Product Catalog; 2×4 Washing Machine Outlet Boxes; Jun. 2020; available at fliphtml5.com.
Oatey; 2020 Product Catalog; Eliminator Washing Machine Outlet Boxes; Jun. 2020; available at fliphtml5.com.
Sioux Chief; Ox Box Outlet Box System Brochure; Nov. 11, 2020; available at www.siouxchief.co.
Ex Parte Quayle Action; U.S. Appl. No. 17/811,231; Apr. 15, 2024.
Office Action; U.S. Appl. No. 17/730,059; Mar. 11, 2024.
Office Action; U.S. Appl. No. 17/811,231; Dec. 5, 2023.
Office Action; U.S. Appl. No. 17/811,231; Jan. 29, 2024.
Office Action; U.S. Appl. No. 18/183,744; Jun. 28, 2024.
International Preliminary Report on Patentability; International Patent Application No. PCT/US2022/026378; Oct. 24, 2023.
International Preliminary Report on Patentability; International Patent Application No. PCT/US2022/036405; Dec. 14, 2023.
International Search Report and Written Opinion; International Patent Application No. PCT/US2022/026378; Aug. 10, 2022.
International Search Report and Written Opinion; International Patent Application No. PCT/US2022/036405; Oct. 25, 2022.
International Search Report and Written Opinion; International Patent Application No. PCT/US2024/019693; Jul. 15, 2024.

* cited by examiner 140, 148
80
82
20
11
26
49
98

46, 48
30
43
35
82

32
46, 47
45

11

140, 148
80
83
82
173, 175
45
35
36
11
42a
20
64
31
39
51
90
70
72
33
44
43
30
32
52
53
71
84
81
50
49
175, 174
41
42
26
98
38

20
32
31
35
46, 48
140, 148
142
37
38
33
41
30
42
44
43
46, 47

42a
39

43
35
33
32
30
20
16b
16a
16

16b
32
43
35
30
16
20

43
31
33
30
16b
16a
16
20

20
30
43
35
32
33
16a
16b
16

43
32
35
36b
30
36
36a
20

30
16a
16b
16
35
32
31
43
20

36
16b
36b
16
36a
32
31
16a
30
20
43

16
16b
16a

17

12
375
372
370
376
49
33
44
45
43
35
35
30
32
31
42
41
50
70
26
11
42a
220
98

12
26
25B
25B
98
220
11

142
140, 447
445
46, 48
142
80
30
32
11
46, 47
420

142
140, 447
445
80
420
25
490
98
11

142
140, 447
142
140, 447
445
46, 48
420
80
30
32
11
6, 47

16
16b
15a 30
31
35
36
24
420
16b
16a
16

60
36
30
31
35
420
24

420
15
16
16a
16b
24
30

FIXTURE OUTLET BOX

CROSS-REFERENCE TO RELATED APPLICATION(S)

This application is a divisional of U.S. patent application Ser. No. 17/730,059, filed Apr. 26, 2022, now issued U.S. Pat. No. 12,168,861, which claims the benefit of U.S. Provisional Patent Application No. 63/180,987, filed Apr. 28, 2021.

INCORPORATION BY REFERENCE

U.S. patent application Ser. No. 17/730,059, filed Apr. 26, 2022, now issued U.S. Pat. No. 12,168,861, and U.S. Provisional Patent Application No. 63/180,987, filed Apr. 28, 2021, are hereby incorporated by reference as if set forth in their entireties.

FIELD

The present application relates generally to plumbing, and in particular, outlet boxes, such as fixture outlet boxes. Other aspects also are described.

BACKGROUND

Fixture outlet boxes are used in the plumbing industry for the installation of plumbing valves. For example, outlet boxes are used when installing piping systems for various plumbing fixtures, such as sinks, toilets, and water heaters. Fixture outlet boxes may often be used instead of traditional methods such roughing-in, utilizing a stub out. To hold the piping system, a bracket is positioned between studs, and the stub-out of the pipe extends out beyond the studs. A hole is drilled in the wall (e.g., sheet rock), and the wall is installed over the stub-out such that the pipe extends through the wall. Typically, the pipe is pre-formed with a bullet end along the stub-out for pressure testing. After pressure testing, the installer cuts the bullet end of the stub-out and installs a stop valve onto the stub-out.

SUMMARY

Various implementations provide for an outlet box assembly that includes a base and a connection assembly. The base defines a base through-hole. The connection assembly is configured to attach to the base through the base through-hole and includes a connector and an adapter. The connector includes a connector body. The connector body includes an inner surface that defines a passage with one or more internal threads positioned along the inner surface. The adapter includes one or more external threads configured to engage with the one or internal threads of the connector body. The adapter defines a longitudinally-extending adapter through-hole configured to receive one of a fitting or a tubing. The adapter further defines at least one longitudinal slot configured to allow the adapter to radially compress when the adapter is attached to the connector.

Various other implementations provide for an outlet box assembly that includes a base and an elastomeric insert. The base defines a base through-hole. The elastomeric insert is configured to be at least partially positioned within the base through-hole. The elastomeric insert defines an insert through-hole that is sized to receive a portion of one of a tubing or a fitting to secure the one of the tubing or the fitting to the base and comprises a plurality of longitudinally-extending ribs that extend along the length of the insert through-hole. The elastomeric insert is configured to absorb vibrations and provide acoustic isolation to and from the one of the tubing or the fitting.

Various other implementations provide for a method of assembling an outlet box. The method includes inserting an adapter into a base through-hole of a base, engaging one or internal threads of a connector body of a connector with one or more external threads of the adapter, and radially compressing the adapter along at least one longitudinal slot with the connector. The adapter includes the one or more external threads and defines a longitudinally-extending adapter through-hole configured to receive one of a fitting or a tubing. The adapter further defines the at least one longitudinal slot. The connector body includes an inner surface that defines a passage with the one or more internal threads positioned along the inner surface.

Various other implementations provide for an outlet box assembly that includes a base that defines a base through-hole and a turn-out support configured to attach to the base through the base through-hole. The turn-out support defines a turn-out support passage configured to align with the base through-hole and to receive a tubing.

These and other features together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 35B is a back, perspective view the portion of the outlet box assembly of FIG. 35A.

DETAILED DESCRIPTION

Referring to the figures generally, various implementations disclosed herein relate to various embodiments of a fixture outlet box assembly. The fixture outlet box assemblies disclosed herein improve the ease and quality of installation of various plumbing features, such as the installation of a plumbing valve or a stop valve to plumbing fixtures, and reduce the installation time for end users.

With the outlet box assemblies, the stub-out can be installed during rough-in plumbing that already includes a pretested supply stop or a stop valve to ensure that the piping system does not have any leaks, rather than cutting the pipe after installation and subsequently attaching the stop valve.

Outlet Box Assembly with Fitting

Figure 39B:
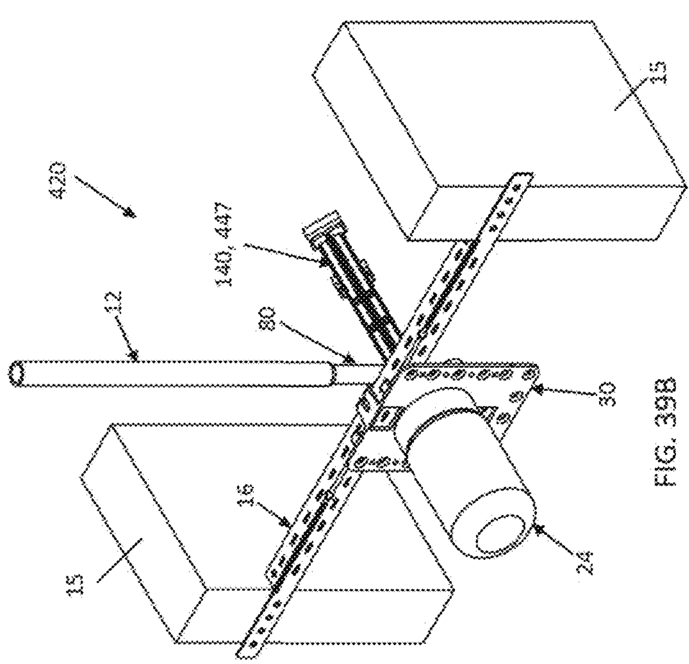
FIGS. 39A-39B are perspective views of the tubing being attached to the outlet box assembly of FIG. 29A.
Figure 39A:
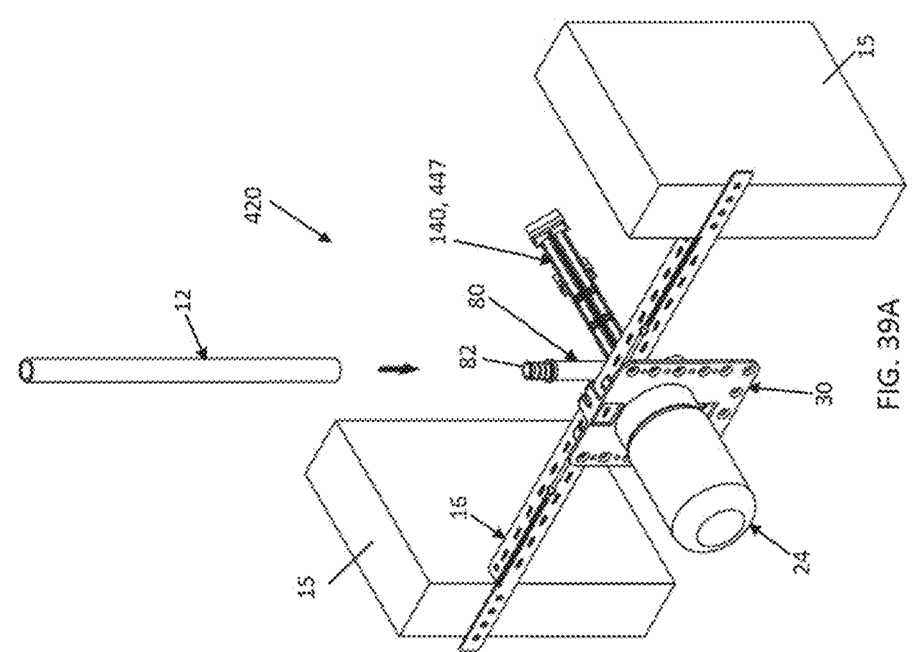

FIGS. 1A-11E show an outlet box assembly 20 according to one embodiment, which provides a system for directly or indirectly mounting tubing 12 to an outlet valve (e.g., stop valve 98) through a wall 11. The outlet box assembly 20 is configured to support and attach to a tubing 12 (as shown in FIGS. 39A-39B) to allow fluid to flow from the tubing 12 to the stop valve 98 and beyond (or in the opposite direction). The outlet box assembly 20 includes all of the various features, aspects, and components of the outlet box assemblies 120, 220, 320, and 420 (as described further herein), unless noted otherwise in the description herein.

As described further herein, the outlet box assembly 20 includes a base 30, a protective cover 24, an escutcheon 26, at least one (optional) support structure 140, and a connection assembly 49. Optionally, the outlet box assembly 20 may include the tubing 12 and the stop valve 98 (which may optionally be an EvoPEX stop valve or another stop valve with a push to connect or other connection mechanism). FIGS. 1A-1C and 3A show the outlet box assembly 20 completely assembled and attached to a wall 11 (which refers to a front wall, through which the outlet box assembly 20 extends). In particular, the outlet box assembly 20 is attached to and extends completely through a hole in the wall 11.

The plumbing tube, pipe, or tubing 12 may be a variety of different types of tubing, pipes, plumbing, or tubes. Although the tubing 12 can be any length and size, the tubing 12 may be ½ inches in diameter and a PEX pipe, according to various embodiments. As described further herein, the tubing 12 may be a curved tubing 112 or a straight tubing 212 (that is, for example, 3 inches long).

The plumbing walls 11 and 13 may be, for example, drywall and may each include a single piece of drywall (that is approximately ½ inches thick or approximately ⅝ inches thick) or two pieces of drywall that are approximately ½ inches thick and approximately ⅝ inches thick, both approximately ½ inches thick, or both approximately ⅝ inches thick). Although the walls 11 and 13 are referred to herein, the various outlet box assemblies may be attached to a variety of other types of structures, including but not limited to a floor, ceiling, etc. The wall 11 includes a through-hole that the outlet box assembly 20 extends through to allow fluid to flow through the plumbing extending through the wall 11. Accordingly, the outlet box assembly 20 is mounted or secured to and extends through the front wall 11. The back wall 13 extends substantially parallel to the front wall 11 and is directly across from the wall 11 (to which the outlet box assembly 20 is mounted) such that a portion of the outlet box assembly 20 (along the second base side 32) is positioned between the walls 11 and 13.

Figures 1A, 1B, 1C:
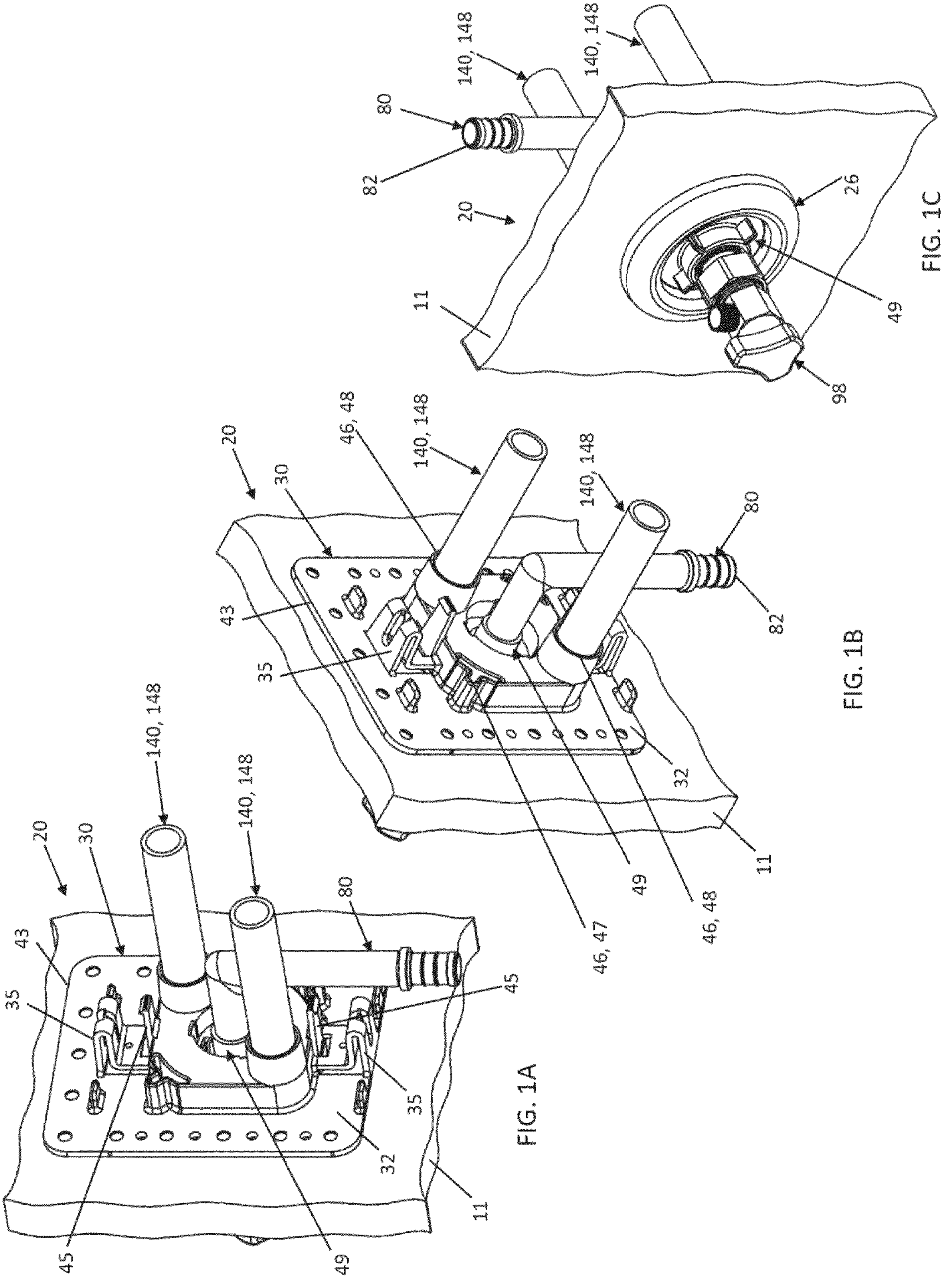
FIG. 1A is a back, perspective view of an outlet box assembly according to one embodiment.
FIG. 1B is a back, top perspective view of the outlet box assembly of FIG. 1A.
FIG. 1C is a front, top perspective view of the outlet box assembly of FIG. 1A.
Figure 2:
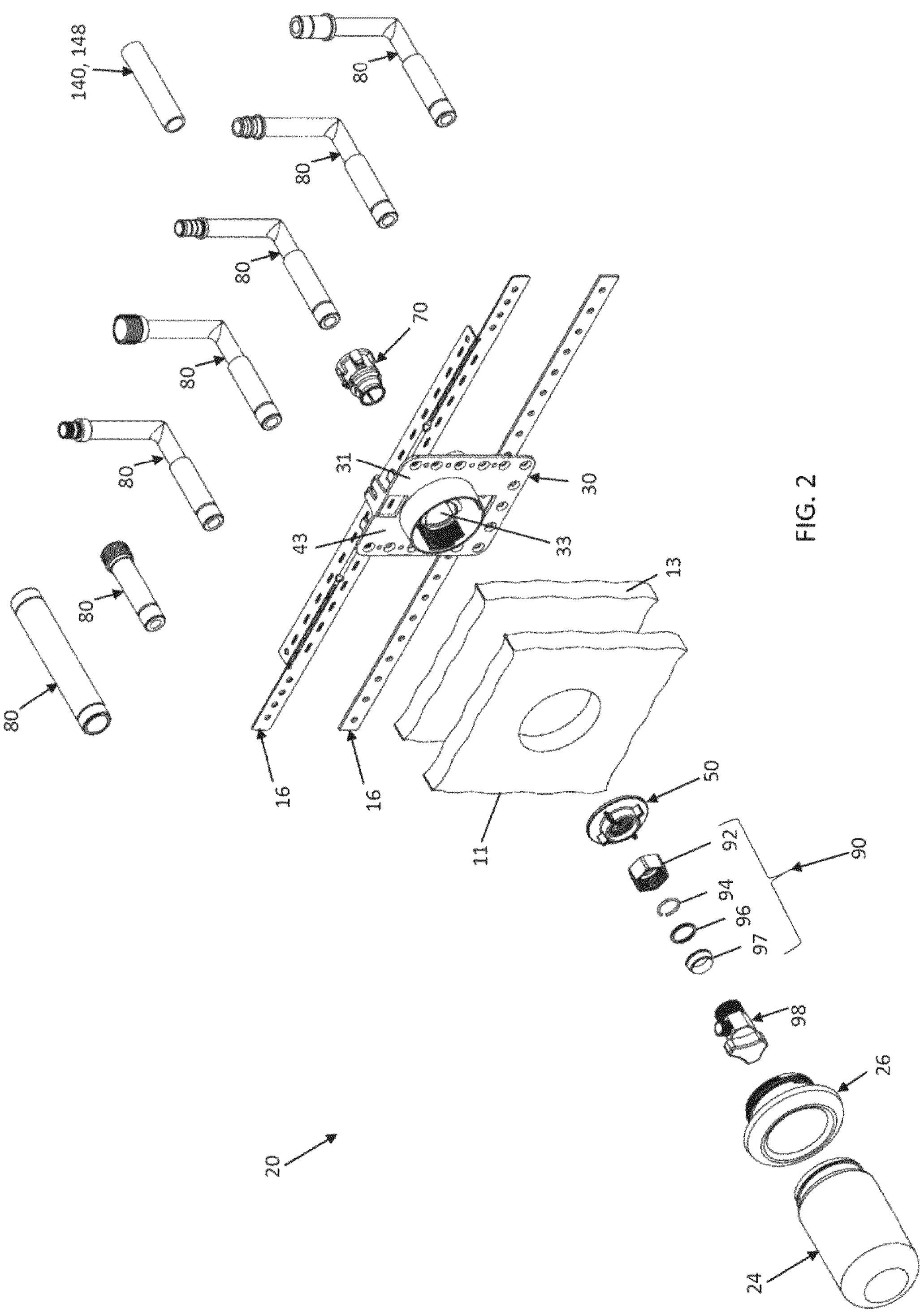
FIG. 2 is an exploded view of the outlet box assembly of FIG. 1A.

As shown in FIG. 2, the outlet box assembly 20 may include a variety of different fittings 80, depending on the desired configuration and application. For example, the fitting 80 may be a straight fitting or a bent (elbow) fitting. Furthermore, the fitting 80 may be a chlorinated polyvinyl chloride (CPVC) tube or a push-to-connect fitting.

To prevent fires from spreading throughout buildings, the various components of the outlet box assembly 20 may be constructed out a fire-resistant material.

Base

The base 30 is a support structure that is configured to attach the rest of the outlet box assembly 20 to the wall 11 and provides various areas for various components of the outlet box assembly 20 to attach to, as described further herein. The base 30 is constructed as a single-piece, in particular as a single, unitary, integral component that cannot be separated without destruction.

As shown in FIGS. 3B-4B, the base 30 includes a first base side 31 and a second base side 32. When attached to the wall 11, the first base side 31 is closer to and faces the wall 11 (and a portion of the first base side 31 may be extend through a through-hole in the wall 11), and the second base side 32 is further from and faces away from the wall 11.

Figures 3A, 3B:
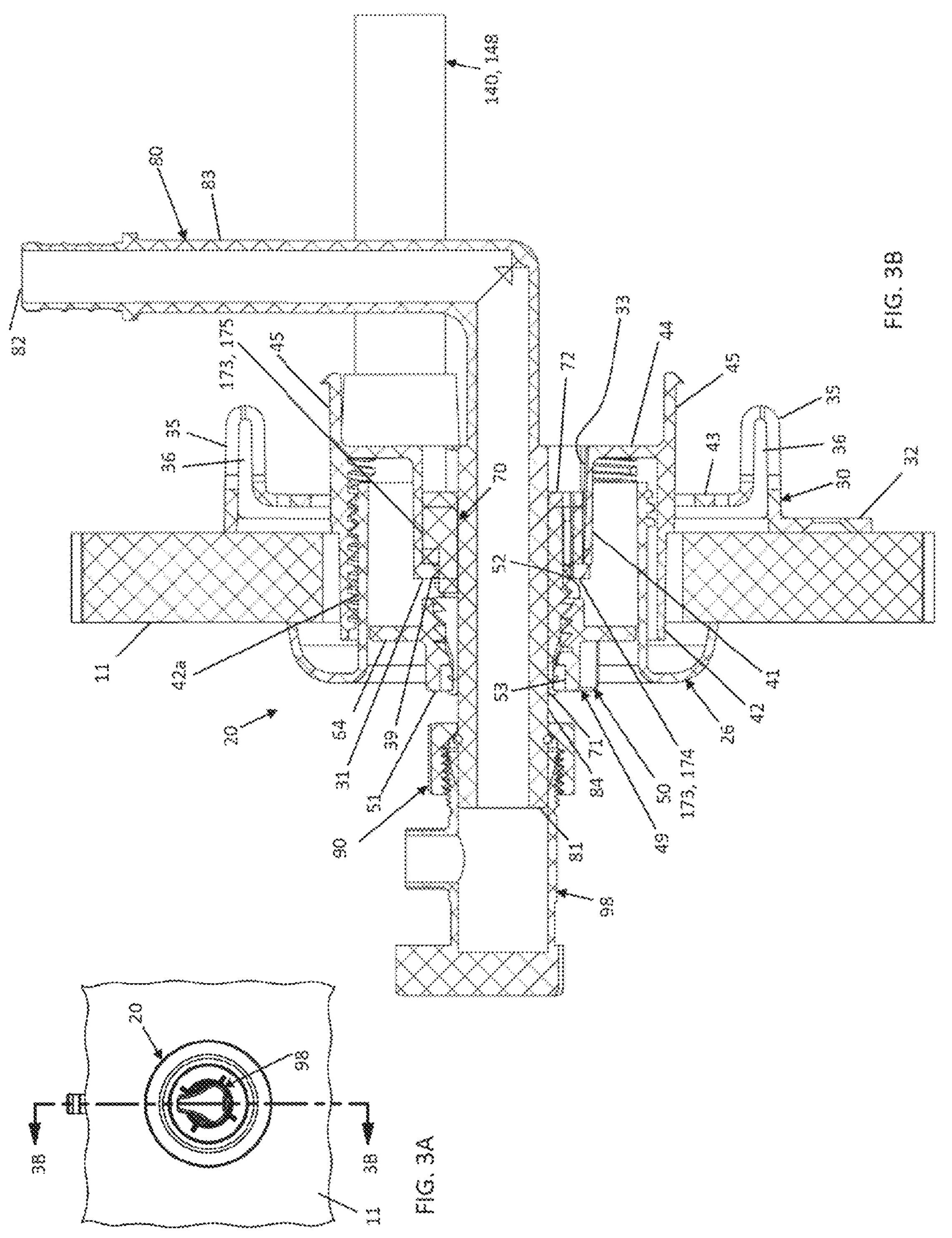
FIG. 3A is a front view of the outlet box assembly of FIG. 1A.
FIG. 3B is a cross-sectional view through Section 3B-3B of FIG. 3A.

FIGS. 3B-4B further indicate that the base 30 includes an outer base portion or wall 43, a first circumferential wall 41, a second circumferential wall 42, and a connecting wall 44. The base wall 43 extends substantially parallel to the wall 11 (as shown in FIG. 3B) and substantially perpendicular to the first circumferential wall 41 and the second circumferential wall 42 (and surrounds the walls 41 and 42). The base wall 43 may optionally be fastened to the inner surface of the wall 11 (i.e., the surface facing the back wall 13), to studs (e.g., wood or metal studs), and/or to the brackets 16 via at least one fastener extending through the base wall 43 and into the wall 11, studs, or brackets 16.

The first circumferential wall 41 and the second circumferential wall 42 extend substantially parallel to each other and are radially spaced apart from each other. In particular, the first circumferential wall 41 is positioned within and is radially surrounded by the second circumferential wall 42. The outer surface of the second circumferential wall 42 faces, and optionally directly abuts, the through-hole extending through the wall 11.

Figures 4A, 4B:
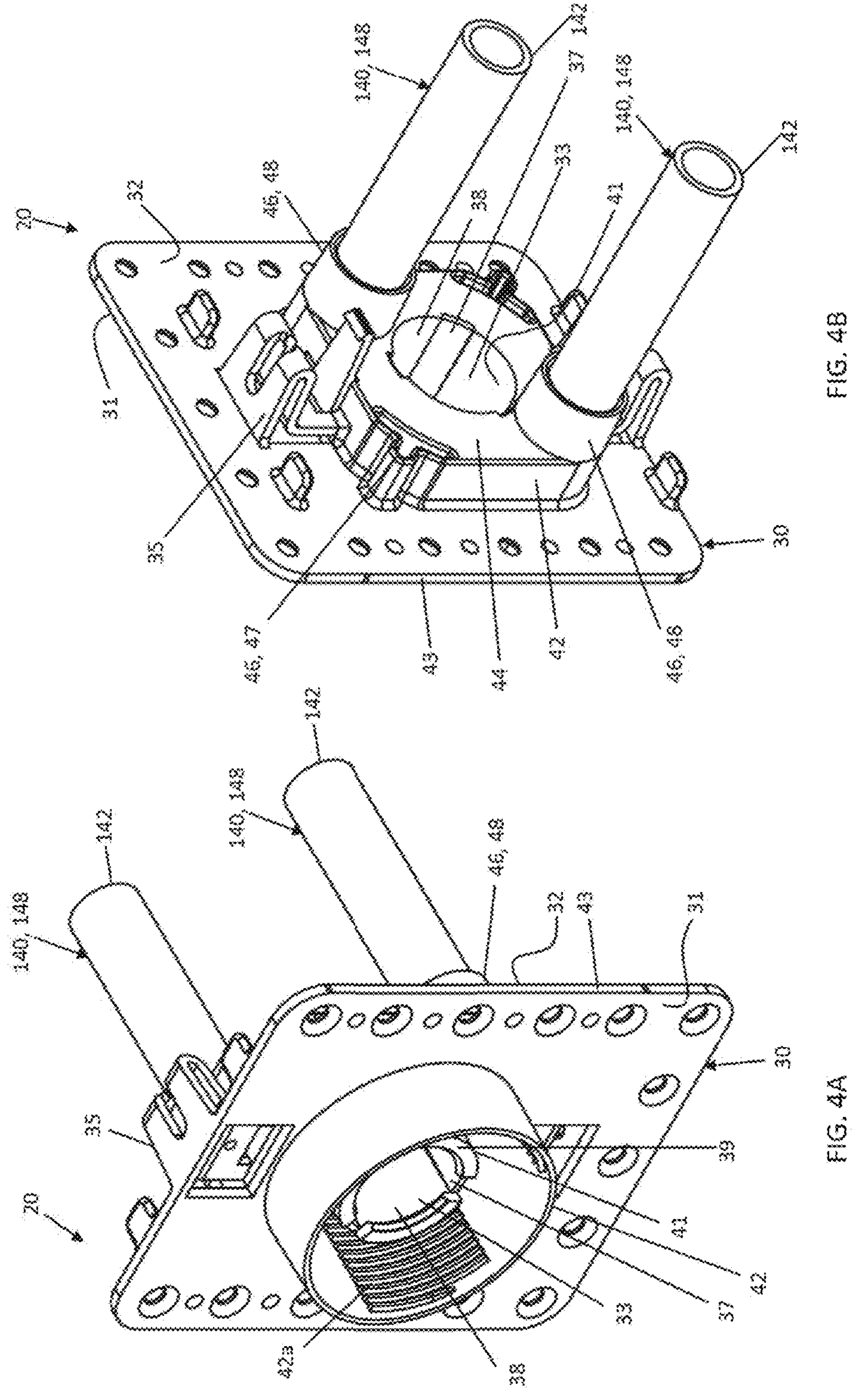
FIG. 4A is a front, top perspective view of a portion of the outlet box assembly of FIG. 1A.
FIG. 4B is a back, top perspective view of a portion of the outlet box assembly of FIG. 1A.

On the first base side 31 as shown in FIG. 4A, the base 30 includes a radial gap defined between the first circumferential wall 41 and the second circumferential wall 42 (that may be configured to receive various components, as described further herein). The second circumferential wall 42 extends in a circular manner along the first base side 31 and extends in a substantially square shape (with at least one substantially straight wall) along the second base side 32. On the second base side 32 as shown in FIG. 4B, the connecting wall 44 extends radially between and connects the outer surface of the first circumferential wall 41 and the inner surface of the second circumferential wall 42. The connecting wall 44 extends substantially parallel to the base wall 43.

Figures 5A, 5B, 5C:
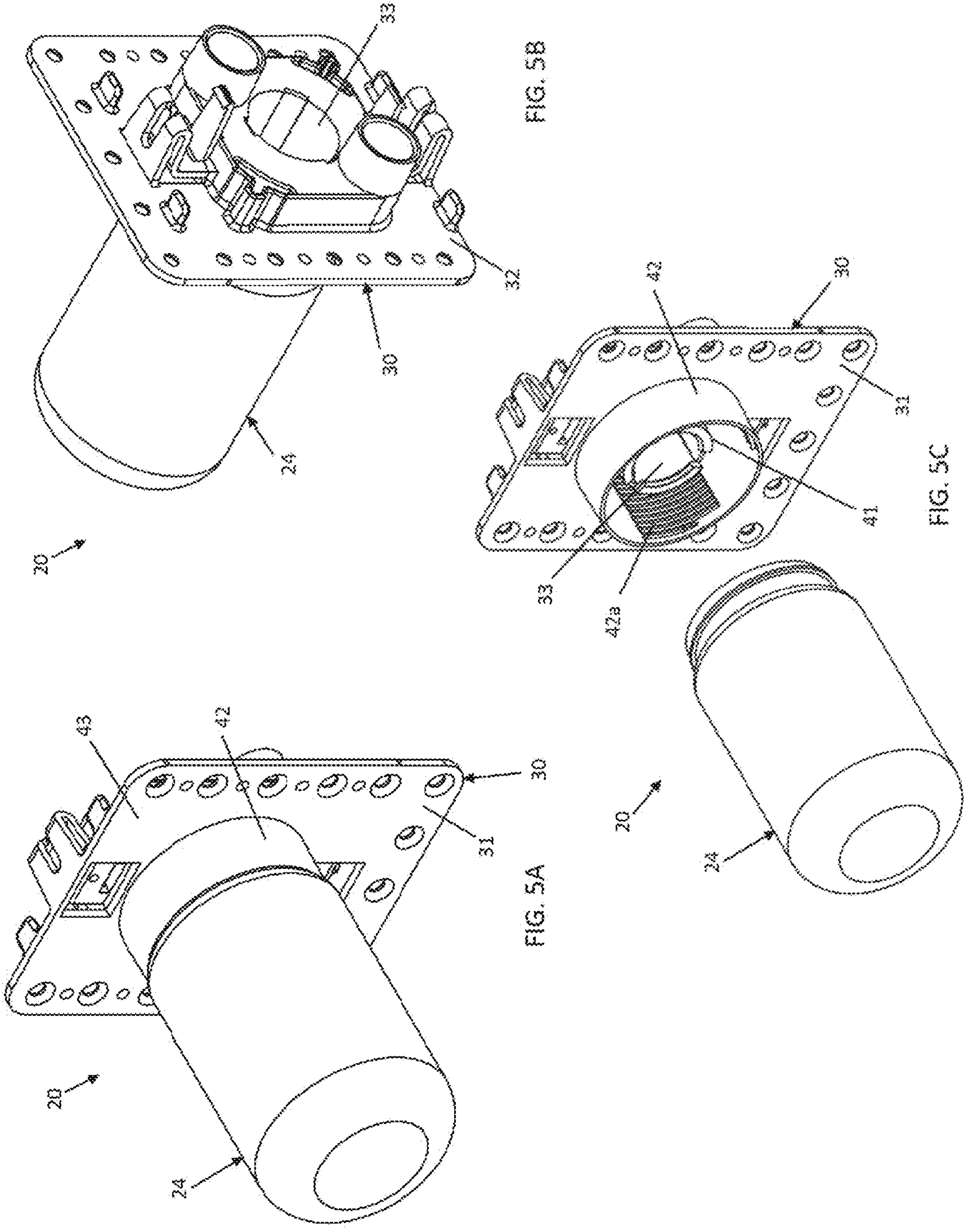
FIG. 5A is a front, top perspective view of a portion of the outlet box assembly of FIG. 1A with the protective cover attached.
FIG. 5B is a back, top perspective view of a portion of the outlet box assembly of FIG. 1A with the protective cover attached.
FIG. 5C is an exploded view of a portion of the outlet box assembly of FIG. 1A with the protective cover.

As also shown in FIG. 4A, an inner surface of the second circumferential wall 42 of the base 30 defines an internal, front cavity and includes at least one inner thread (preferably a plurality of threads), referred to herein as base threads 42*a*. The internal base threads 42*a* are positioned along the first base side 31 and within the front cavity and are configured to attach or mount to a various other components, such as at least one of the protective cover 24 or the escutcheon 26. Accordingly, the base 30 is configured to receive and interchangeably, removably, reattachably, and threadably attach to (via the base threads 42*a*) either the protective cover 24 (as shown in FIG. 5A-5B) or the escutcheon 26 (as shown in FIG. 3B), depending on the stage of assembly to the base 30. Accordingly, the protective cover 24 or the escutcheon 26 is positionable within the radial gap between the first circumferential wall 41 and the second circumferential wall 42 along the first base side 31.

According to one embodiment and as described further herein (and shown in FIGS. 36A-40B), during the initial stages of assembly of the outlet box assembly 20 the wall 11, the protective cover 24 is configured to be threadably attached to the base 30 via the base threads 42*a*. This attachment is further shown in FIGS. 5A-5C. The protective cover 24 is a structural cylindrical cover that is configured to extend around, cover, and protect the stop valve 98 and the fitting 80 (or the tubing 12) (from, for example, overspray). A first end of the protective cover 24 is open (to receive the stop valve 98, a portion of the fitting 80 (or the tubing 12), and/or another member attached to the stop valve 98) and includes external threads to attach to the base threads 42*a*. A second end of the protective cover 24 (that is opposite the first end along the longitudinal length of the protective cover 24) is closed off to completely cover the stop valve 98. When attached to the base 30, the protective cover 24 (in particular the first end) is partially positioned within the radial gap between the first circumferential wall 41 and the second circumferential wall 42 and extends from the first base side 31 (in a direction away from the second base side 32). The first circumferential wall 41 may extend at least partially into the protective cover 24.

Figure 41:
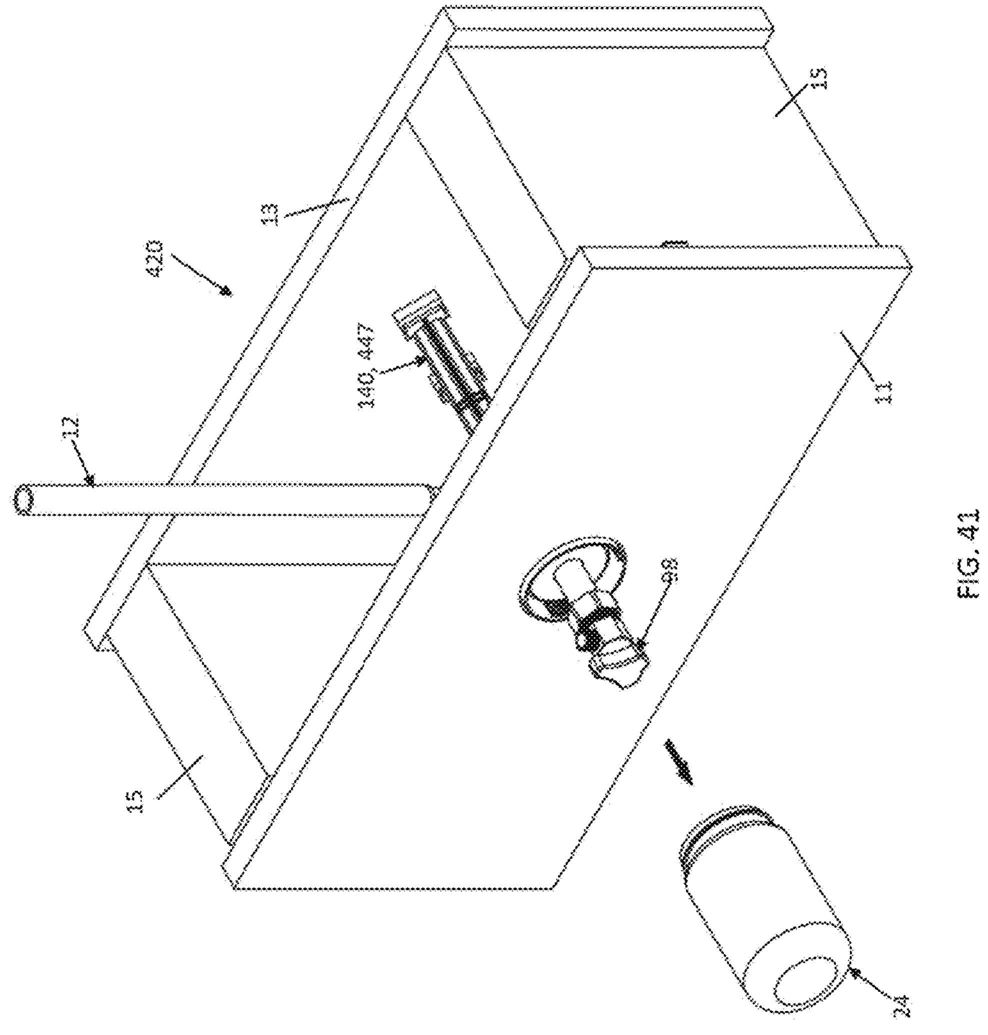
FIG. 41 is a perspective view of the protective cover being removed from the outlet box assembly of FIG. 29A.
Figures 42A, 42B:
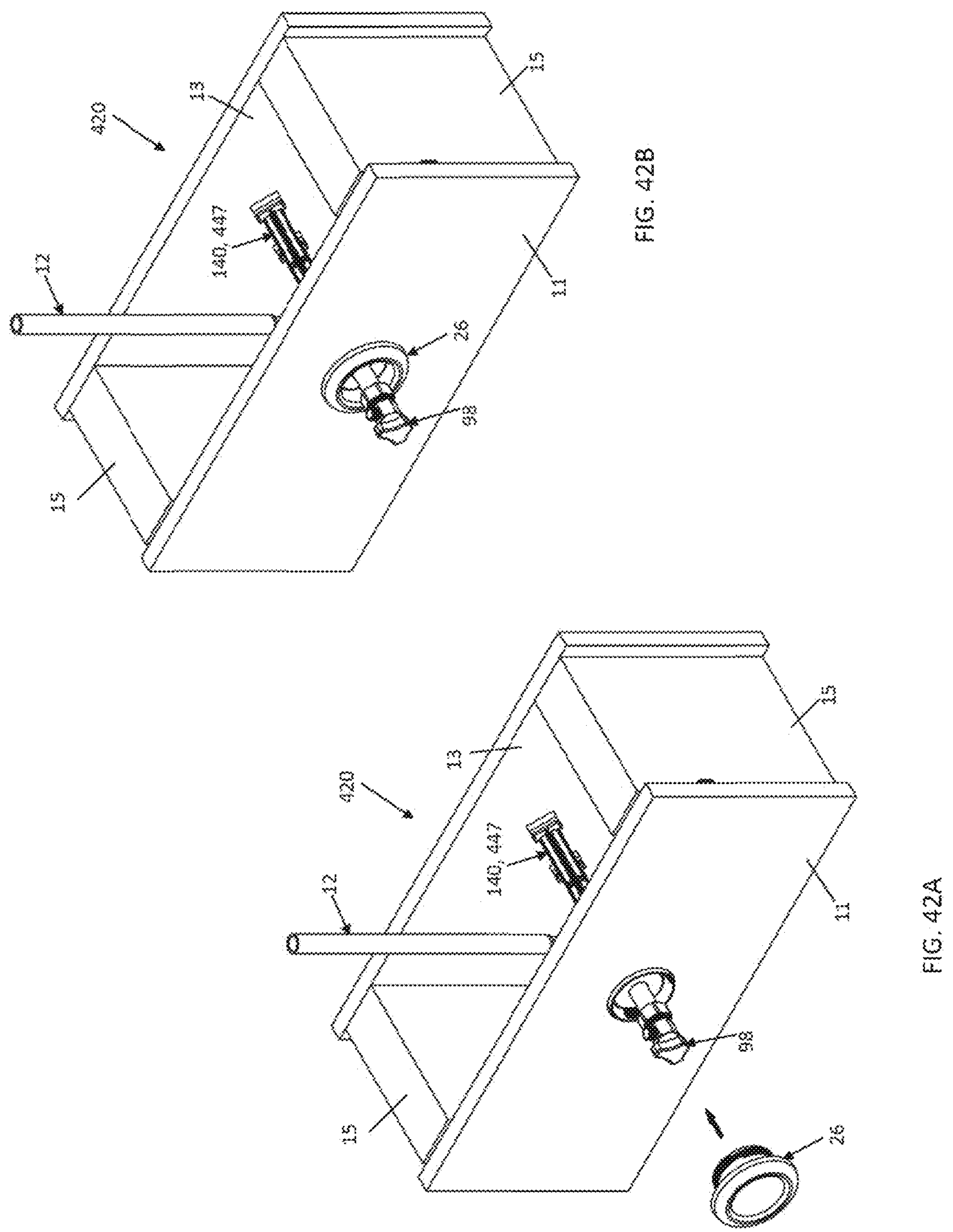
FIGS. 42A-42B are perspective views of the escutcheon being attached to the outlet box assembly of FIG. 29A.

Once the outlet box assembly 20 is ready to be used or tested, the protective cover 24 is removed from the base 30 and replaced with the escutcheon 26 (as shown in FIGS. 41-42B). The escutcheon 26 is an outermost cover that both provides decoration and structural protection to the rest of the outlet box assembly 20, while allowing the stop valve 98 to be exposed and accessible. The escutcheon 26 is also configured to threadably attach to the base 30 via the base threads 42*a*. The escutcheon 26 defines a through-hole that extends completely through the escutcheon 26 to allow access to the stop valve 98. As shown in FIG. 3B, a first end portion of the escutcheon 26 is positioned radially between the first circumferential wall 41 and the second circumferential wall 42, and the first circumferential wall 41 extends at least partially into the escutcheon 26. The outer surface of the escutcheon 26 includes external threads to attach to the base threads 42*a*. A second end portion of the escutcheon 26 (that is opposite the first end portion along the longitudinal length of the escutcheon 26) extends around and covers an end of the second circumferential wall 42. When attached to the base 30, the escutcheon 26 (in particular the first end portion) is partially positioned within the radial gap between the first circumferential wall 41 and the second circumferential wall 42 and extends from the first base side 31 (in a direction away from the second base side 32).

The inner surface of the first circumferential wall 41 of the base 30 defines a base through-hole 33. As shown in FIGS. 3B-4B, the base through-hole 33 extends between the first base side 31 and the second base side 32 of the base 30. The base through-hole 33 extends through the base 30 (optionally completely through) to allow various other components (such as the fitting 80, the tubing 12, or the turn-out support 370 according to various different embodiments) to extend through (optionally completely through) and within the base 30.

As shown in FIGS. 4A-4B, the base 30 includes at least one longitudinally-extending slot, notch, or groove 37 that is positioned along the inner surface of the first circumferential wall 41 (that defines the base through-hole 33) and extends from the second base side 32. According to one embodiment, the base 30 includes a plurality of grooves 37 that are tangentially spaced apart from each other and at different tangential positions about the inner circumference of the base 30. The grooves 37 extend longitudinally the length of the base through-hole 33, in particular between the first base side 31 and the second base side 32.

The plurality of grooves 37 define at least one elevated portion 38 (or a plurality of elevated portions 38) that are each positioned between two grooves 37 along the inner surface of the first circumferential wall 41 and about the inner circumference of the base 30 along the base through-hole 33. The elevated portions 38 extend radially inwardly further than the grooves 37 such that the base through-hole 33 and the first circumferential wall 41 have a smaller inner diameter along the elevated portions 38 than the grooves 37. As described further herein, the grooves 37 and the elevated portions 38 of the base 30 are configured to align with and attach to the protrusions 173 (in particular the snap protrusions 174) and the notches 176 of the adapter 70.

As shown in FIG. 4A, the end of the first circumferential wall 41 (that corresponds with the first base side 31) may optionally have a stop wall 39 (or a plurality of stop walls 39) radially aligned with the elevated portions 38 that has a smaller inner diameter than the rest of the base through-hole 33 and the first circumferential wall 41. The stop wall 39 is configured to abut with a portion of the adapter 70 (such as end portions of the stationary protrusions 175 to prevent the adapter 70 from moving axially any further along the length of the base through-hole 33, in a direction from the second base side 32 to the first base side 31.

Figure 4C:
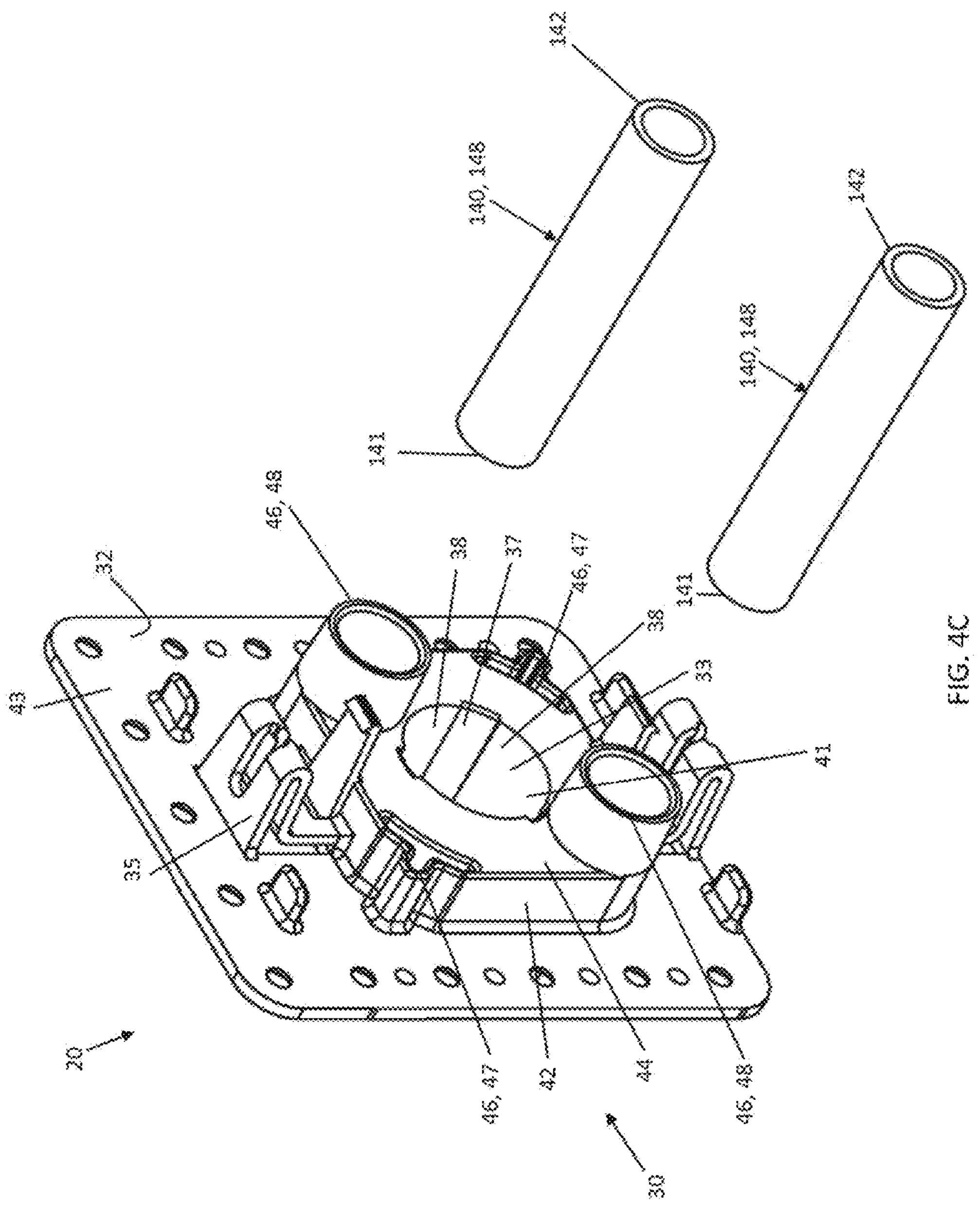
FIG. 4C is an exploded view of a portion of the outlet box assembly of FIG. 1A.
Figure 32:
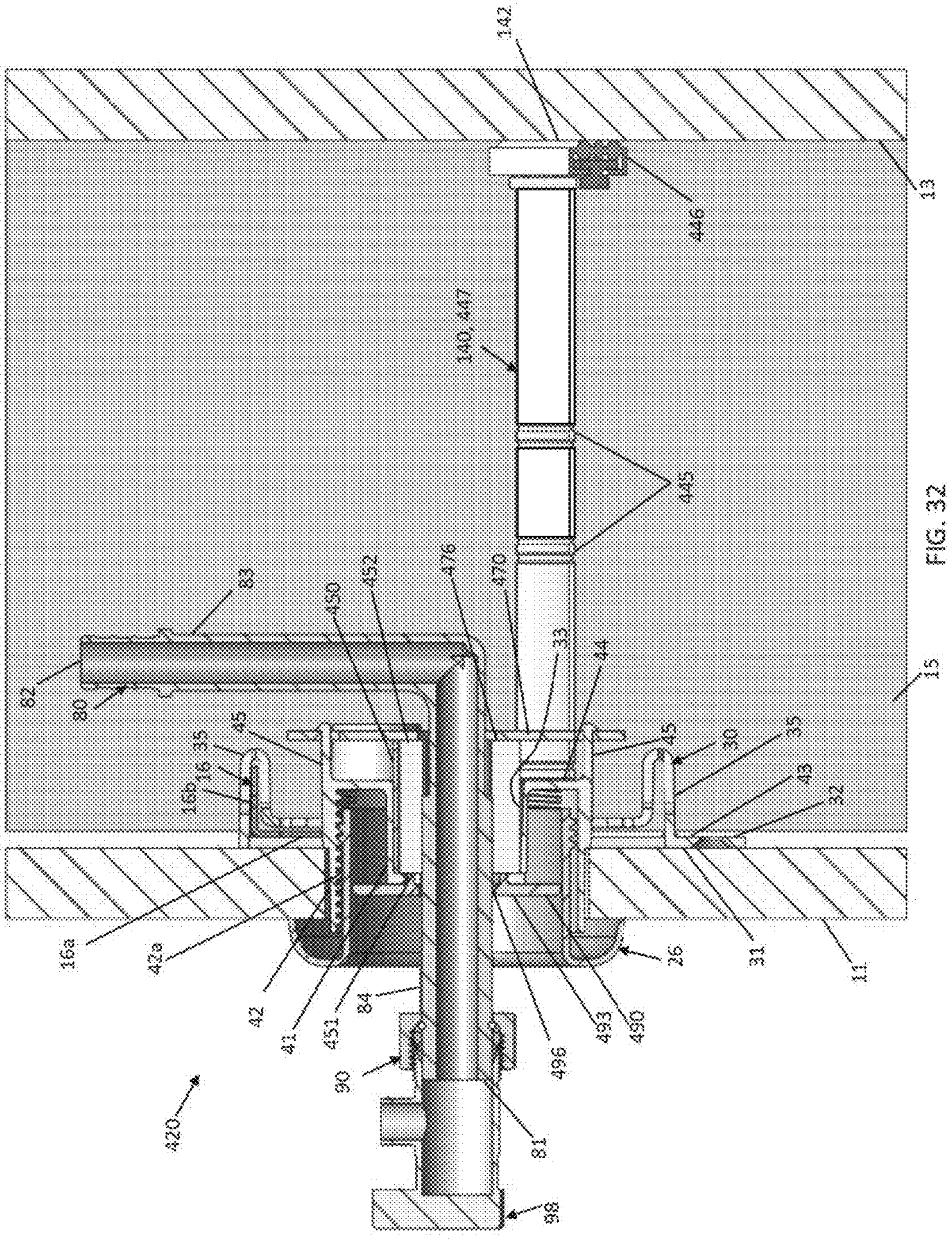
FIG. 32 is a cross-sectional view through Section 32-32 of FIG. 31A.

As shown in FIG. 4C, the second base side 32 of the base 30 comprises at least one receptacle outlet, socket, or support receptacle 46 that is configured to receive a first end 141 of the support structure 140. When the support structures 140 (which may also be referred to as support legs, beams, or extensions) are inserted into the support receptacles 46, the support structures 140 are configured to provide additional support and rigidity to the rest of the outlet box assembly 20 and the plumbing system by providing support between the base 30 and the back wall 13. The support structures 140 may be cut or sized according to the width of the wall cavity (i.e., the distance between the support receptacle 46 and the front surface of the back wall 13, as shown in FIG. 32) in which the outlet box assembly 20 is installed. Accordingly, when the outlet box assembly 20 is attached to the wall 11, the support structure 140 extends between the base 30 and the back wall 13 (as shown with the T-shaped support 447 in FIG. 32), and the second end 142 of the support structure 140 directly abuts a front surface of a back wall 13 (as shown in FIG. 32).

Figures 35A, 35C:
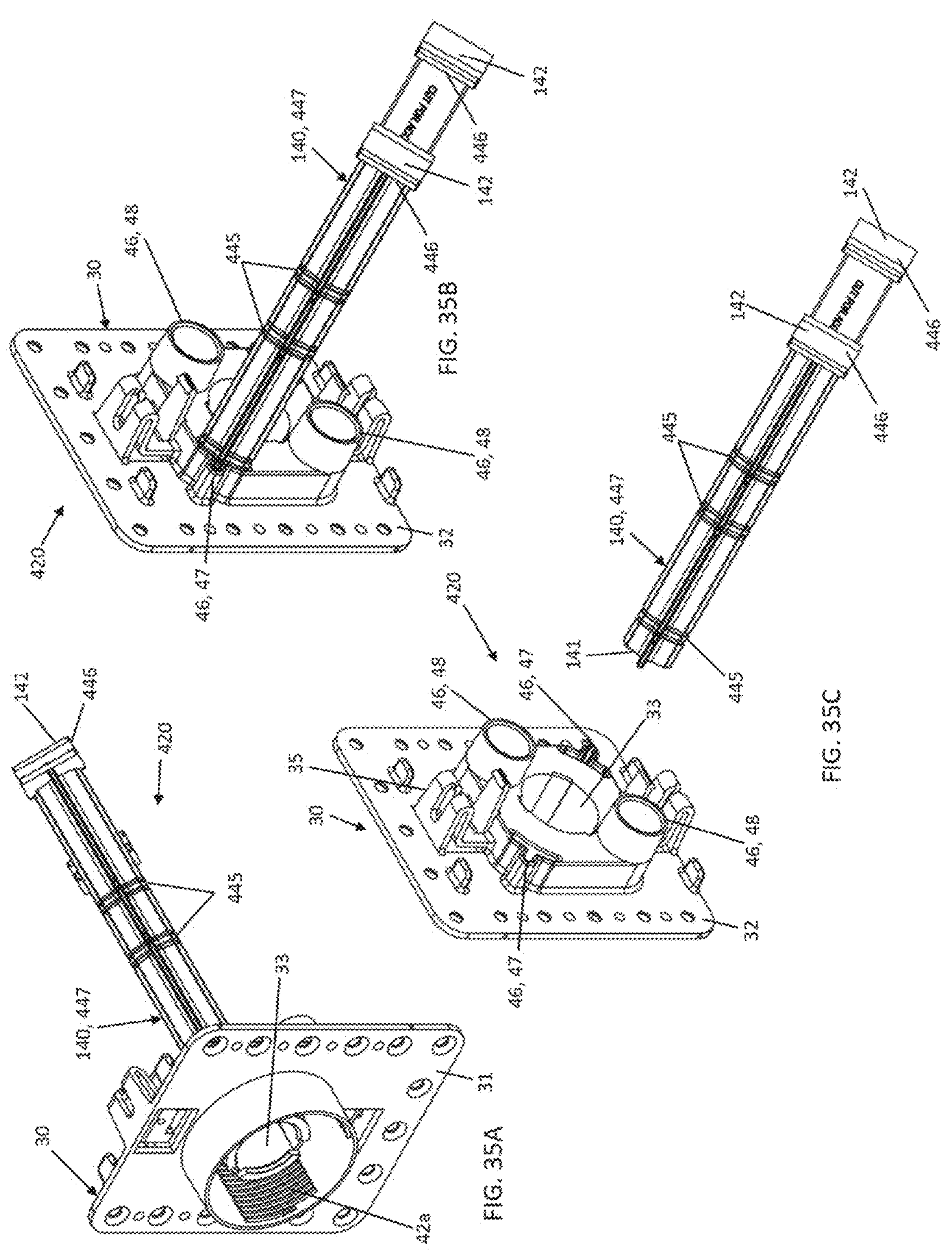
FIG. 35A is a front, perspective view of another portion of the outlet box assembly of FIG. 29A.
FIG. 35C is a back, exploded view the portion of the outlet box assembly of FIG. 35A.

Depending on the desired configuration, the support receptacle 46 is one of a substantially T-shaped hole 47 or a substantially cylindrical hole 48. The T-shaped socket or hole 47 is configured to receive the first end 141 of a support structure 140 that is a T-shaped support 447 (as shown in FIG. 35C and described further herein). The cylindrical socket or hole 48 is configured to receive the first end 141 of a support structure 140 that is a cylindrical support 148 (e.g., a cylindrical support leg, (plumbing) tube, or extension, as shown in FIGS. 4A-4C). The cylindrical support 148 may be a longitudinally-extending, hollow cylinder. The cylindrical support 148 may include any of the features, aspects, and configurations of the T-shaped support 447 (as described further herein), unless otherwise specified herein.

The base 30 may define a plurality of different types of support receptacles 46 (i.e., both the T-shaped hole 47 and the substantially cylindrical hole 48) to be attachable with and receive a variety of different types of support structures 140 (e.g., the T-shaped support 447 and the cylindrical support 148, respectively), according to the desired configuration. For example, the base 30 may include two T-shaped holes 47 that are diagonal to each other on opposite sides of the base through-hole 33 and two cylindrical holes 48 that are diagonal to each other on opposite sides of the base through-hole 33, where the T-shaped holes 47 and the cylindrical holes 48 are offset from each other about the perimeter of the base through-hole 33. According to various embodiments, two support structures 140 are attached to and extend from the base 30 along opposite tangential sides of the base through-hole 33. The various support receptacles 46 (and the first ends 141 of the support structures 140) are positioned radially between the first circumferential wall 41 and the second circumferential wall 42 and within the connecting wall 44. The support receptacles 46 may be at least partially defined by the inner surface of the second circumferential wall 42 and the connecting wall 44.

Figures 6, 7A, 7B:
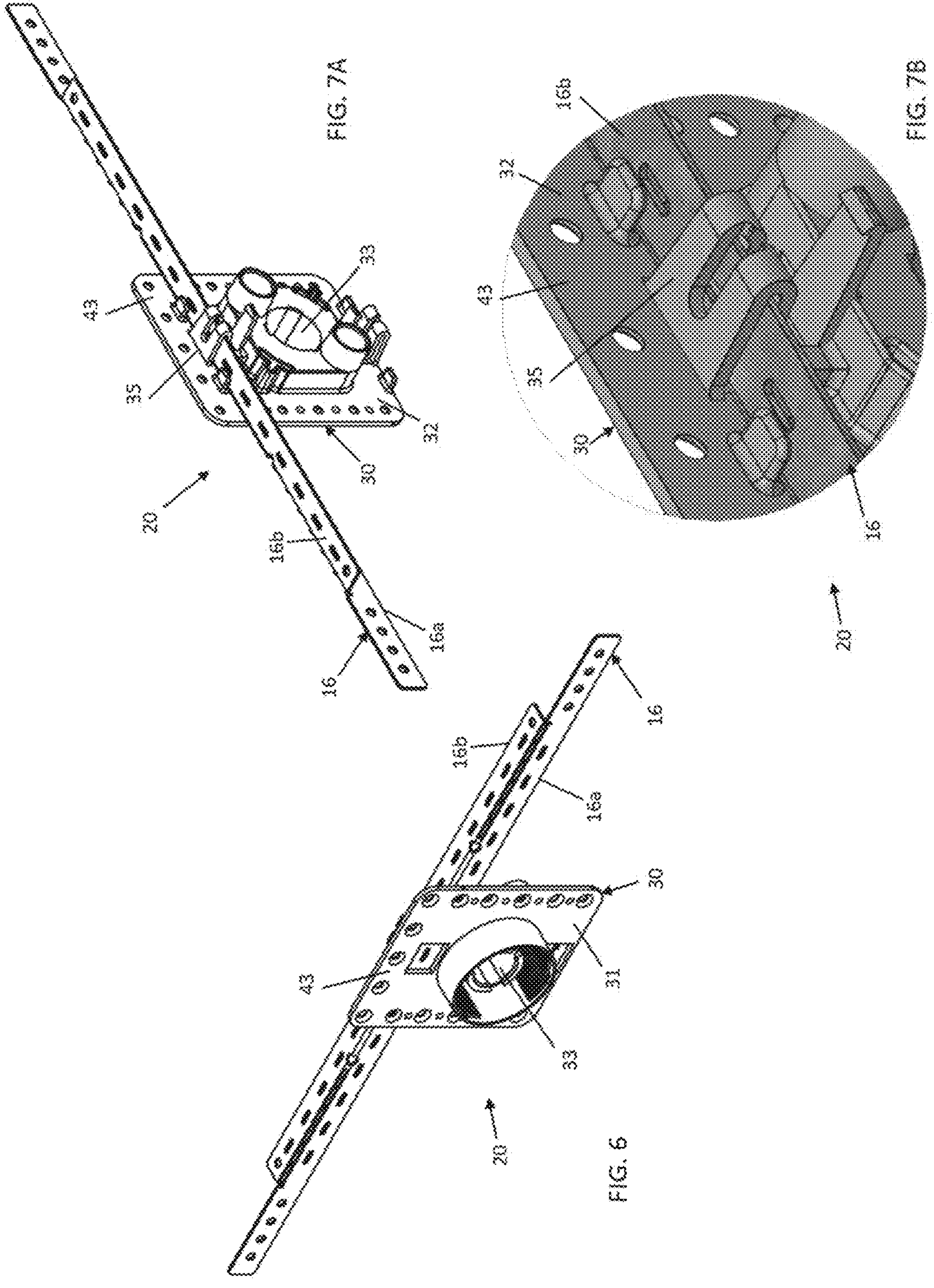
FIG. 6 is a front, top perspective view of a portion of the outlet box assembly of FIG. 1A with the bracket attached.
FIG. 7A is a back, top perspective view of a portion of the outlet box assembly of FIG. 1A with the bracket attached.
FIG. 7B is an enlarged view of a portion of FIG. 7A.
Figures 37A, 37B:
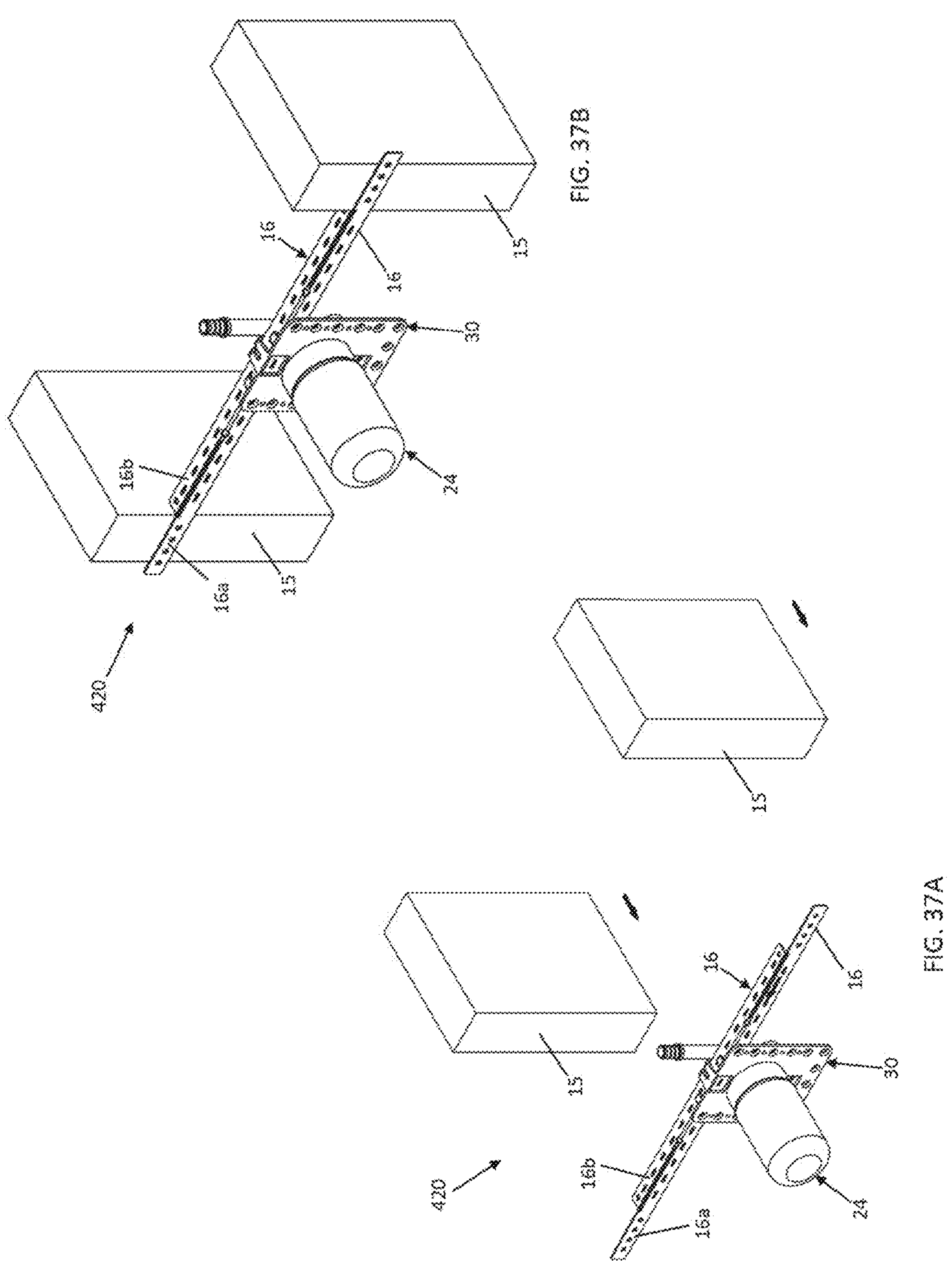
FIGS. 37A-37B are perspective views of the bracket and the outlet box assembly of FIG. 29A being attached to studs.
Figures 38A, 38B:
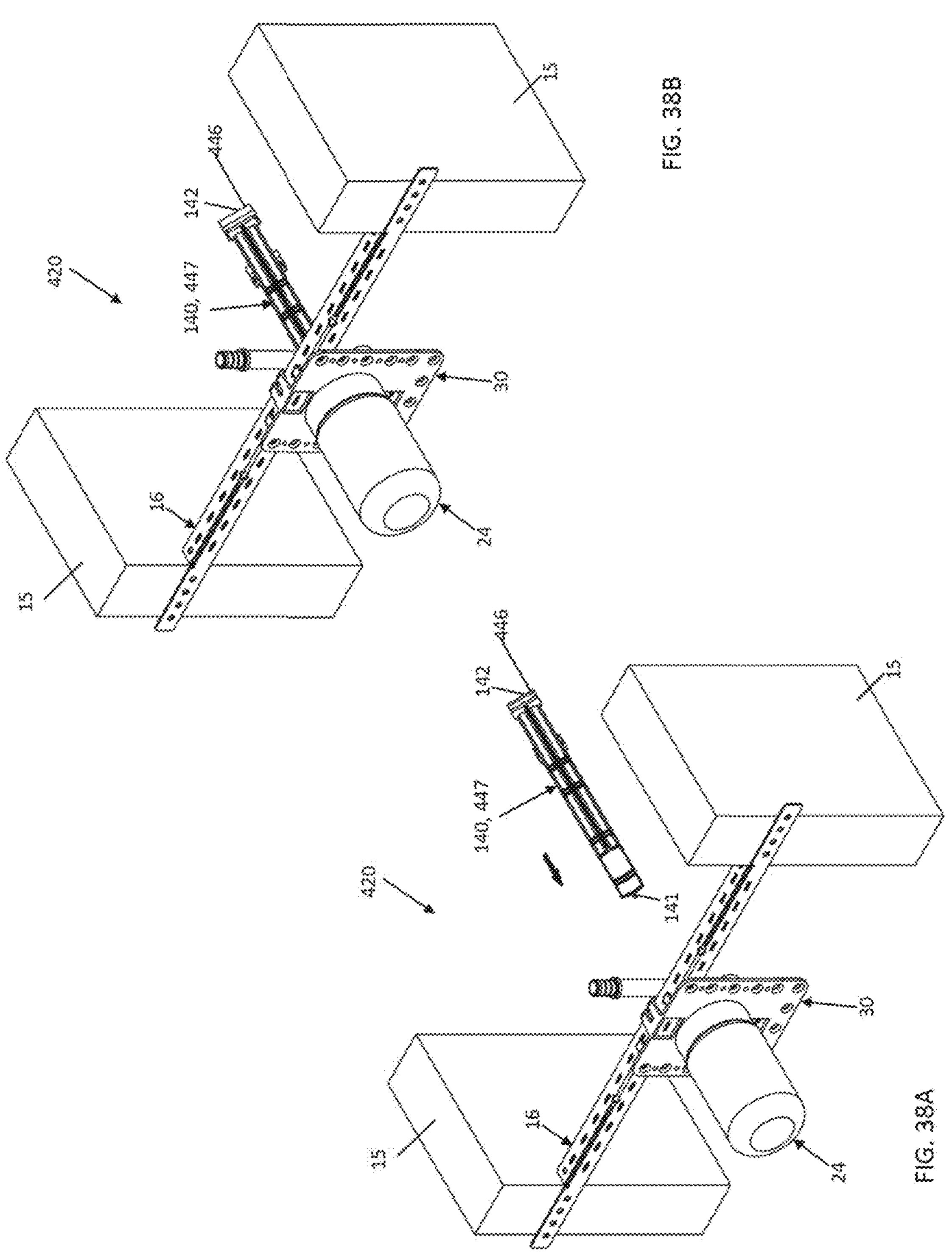
FIGS. 38A-38B are perspective views of the support structure being attached to the outlet box assembly of FIG. 29A.

As shown in FIGS. 6-7B, the base 30 is configured to attach to a middle or central portion of a support bracket 16 (which may be a first bracket), which may optionally be a part of the outlet box assembly 20. As shown in FIGS. 37A-37B, the bracket 16 is configured to attach to two side walls or studs 15 along opposite ends of the bracket 16 such that the bracket 16 extends between the two studs 15 and the outlet box assembly 20 (or the outlet box assembly 120, 220, 320, or 420) is positioned in between the two studs 15. Accordingly, the bracket 16 mounts the outlet box assembly 20, 120, 220, 320, 420 to the studs 15. According to one embodiment, the bracket 16 may be a galvanized steel bracket, such as a 170 type bracket.

Figures 8A, 8B, 9A, 9B:
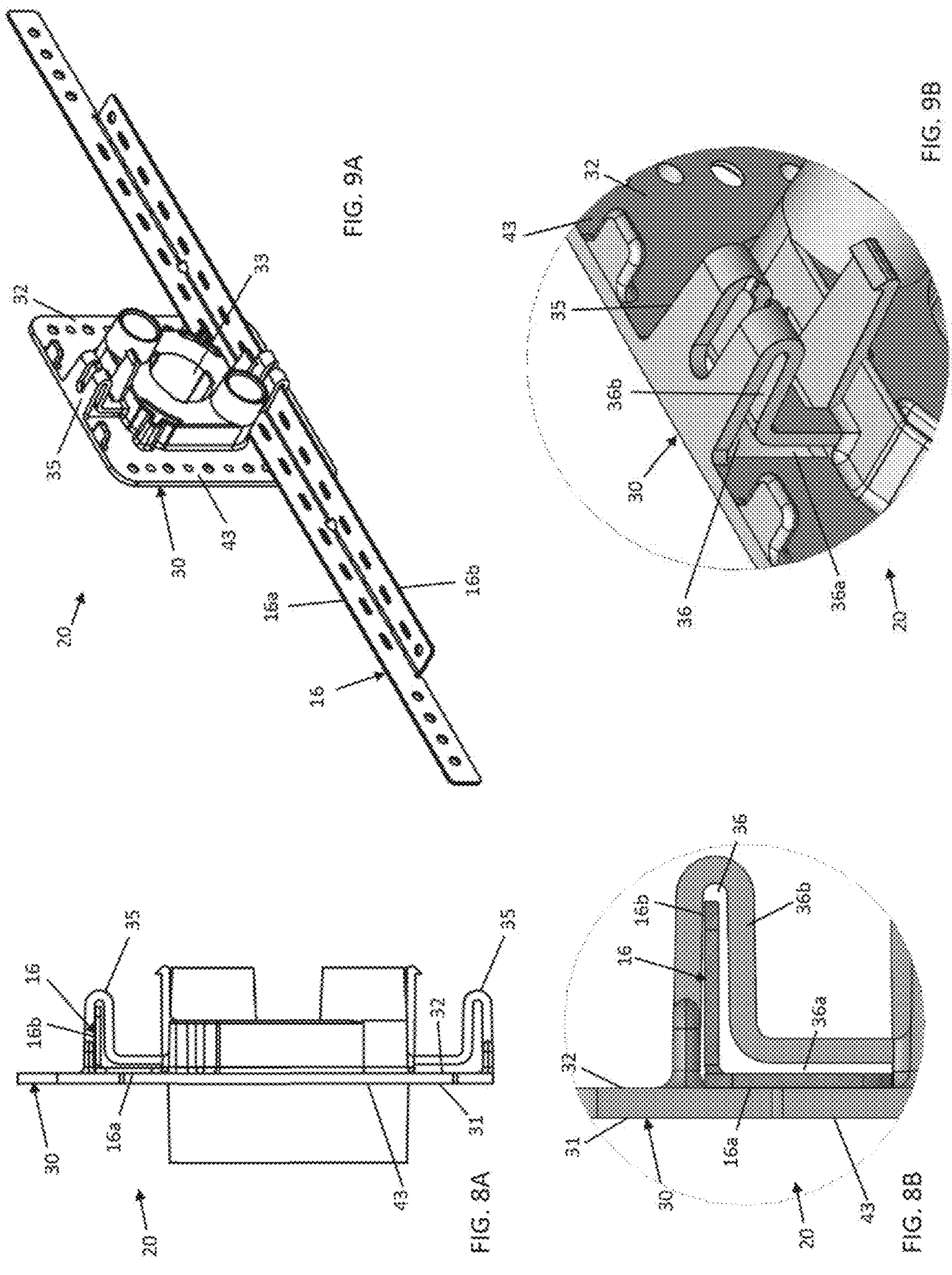
FIG. 8A is a side view of a portion of the outlet box assembly of FIG. 1A with the bracket attached.
FIG. 8B is an enlarged view of a portion of FIG. 8A.
FIG. 9A is a back, top perspective view of a portion of the outlet box assembly of FIG. 1A with the bracket attached.
FIG. 9B is an enlarged view of a portion of FIG. 9A.

As shown in FIGS. 8A-9A, the bracket 16 has an L-shaped cross-section (as shown in FIG. 8B) for additional strength. In particular, the bracket 16 has a first bracket wall 16*a* and a second bracket wall 16*b* that extend substantially perpendicular to each other (as further shown in FIG. 17). The first bracket wall 16*a* extends along a plane substantially parallel to and along the width of the base wall 43 and directly abuts and attaches to the two studs 15 along opposite ends of the base wall 43 (as shown in FIGS. 37A-37B). The second bracket wall 16*b* extends from the first bracket wall 16*a* in a direction away from the base wall 43. The second bracket wall 16*b* may be shorter than the first bracket wall 16*a* (along the length of the bracket 16) and is positioned along a center portion of the length of the first bracket wall 16*a*.

As shown in FIGS. 7A-8B, the bracket 16 is positioned along and attached to the second base side 32. Accordingly, the base 30 comprises a bracket support 35 that extends from the base wall 43 along the second base side 32. The bracket support 35 is positioned above or below the outer surface of the second circumferential wall 42 and the base through-hole 33 and is substantially centered along the width of the base 30. Optionally, the base 30 may include two bracket supports 35 positioned on opposite sides of the outer surface of the second circumferential wall 42 and the base through-hole 33.

The bracket support 35 defines an L-shaped bracket receiver, through-hole, or slot 36 that corresponds to the shape and size of the bracket 16 and is configured to receive a portion of the bracket 16. In particular, the central portion of the bracket 16 is positioned within the L-shaped slot 36, extending completely through the bracket support 35.

As shown in FIGS. 8B and 9B, the L-shaped slot 36 comprises a first slot portion 36*a* and a second slot portion 36*b* that extend substantially perpendicular to each other. The first slot portion 36*a* extends substantially parallel to the base wall 43 and is configured to receive the first bracket wall 16*a* (as shown in FIG. 8B). The second slot portion 36*b* extends continuously from the first slot portion 36*a* in a direction away from the base wall 43 and is configured to receive the second bracket wall 16*b* (as shown in FIG. 8B). The particular configuration and shape of the bracket support 35 (and the corresponding slot 36) provides additional rigidity in the connection between the base 30 and the bracket 16.

Connection Assembly

FIGS. 10A-10E show various views of the compression nut assembly or connection assembly 49. The connection assembly 49 is configured to attach to the base 30 through the base through-hole 33 (as shown in FIG. 3B) and comprises a connector 50 and an adapter 70 that are attachable together. The connection assembly 49 is configured to securely attach the tubing 12 (optionally via the fitting 80) to the base 30. The connector 50 is constructed as a single-piece, in particular as a single, unitary, integral component that cannot be separated without destruction. Additionally, the adapter 70 is constructed as a single-piece, in particular as a single, unitary, integral component that cannot be separated without destruction. However, the connector 50 and the adapter 70 are two separate pieces that are attachable to each other from opposite sides of the base 30. The connector 50 and the adapter 70 may be constructed out of a variety of different materials, including but not limited to polymeric, metallic, or synthetic materials.

Figures 10A, 10B:
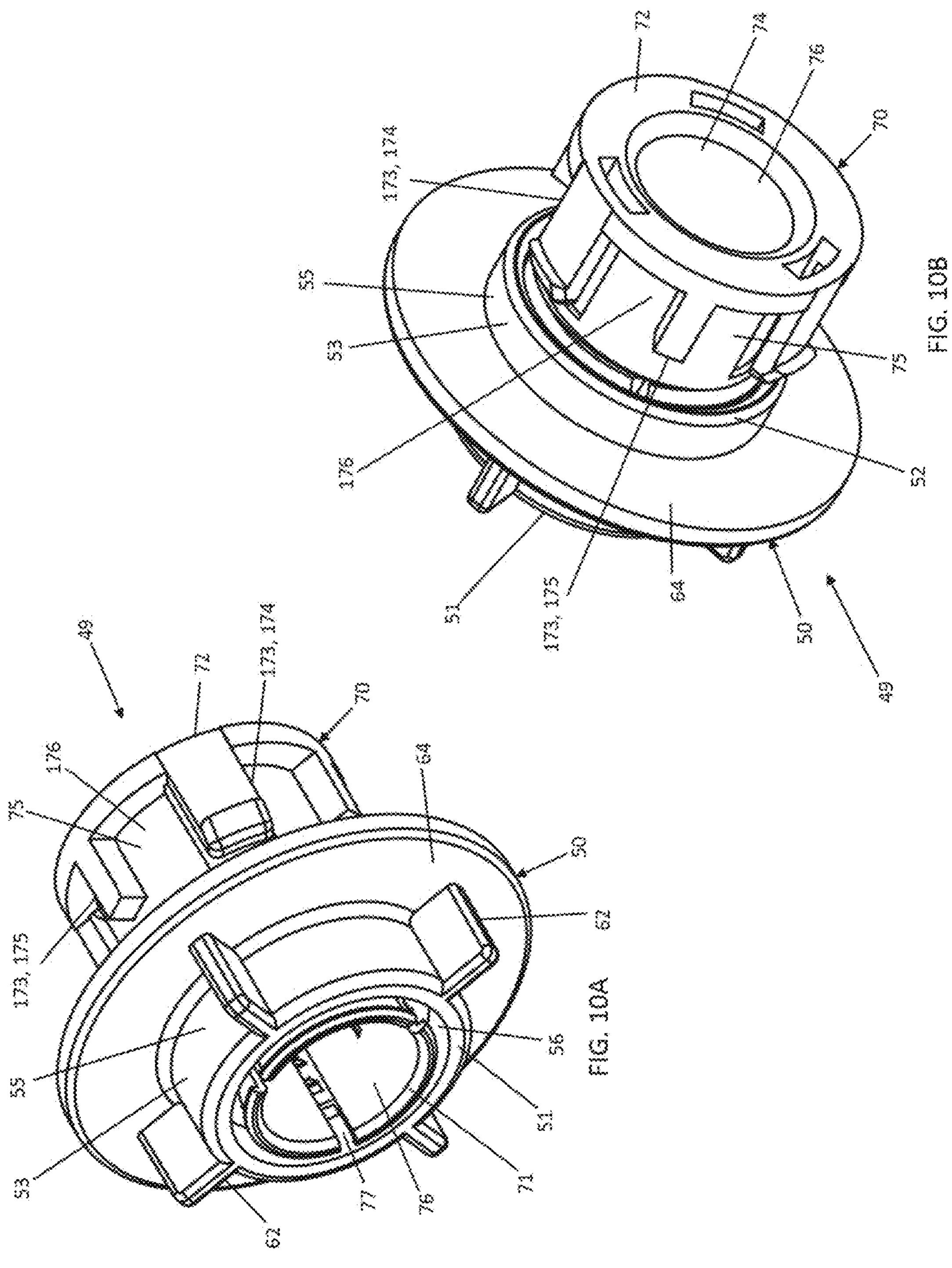
FIG. 10A is a front, perspective view of a connection assembly of the outlet box assembly of FIG. 1A.
FIG. 10B is a back, perspective view of the connection assembly of FIG. 10A.
Figure 10C:
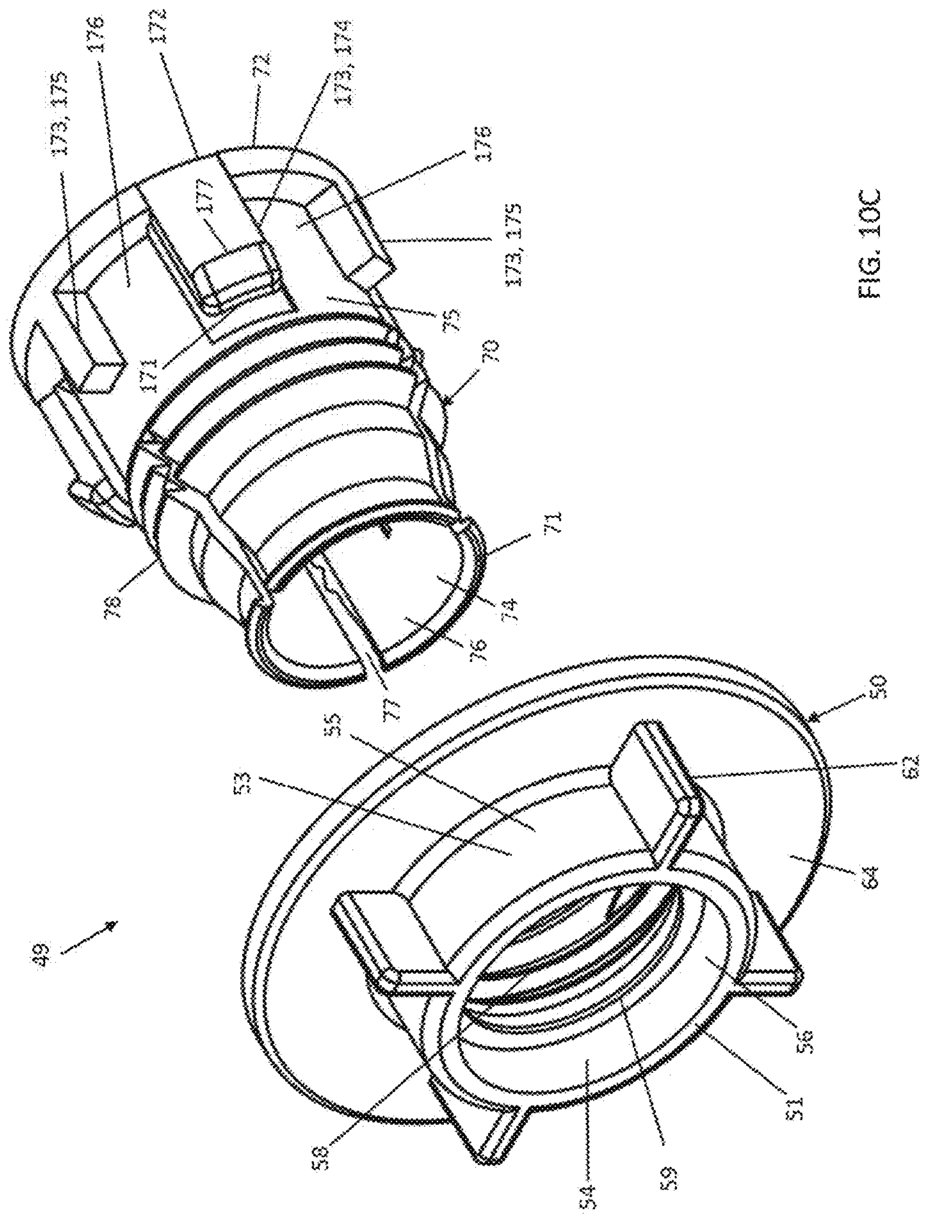
FIG. 10C is an exploded view of the connection assembly of FIG. 10A.
Figure 10E:
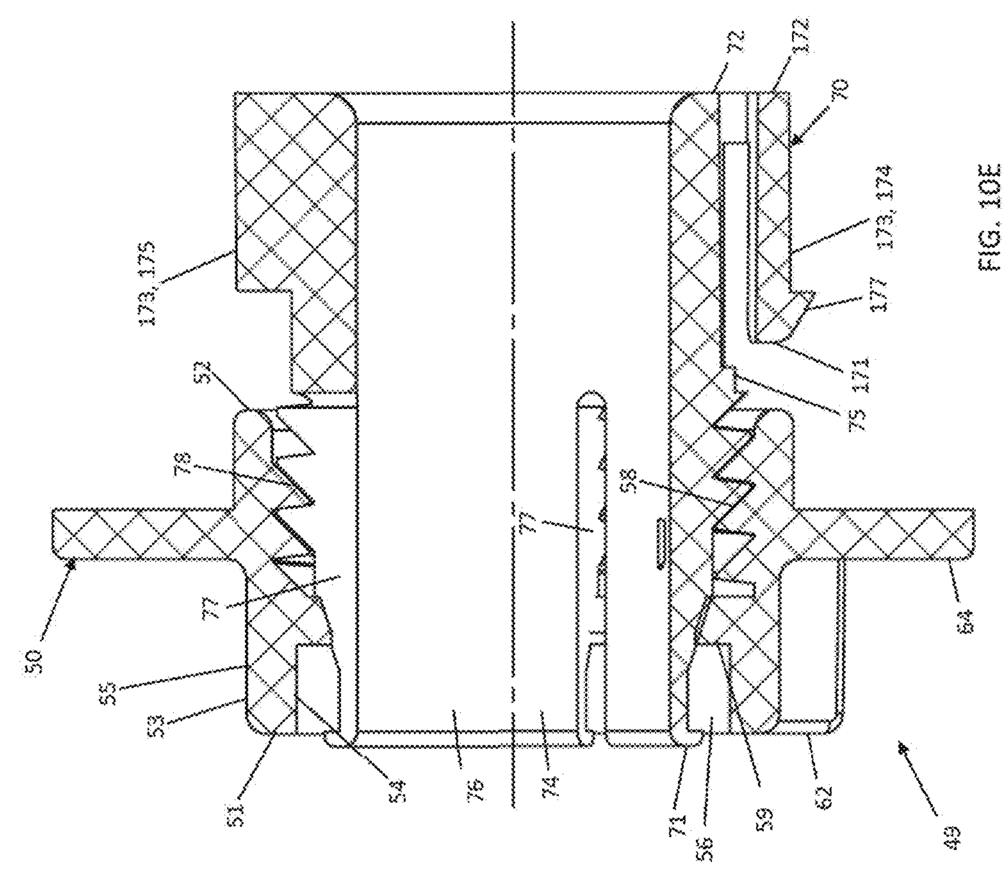
FIG. 10E is a cross-sectional view through Section 10E-10E of FIG. 10D.
Figure 10D:
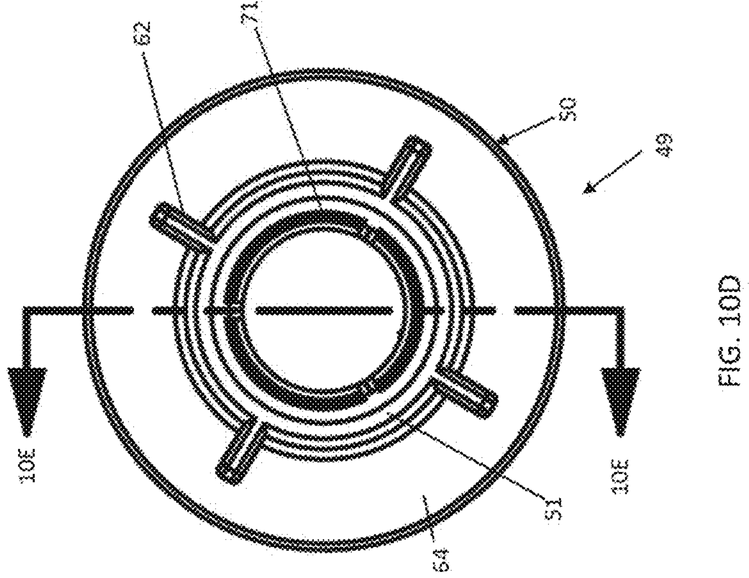
FIG. 10D is a front view of the connection assembly of FIG. 10A.

The connector 50 (which also can be referred to as a nut, faceplate, or cover plate) extends longitudinally (along its length) between a first connector end 51 and a second connector end 52, where the first connector end 51 is further from the base 30 and the second connector end 52 is closer to the base 30. The connector 50 comprises a connector body 53 that comprises an inner surface 54 and an outer surface 55. The inner surface 54 defines a longitudinally-extending, internal connector through-hole or passage 56 that extends completely though the connector 50, along the longitudinal length of the connector 50. The passage 56 is configured to receive and attach with the first adapter end 71 of the adapter 70. Accordingly, as shown in FIGS. 10C and 10E, one or more internal threads 58 are positioned along the inner surface 54 of the connector 50 and within the passage 56 to attach to the adapter 70. Optionally, the inner diameter of the connector 50 may be approximately ½ inches.

As shown in FIG. 3B, the outer diameter of the connector body 53 is larger than the inner diameter of the base through-hole 33 (at least along the end of the base through-hole 33 that corresponds to the first base side 31). Accordingly, the connector 50 stays along the first base side 31 of the base through-hole 33 (while the adaptor 70 extends through the base through-hole 33, as described further herein).

As shown in FIG. 10C, the connector 50 comprises at least one gripping projection 62, such as a flange, extension, or other projection portion, that is positioned along and extends radially outwardly from the outer surface 55 of the connector body 53. The connector 50 optionally may include a plurality of gripping projections 62 that are tangentially spaced apart from each other and at different tangential positions about the outer surface 55 of the connector body 53. The gripping projections 62 extend axially along a portion of the longitudinal length of the connector body 53 (e.g., from the first connector end 51 to an outwardly-facing surface (once installed onto the wall 11) of the flange 64) and are positioned along the first base side 31 of the base 30 to allow the user to access the gripping projections 62. The gripping projections 62 provide areas for the user to grip the connector 50 and rotate the connector 50 relative to the base 30 to attach or detach (e.g., screw or unscrew) the connector 50 from the adapter 70.

Additionally, the connector 50 comprises a wall or flange 64 that extends radially outwardly from the outer surface 55 of the connector body 53. The flange 64 may extend around the entire perimeter of the connector body 53. The outer diameter of the flange 64 is smaller than the inner diameter of the second circumferential wall 42 of the base 30 such that either a portion of the protective cover 24 or a portion of the escutcheon 26 (depending on the current state of installation) can fit or otherwise be received radially between the second circumferential wall 42 and the outer edge of the flange 64. The distance between the outer edge of the flange 64 and the inner edge of the second circumferential wall 42 may be approximately equal to a wall thickness of the escutcheon 26 such that the flange 64 covers and closes off the opening within the escutcheon 26 (as shown in FIG. 3B).

As shown in FIG. 10C, the adapter 70 (which also can be referred to as a fastener, insert, bolt, or pipe holder) that extends longitudinally (along its length) between a first adapter end 71 and a second adapter end 72. As shown in FIG. 3B, the adapter 70 is configured to be positioned partially within and extends through the base through-hole 33 once installed onto the base 30. Accordingly, once the adapter 70 is installed onto the base 30, the first adapter end 71 is positioned along the first base side 31 and the second adapter end 72 is positioned within the base through-hole 33 (or optionally along the second base side 32). Furthermore, since the adapter 70 is inserted into the base through-hole 33 from the second base side 32 (toward the first base side 31) and the connector 50 is attached to the adapter 70 along the first base side 31, when the connection assembly 49 is attached to the base 30, at least a portion of the connector 50 extends along the first base side 31 and at least a portion of the adapter 70 is positioned between the connector 50 and the second base side 32. In one embodiment, the inner diameter of the adapter 70 may be approximately ½ inches.

The adapter 70 comprises an inner surface 74 and an outer surface 75. The inner surface 74 of the adapter 70 defines a longitudinally-extending, internal adapter passage or through-hole 76 that extends completely though the adapter 70, along the longitudinal length of the adapter 70. The adapter through-hole 76 is configured to receive the fitting 80 (or the tubing 12, according to various other embodiments). To attach to the connector 50, one or more external threads 78 positioned along the outer surface 75 can engage with the internal threads 58 of the connector body 53 to attach the connector 50 and the adapter 70 together.

The adapter 70 defines at least one longitudinally-extending slot 77 that is configured to allow the adapter 70 to radially compress when the adapter 70 is attached to the connector 50. According to one embodiment, the adapter 70 includes a plurality of longitudinally-extending slots 77 that are tangentially spaced apart from each other and at different tangential positions about the circumference of the adapter 70. The slots 77 extend radially through (optionally completely through) the outer wall of the adapter 70, between the inner surface 74 and the outer surface 75. The slots 77 extend longitudinally along a portion of the length of the adapter 70, in particular from the first adapter end 71 to a central portion of the adapter 70 and along at least a portion of the external threads 78.

With the slots 77, as the connector 50 is screwed or threaded onto the adapter 70, the connector 50 can radially compress the adaptor 70 inwardly, which allows the fitting 80 (or the tubing 12, depending on the embodiment) to be tightly secured in place (as well as released) from the front side of the wall 11 (via the connector 50). As shown in FIG. 10E, the inner surface 54 of the connector 50 further comprises a tapered portion or extension 59 positioned axially between the internal threads 58 and the first connector end 51 and extending along the inner circumference of the adapter 70. The tapered extension 59 extends radially inwardly relative to the internal threads 58 and has a smaller inner diameter than the internal threads 58 and the rest of the passage 56. As the adapter 70 moves further into the passage 56 of the connector 50, the tapered extension 59 abuts against the outer surface 75 of the adapter 70 and forces the first adapter end 71 to compress radially inwardly along the slots 77.

As shown in FIG. 10C, the adapter 70 further includes at least one longitudinally-extending protrusion 173 positioned along the outer surface 75 of the adapter. According to one embodiment, the adapter 70 includes a plurality of protrusions 173 that are tangentially spaced apart from each other and at different tangential positions about the circumference of the adapter 70. The protrusions 173 may extend longitudinally along a portion of the length of the adapter 70, in particular from the second adapter end 72 to a central portion of the adapter 70, ending before reaching the external threads 78. The plurality of protrusions 173 define at least one recess or notch 176 (or a plurality of notches 176) that are each positioned between two protrusions 173 about the outer circumference of the adapter 70.

According to various embodiments, one or more of the protrusions 173 may be a snap protrusion 174 that is radially movable relative to the outer surface 75 of the adapter 70. As shown in FIGS. 10C and 10E, the snap protrusion 174 extends longitudinally between a first longitudinal end 171 (that is positioned along the central portion of the adapter 70) and a second longitudinal end 172 (that is positioned along the second adapter end 72). The snap protrusion 174 is attached to the outer surface 75 of the adapter 70 along the second longitudinal end 172 and is spaced apart from the outer surface 75 along the first longitudinal end 171 (such that the first longitudinal end 171 moves relative to the outer surface 75). The snap protrusion 174 includes a hook 177 at the first longitudinal end 171 of the snap protrusion 174 in order to hook onto the first base side 31 (along an end of the base through-hole 33), optionally between two stop walls 39.

Additionally, one or more of the other protrusions 173 may be a protrusion 175 that is stationary relative to the outer surface 75 of the adapter 70. The stationary protrusion 175 is attached to the rest of the adapter 70 along the entire longitudinal length of the stationary protrusion 175. Stationary protrusions 175 may be alternatively positioned with the snap protrusions 174 about the circumference of the adapter 70. The snap protrusions 174 may be longer than and extend further along the longitudinal length of the adapter 70.

The size, positioning, and number of protrusions 173 (in particular the snap protrusions 174) may correspond to and be complementary to the size, positioning, configuration, and/or number of grooves 37 within the base through-hole 33. For example, the grooves 37 may be configured to receive the snap protrusions 174, which prevents the adapter 70 from rotating within the base through-hole 33. As the adapter 70 is inserted into the base through-hole 33, each of the snap protrusions 174 are aligned with and inserted into each of the grooves 37 of the base 30 and move radially inwardly as each snap protrusion 174 is inserted into each groove 37. Once the hook 177 on the snap protrusion 174 moves past the end of the base through-hole 33, the hook 177 moves radially outwardly along and snaps onto the end of the base through-hole 33, thereby allowing the snap protrusion 174 to move back radially outwardly.

By positioning the snap protrusions 174 within the grooves 37, the stationary protrusions 175 can be aligned with the stop wall 39 such that, when the adapter 70 is inserted into the base through-hole 33, the end of the stationary protrusions 175 abuts the inner edge of the stop wall 39, which can prevent, inhibit, or otherwise at least partially restrict the adapter 70 from axially moving any further within and through the base through-hole 33.

Fitting

FIGS. 11A-11E show various views of the fitting 80 that is configured to be inserted into and through the connection assembly 49 and indirectly secured to the base 30 through the connection assembly 49 (as shown in FIG. 3B). According to various other embodiments, the fitting 80 may be indirectly secured to the base 30 through other structures, such as an elastomeric insert 450 (as described further herein).

The fitting 80 extends between a first end 81 and a second end 82 along its length and comprises a wall 85 that defines a fitting passage 86 extending between the first end 81 and the second end 82. The second end 82 may include a variety of different configurations and inputs to attach to various different types of tubing 12. The fitting 80 has a bend or curve along its length between the first end 81 and the second end 82 to form an L-shape such that the portion of the fitting passage 86 at the first end 81 extends approximately 90° to the portion of the fitting passage 86 at the second end 82. According to various other embodiments, the fitting 80 may alternatively be straight (without a bend) between the first end 81 and the second end 82. The outer diameter of the fitting 80 increases along its length between the second end 82 and the first end 81 (for example, from approximately ½ inches along the second end 82 to ⅝ inches along the first end 81). The fitting 80 may be generally round and circumferential about its outer surface, without any flanges or flat portions that are to be positioned within or attached to the outlet box assembly 20 or components thereof.

As shown in FIG. 3B, the fitting passage 86 defines an area for fluid to flow through the entire outlet box assembly 20. Accordingly, the second end 82 of the fitting 80 is configured to fluidly attach to the tubing 12 along a backside of the wall 11 (i.e., along the second base side 32) (as shown in FIGS. 39A-39B). The first end 81 of the fitting 80 is configured to fluidly attach to the stop valve 98 along a frontside of the wall 11 (i.e., along the first base side 31). Accordingly, fluid can flow directly between and within the tubing 12, the fitting 80 (through the fitting passage 86), and the stop valve 98, through the wall 11. Although the valve 98 is referred to herein as a stop valve, in some embodiments, the valve 98 may alternatively be a general outlet valve.

Figures 11A, 11B:
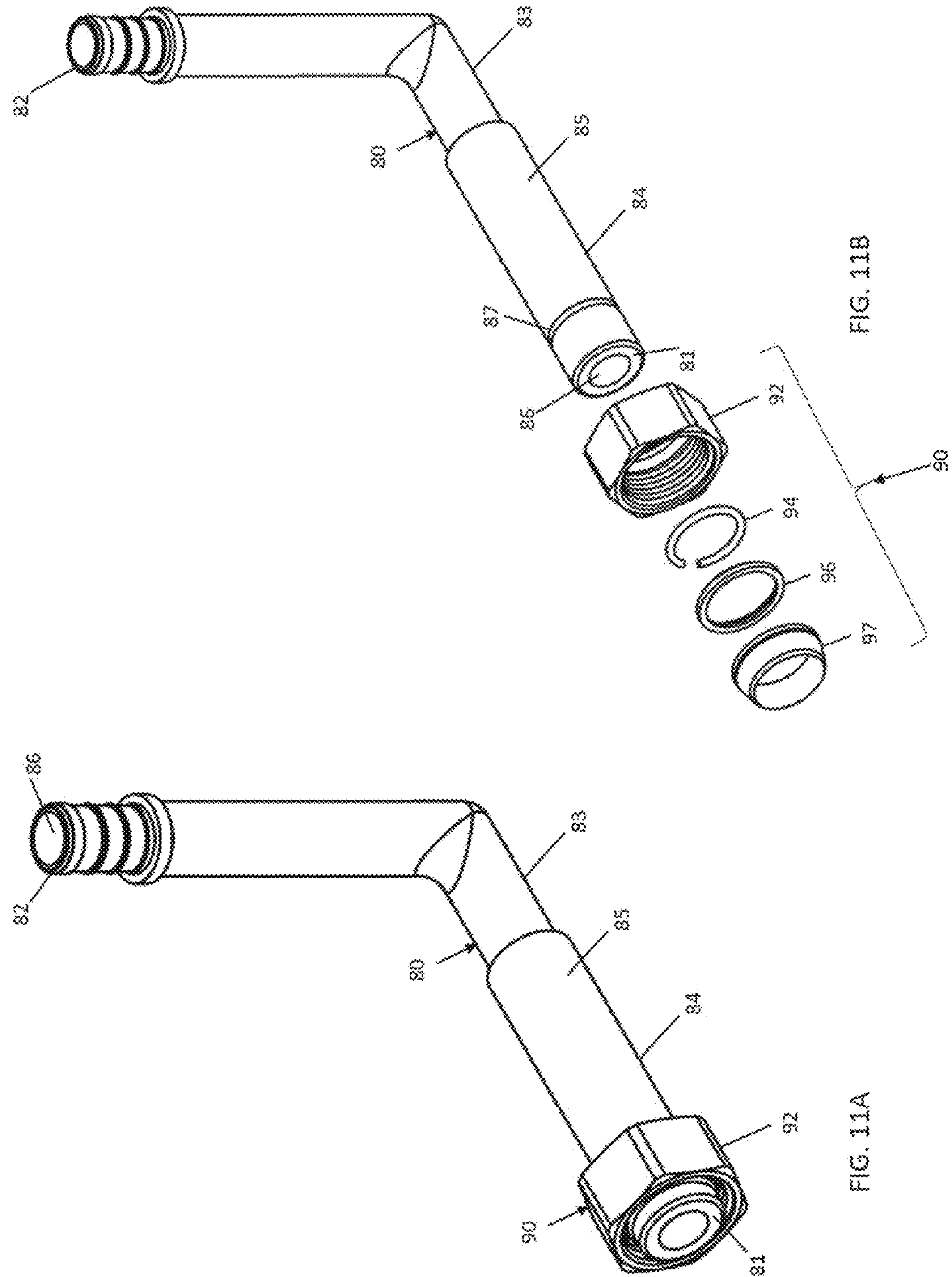
FIG. 11A is a perspective view of a fitting and a circlip assembly of the outlet box assembly of FIG. 1A.
FIG. 11B is an exploded view of the fitting and the circlip assembly of FIG. 11A.
Figures 11C, 11D, 11E:
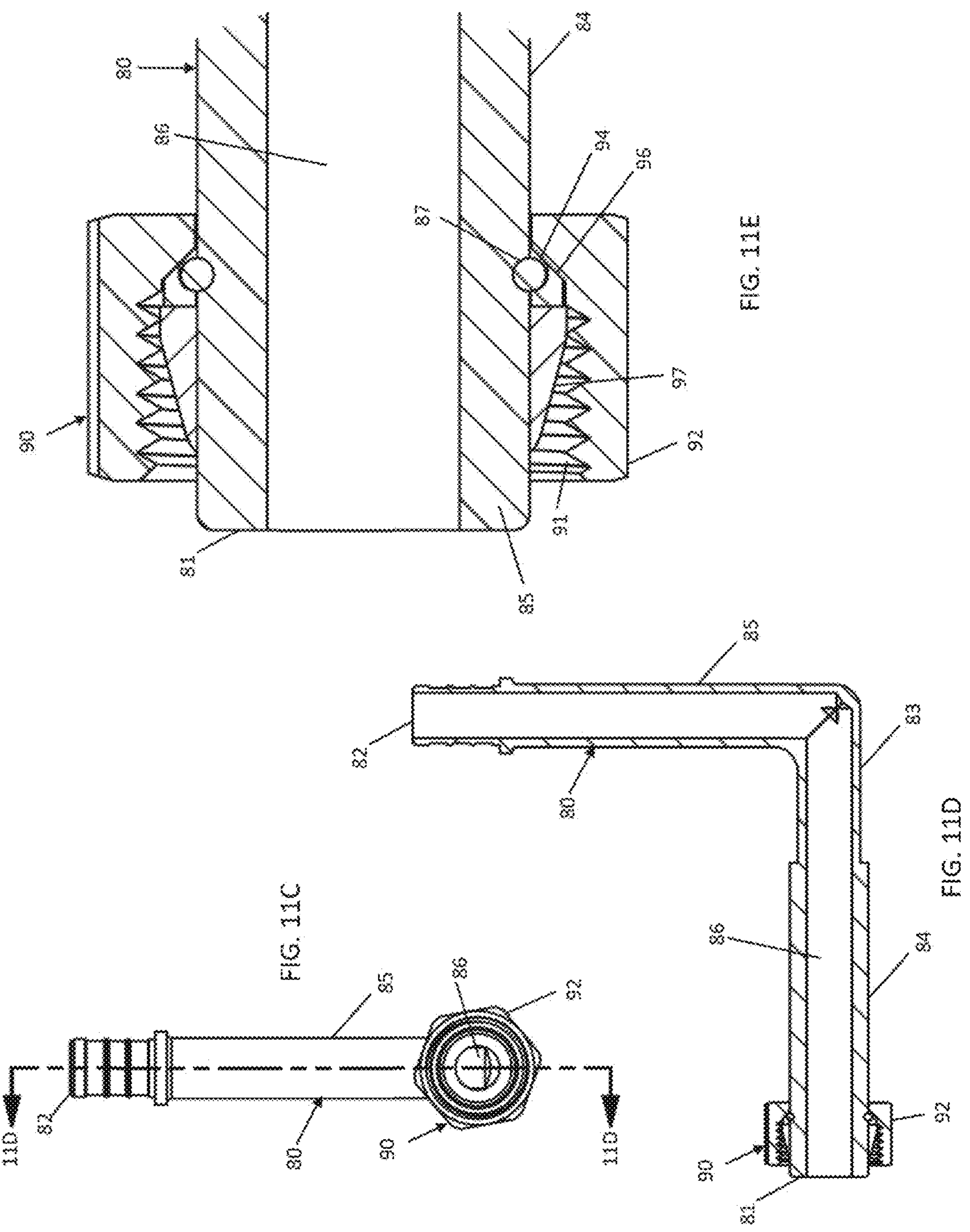
FIG. 11C is a front view of the fitting and the circlip assembly of FIG. 11A.
FIG. 11D is a cross-sectional view through Section 11D-11D of FIG. 11C.
FIG. 11E is an enlarged view of a portion of FIG. 11D.
Figures 12A, 12B:
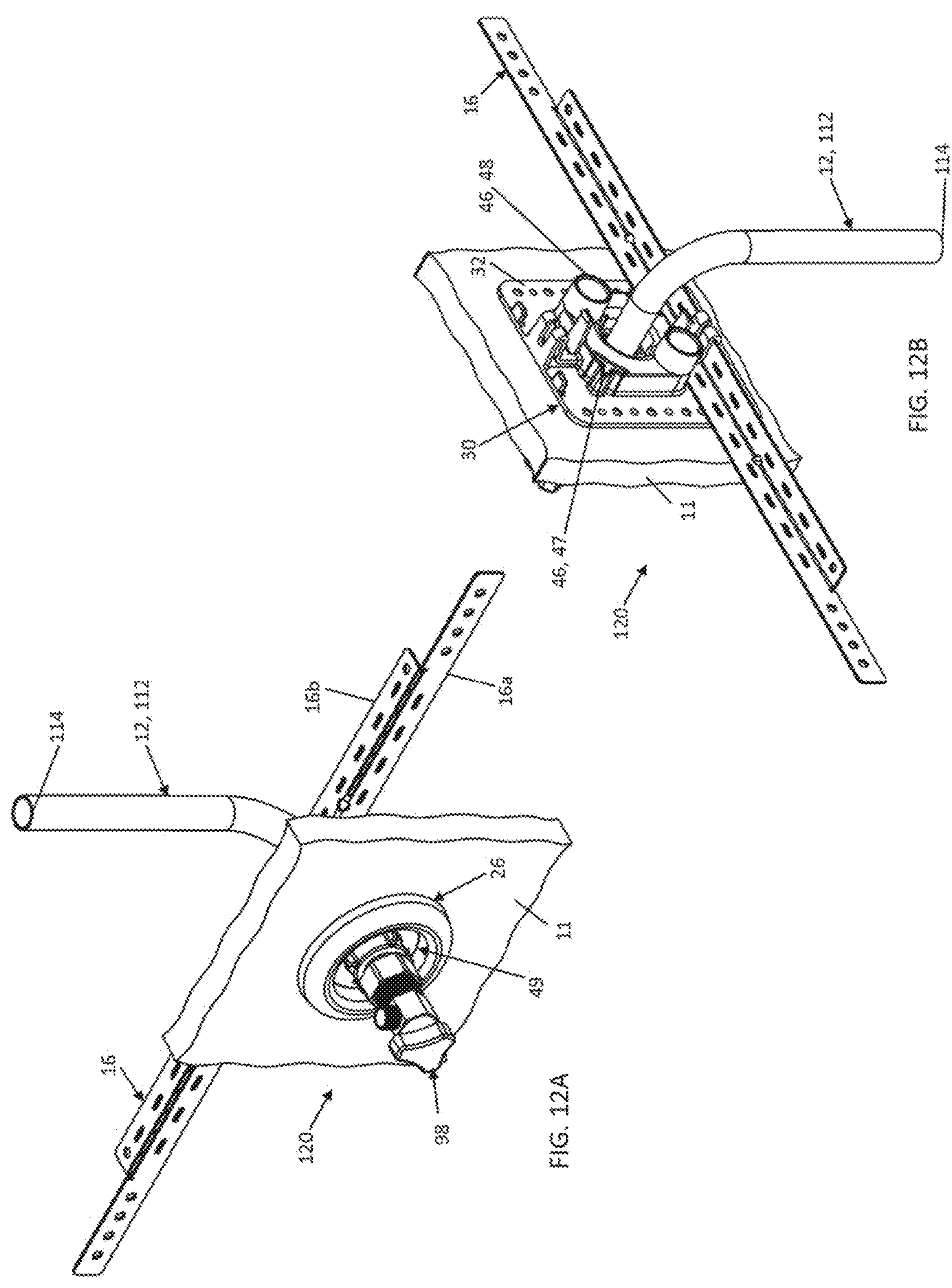
FIG. 12A is a front, perspective view of an outlet box assembly according to another embodiment.
FIG. 12B is a back, perspective view of the outlet box assembly of FIG. 12A.

As shown in FIG. 11D, the inner diameter of the wall 85 of the fitting 80 (i.e., the cross-sectional size of the fitting passage 86) is substantially constant along the length of the fitting 80. As shown in FIGS. 11A and 11D, the fitting 80 includes a thicker or larger portion 84 (i.e., a first portion) and a thinner or smaller portion 83 (i.e., a second portion) along the length of the fitting 80, between the first end 81 and the second end 82. The thickness of the wall 85 is greater along the thicker portion 84 than the thinner portion 83. Because the inner diameter of the wall 85 is substantially constant along the length of the fitting 80, the outer diameter of the wall 85 is larger along the thicker portion 84 than the thinner portion 83. The thicker portion 84 is positioned along and closer to the first end 81 of the fitting 80, and the thinner portion 83 is positioned along and closer to the second end 82 of the fitting 80. The step-wise transition between the thicker portion 84 and the thinner portion 83 may be positioned between the first end 81 and the bend of the fitting 80. The fitting 80 defines a notch or recess 87 extending circumferentially along the entire outer circumference of the fitting 80 (in particular along the outer circumference of the thicker portion 84 near or at the first end 81) to receive and engage with the circlip 94 of the circlip assembly 90 (as described further herein).

As shown in FIG. 3B, the thicker portion 84 is positioned within the connection assembly 49. The portion of the fitting 80 that is within the connection assembly 49 has constant outer and inner diameters. The fitting 80 is positioned within and extends directly through the through-hole 76 of the adapter 70 such that the inner surface 74 of the adapter 70 directly abuts the outer surface of the fitting 80 and the adapter 70 radially compresses onto the fitting 80 to secure the fitting 80 in place within the base 30 via a compression connection (as described further herein). According to various other embodiments, the tubing 12 is instead positioned within the adapter 70 such that the adapter 70 radially compresses onto the tubing 12 (instead of the fitting 80) to secure the tubing 12 in place within the base 30 via a compression connection.

Before the connector 50 is completely secured on the adapter 70 (and when the fitting 80 (or the tubing 12 according to various embodiments) is positioned within the adapter 70 and the fitting 80 (or tubing 12) and the adapter 70 are both positioned within the base through-hole 33), the adapter 70 is not fully radially compressed onto the fitting 80. Accordingly, in this configuration, the fitting 80 (or the tubing 12) is rotatable and axially movable within and along an axial length of the connection assembly 49 (in particular the base through-hole 33). This allows the user to optimally position the fitting 80 (or the tubing 12) in any radial position and a variety of different forward and backward axial positions (and thus to position the fitting 80 (or the tubing 12) at a convenient location relative to the wall 11 and the base 30 for installation). This configuration is particularly beneficial since the wall 11 may be a variety of different thicknesses (or other structures, such as cabinetry or a firewall, may be attached to the wall 11), and the fitting 80 (or the tubing 12) can be positioned accordingly. The connector 50 is fully secured to the adapter 70 when the connector 50 is completely screwed onto the adapter 70, which radially compresses the adapter 70 toward the fitting 80 (or the tubing 12) and secures the fitting 80 (or the tubing 12) in place, both rotationally and axially along its length.

To attach to the stop valve 98 (as shown in FIG. 3B), the outlet box assembly 20 includes a circlip assembly 90, as shown in FIG. 11B, that is configured to be positioned along and attached to the first end 81 of the fitting 80. The circlip assembly 90 is configured to attach the fitting 80 and the stop valve 98 together. The circlip assembly 90 comprises a compression connector or nut 92, a locking ring or circlip 94, a cone washer 96, and a cone seal 97.

As shown in FIG. 11B, the circlip 94 includes a flat spring ring that is split or includes a discontinuity or space defined at one point along its perimeter to allow the circlip 94 to radially expand onto the fitting 80 and compress into the fitting 80. As shown in FIG. 11E, the circlip 94 is configured to be positioned or retained within the recess 87 of the fitting 80 and compressed between the recess 87 and the compression nut 92. The washer 96 is configured to be positioned around at least a portion of the outer side of the circlip 94 and axially between the circlip 94 and the cone seal 97. The cone seal 97 is positioned axially between the cone seal 97 and the first end 81 of the fitting 80 and extends along the outer surface of the fitting 80. The circlip 94, the washer 96, and the cone seal 97 are all positioned within the compression nut 92, radially between the compression nut 92 and the outer surface of the fitting 80. The compression nut 92 extends axially beyond the circlip 94 and the cone seal 97 on opposite sides. The compression nut 92 comprises internal threads that are configured to engage with external threads of the stop valve 98. In one embodiment, the inner diameter of the compression nut 92 may be approximately ½ inches, and the compression nut 92 may be a CPVC nut. In alternative or additional constructions, instead of or in conjunction with the full circlip assembly 90, the outlet box assembly 20 may instead include the compression nut 92 with either the ferrule 194 or the o-ring 294, as described further herein.

To attach the stop valve 98 and the fitting 80 together, an end of the stop valve 98 is positioned radially over the first end 81 of the fitting 80 and between the outer surface of the fitting 80 (and the outer surface of the cone seal 97) and the inner surface 91 of the compression nut 92. The internal threads of the compression nut 92 thread or screw onto the external threads of the stop valve 98, thereby pressing the stop valve 98 against the outer surface of the cone seal 97. This configuration allows the compression nut 92 to attach the fitting 80 and the stop valve 98 together. The fitting 80 and the stop valve 98 (and optionally the circlip assembly 90) together form a valve assembly.

To assemble the outlet box assembly 20, the adapter 70 is inserted into the base through-hole 33 from the second base side 32 of the base 30. The connector body 53 of the connector 50 is positioned over the adaptor 70 (from the first base side 31 of the base 30), and the internal threads 58 of the connector body 53 are engaged with the external threads 78 of the adapter 70. Prior to either engaging the internal threads 58 of the connector body 53 with the external threads 78 of the adapter 70 or connecting the connector body 53 to the adapter 70, the fitting 80 (or the tubing 12, according to various embodiments) is inserted into the connection assembly 49 and is axially and/or rotationally moved to its optimal position relative to the base 30 and the wall 11. Once the fitting 80 (or the tubing 12) is optimally positioned, the connector 50 is then completely secured to the adapter 70 by fully screwing the connector 50 onto the adapter 70, which radially compresses the adapter 70 along the slots 77. The adapter 70 thus radially compresses the fitting 80 (or the tubing 12), thereby securing the fitting 80 (or the tubing 12) in place.

Outlet Box Assembly with Bent Tubing

FIGS. 12A-18 show another embodiment of an outlet box assembly 120. The outlet box assembly 120 includes all of the various features, aspects, and components of the outlet box assemblies 20, 220, 320, and 420 (as described further herein), unless noted otherwise in the description herein. For example, the outlet box assembly 120 also includes at least the protective cover 24, the escutcheon 26, the stop valve 98, the base 30, and the connection assembly 49 (with the connector 50 and the adapter 70), each of which are described further herein. The outlet box assembly 220 may also include other components, including but not limited to at least one of the support structures 140.

However, instead of receiving a fitting 80 (that attaches to the tubing 12) within the adapter 70, the outlet box assembly 120 includes a tubing 12 that is a curved tubing 112 that is configured to be received in the adapter through-hole 76 of the adapter 70. The curved tubing 112 includes all the various features, aspects, and components of the tubing 12, unless noted otherwise in the description herein. According to one embodiment, the curved tubing 112 is a copper pipe, stub-out, or tube and may optionally be PEX or flexible piping.

Figure 13:
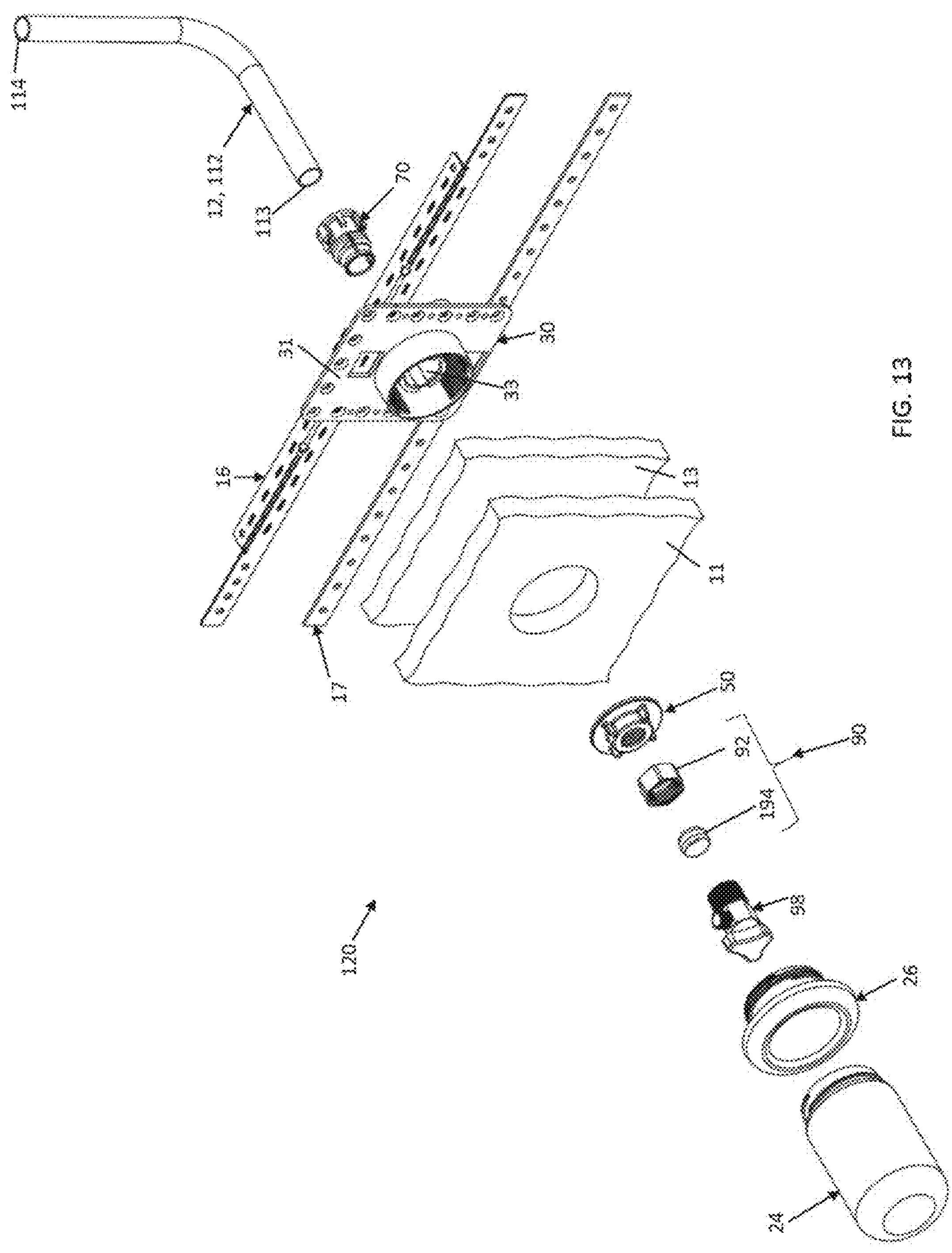
FIG. 13 is an exploded view of the outlet box assembly of FIG. 12A.
Figures 14A, 14B:
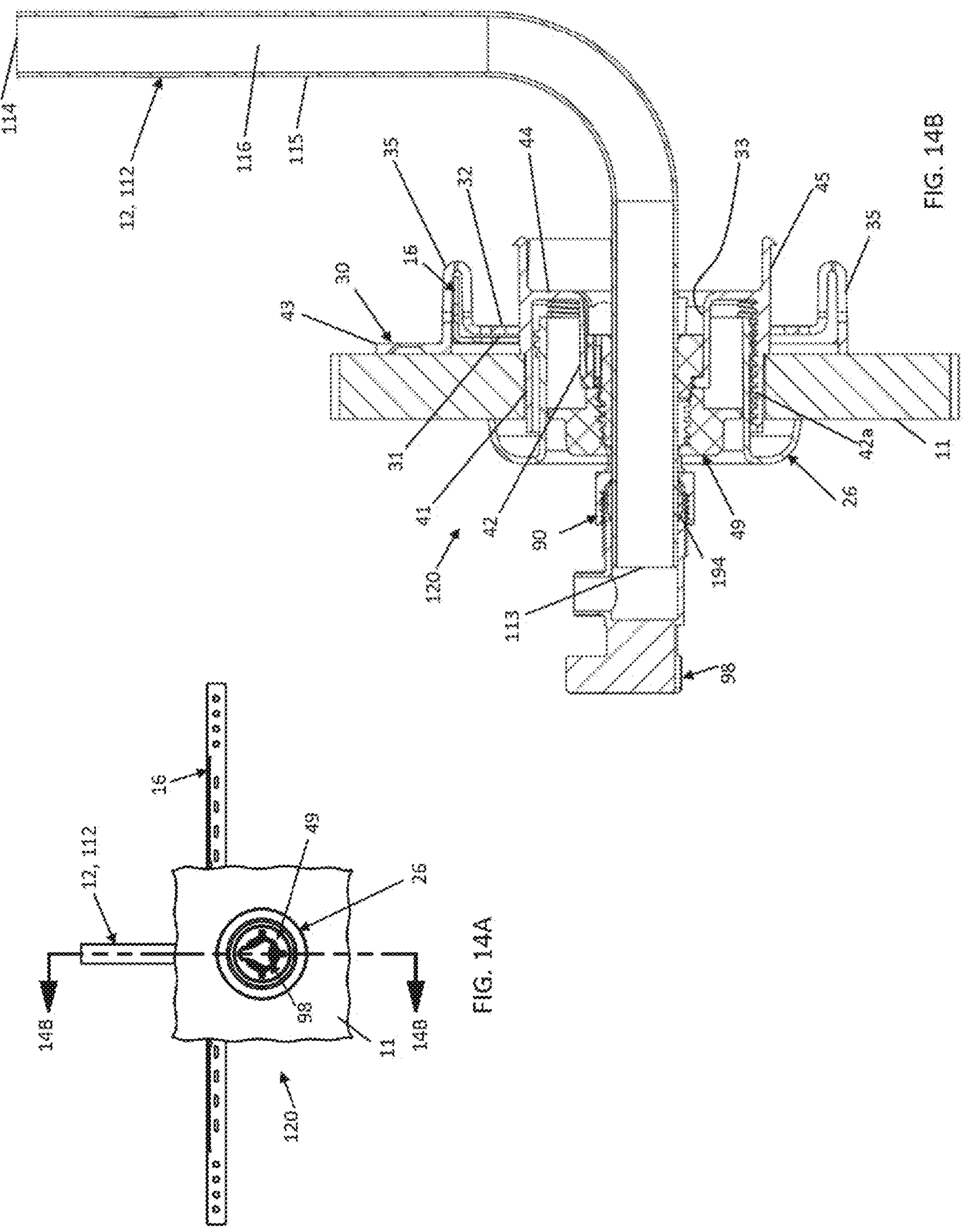
FIG. 14A is a front view of the outlet box assembly of FIG. 12A.
FIG. 14B is a cross-sectional view along Section 14B-14B of FIG. 14A.
Figure 15:
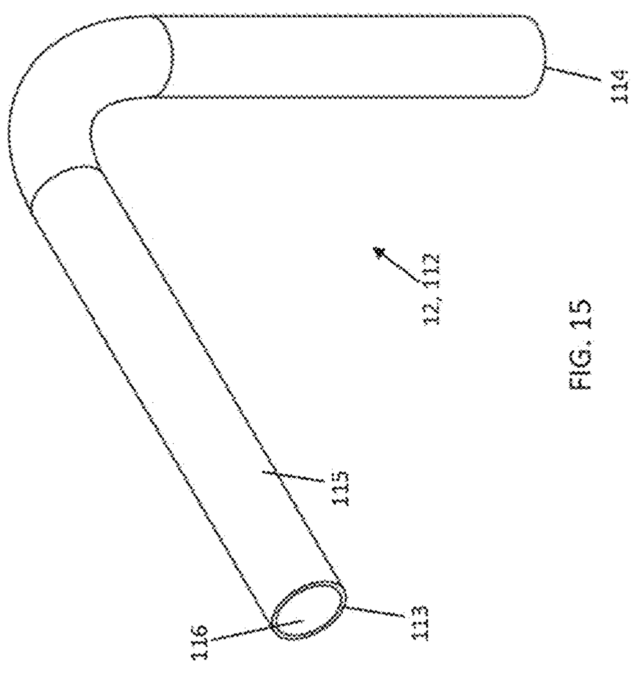
FIG. 15 is a perspective view of a curved tubing of the outlet box assembly of FIG. 12A.

As shown in FIGS. 13, 14B, and 15, the curved tubing 112 extends between a first end 113 and a second end 114 and comprises a tubing wall 115 that defines a tubing passage 116 extending between the first end 113 and the second end 114. The curved tubing 112 has a curve or bend along its length between the first end 113 and the second end 114 to form a L-shape such that the portion of the tubing passage 116 at the first end 113 extends approximately 90° to the portion of the tubing passage 116 at the second end 114. Since the curved tubing 112 is instead directly received and positioned within the adapter 70, the inner surface of the adapter 70 directly abuts the outer surface of the tubing wall 115 of the curved tubing 112. Accordingly, when the connector 50 radially compresses the adapter 70, the adapter 70 radially compresses the curved tubing 112 (as described further herein) to secure the curved tubing 112 relative to the base 30 and the wall 11.

Figure 16:
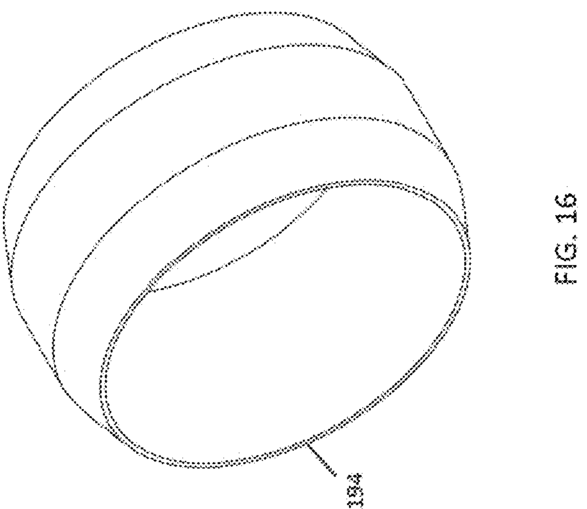
FIG. 16 is a perspective view of a ferrule of the outlet box assembly of FIG. 12A.

In FIGS. 13, 14B, and 15, instead of using the entire circlip assembly 90 to attach to the stop valve 98, the outlet box assembly 120 comprises the compression nut 92 (as described further herein) and a rounded ring or ferrule 194, as shown in FIGS. 13, 14B, and 16. As shown in FIG. 16, the ferrule 194 includes a through-hole. The outer surface of the ferrule 194 is rounded with a convex shape.

As shown in FIG. 14B, the compression nut 92 and the ferrule 194 are configured to be positioned along the first end 113 of the curved tubing 112 (that is positioned along the first base side 31). The ferrule 194 is positioned radially between the compression nut 92 and the outer surface of the curved tubing 112. To attach to the stop valve 98, an end of the stop valve 98 is inserted radially over the ferrule 194, radially between the outer surface of the ferrule 194 and the inner surface of the compression nut 92. The stop valve 98 and the compression nut 92 are screwed together, as described further herein. However, instead of the ferrule 194, the outlet box assembly 120 may include the circlip assembly 90 or the o-ring 294, as described further herein.

Figures 17, 18:
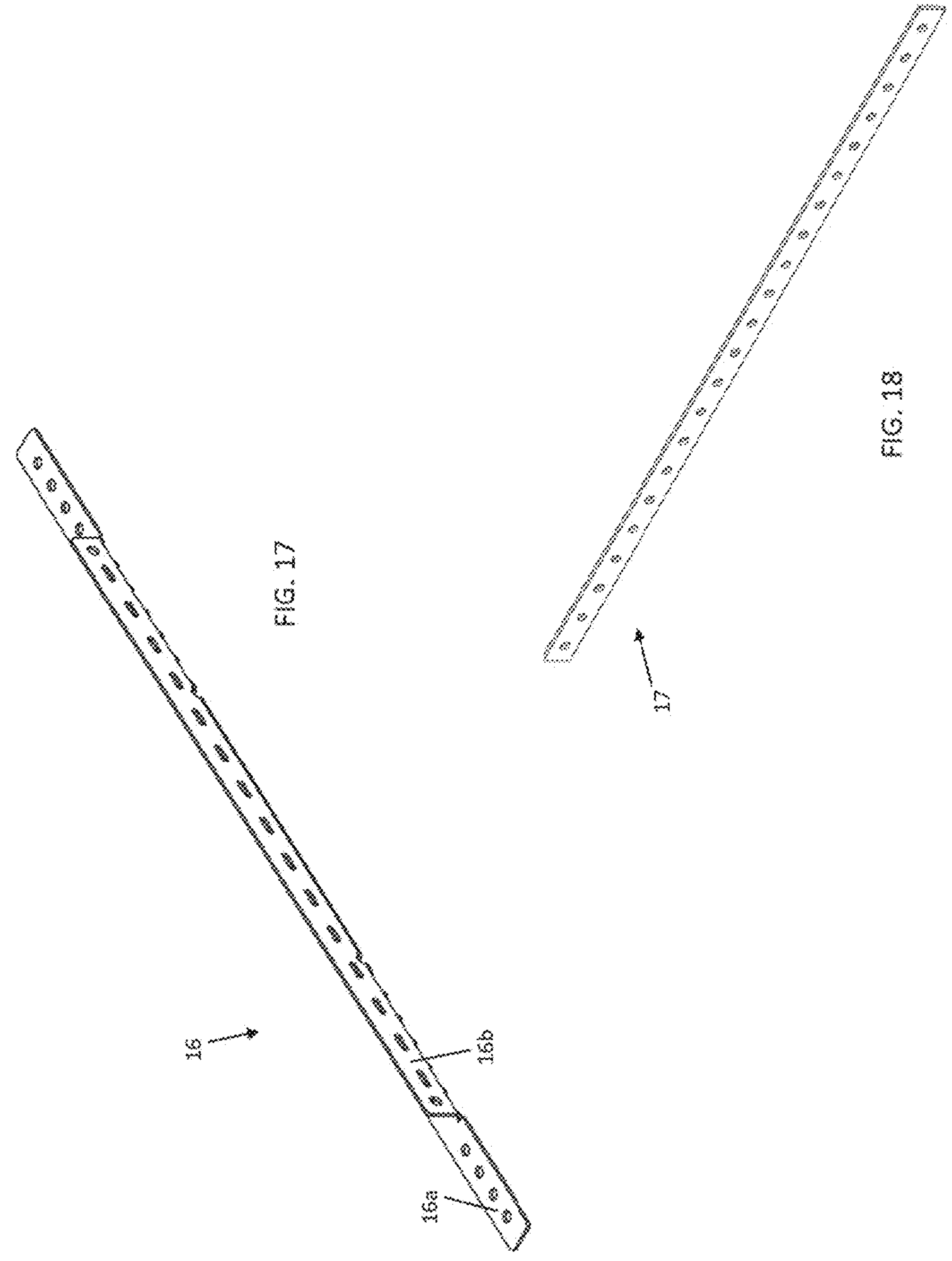
FIG. 17 is a perspective view of a first bracket of the outlet box assembly of FIG. 12A.
FIG. 18 is a perspective view of a second bracket of the outlet box assembly of FIG. 12A.
Figures 19A, 19B:
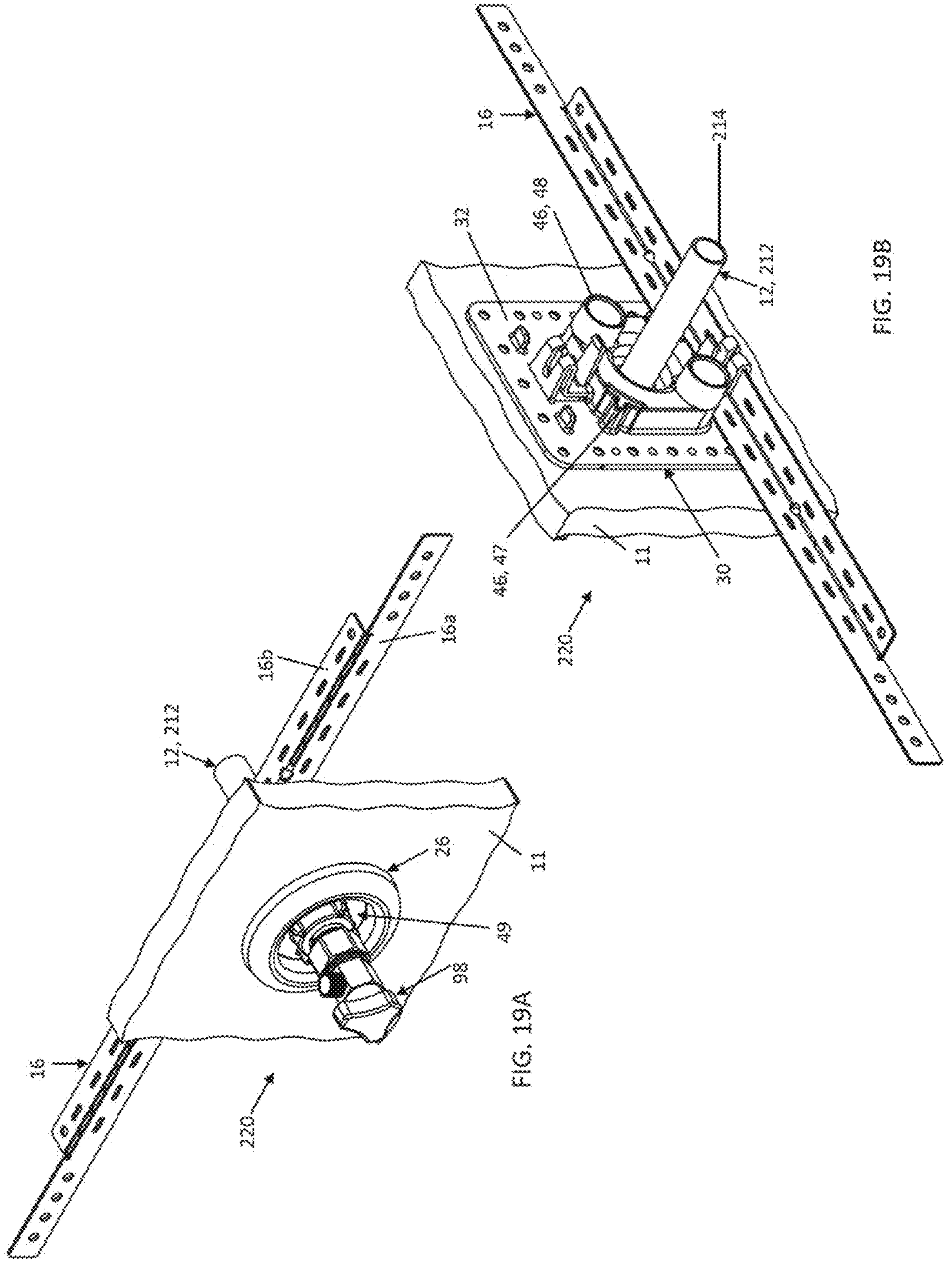
FIG. 19A is a front, perspective view of an outlet box assembly according to another embodiment.
FIG. 19B is a back, perspective view of the outlet box assembly of FIG. 19A.

According to one embodiment, the outlet box assembly 120 may include two brackets 16 that are positioned above and below the base through-hole 33 (as described further herein). Alternatively, as shown in FIG. 13, the outlet box assembly 120 may include one first bracket 16 (as described further herein) and one second bracket 17 that is a HYCO bar positioned above and below the base through-hole 33, respectively. The configuration of the first bracket 16 is shown in FIG. 17 and described further herein. As shown in FIG. 18, the second bracket 17 is a flat bar (without the L-shape). Both of the brackets 16, 17 have a plurality of holes along their length to attach to both the base 30 and to the studs 15 along opposite ends. Any of the other outlet box assemblies 20, 220, 320, 420 may also include a similar configuration and components, dependent on the desired configuration and use.

Outlet Box Assembly with Straight Tubing

FIGS. 19A-22 show another embodiment of an outlet box assembly 220. The outlet box assembly 220 includes all of the various features, aspects, and components of the outlet box assemblies 20, 120, 320, and 420 (as described further herein), unless noted otherwise in the description herein. For example, the outlet box assembly 220 also includes at least the protective cover 24, the escutcheon 26, the stop valve 98, the base 30, and the connection assembly 49 (with the connector 50 and the adapter 70), each of which are described further herein. The outlet box assembly 220 may also include other components, including but not limited to at least one of the support structures 140.

However, instead of receiving a fitting 80 (that attaches to the tubing 12) or the curved tubing 112 within the adapter 70, the outlet box assembly 220 includes a tubing 12 that is a straight tubing 212 that is configured to be received in the adapter through-hole 76 of the adapter 70. The straight tubing 212 includes all the various features, aspects, and components of the tubing 12, unless noted otherwise in the description herein. According to one embodiment, the straight tubing 212 is a CPVC pipe, stub-out, or tube and may optionally be PEX or flexible piping. In one embodiment, the inner diameter of the straight tubing 212 may be approximately ½ inch.

Figures 21A, 21B:
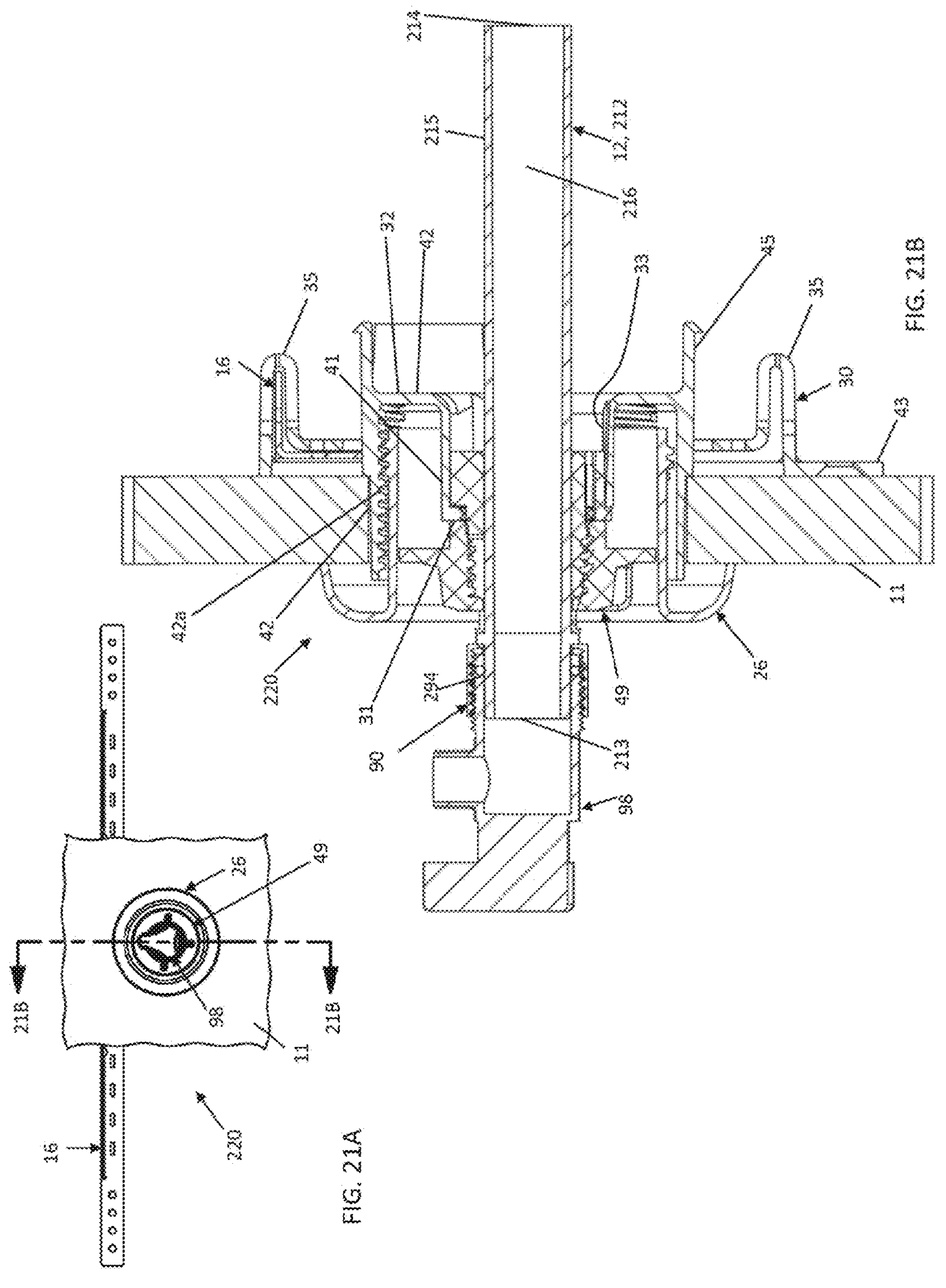
FIG. 21A is a front view of the outlet box assembly of FIG. 19A.
FIG. 21B is a cross-sectional view along Section 21B-21B of FIG. 21A.
Figure 22:
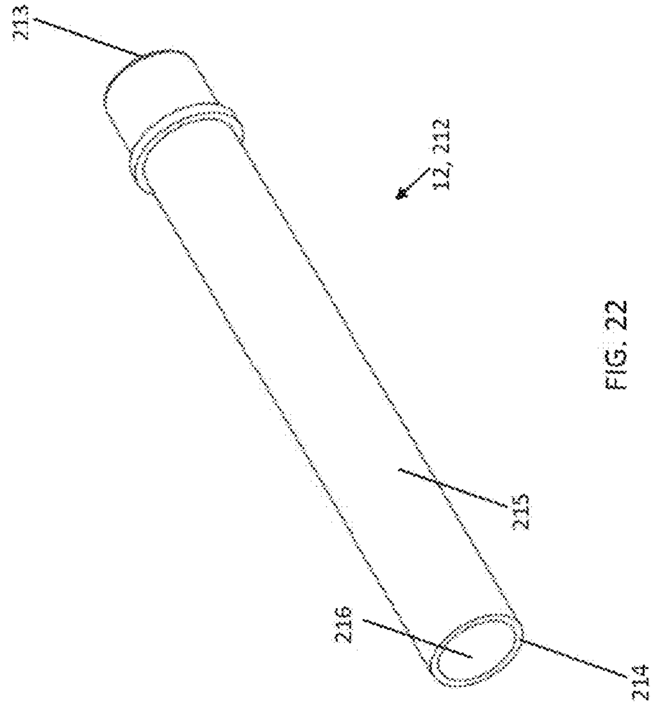
FIG. 22 is a perspective view of a straight tubing of the outlet box assembly of FIG. 19A.
Figures 23A, 23B, 23C:
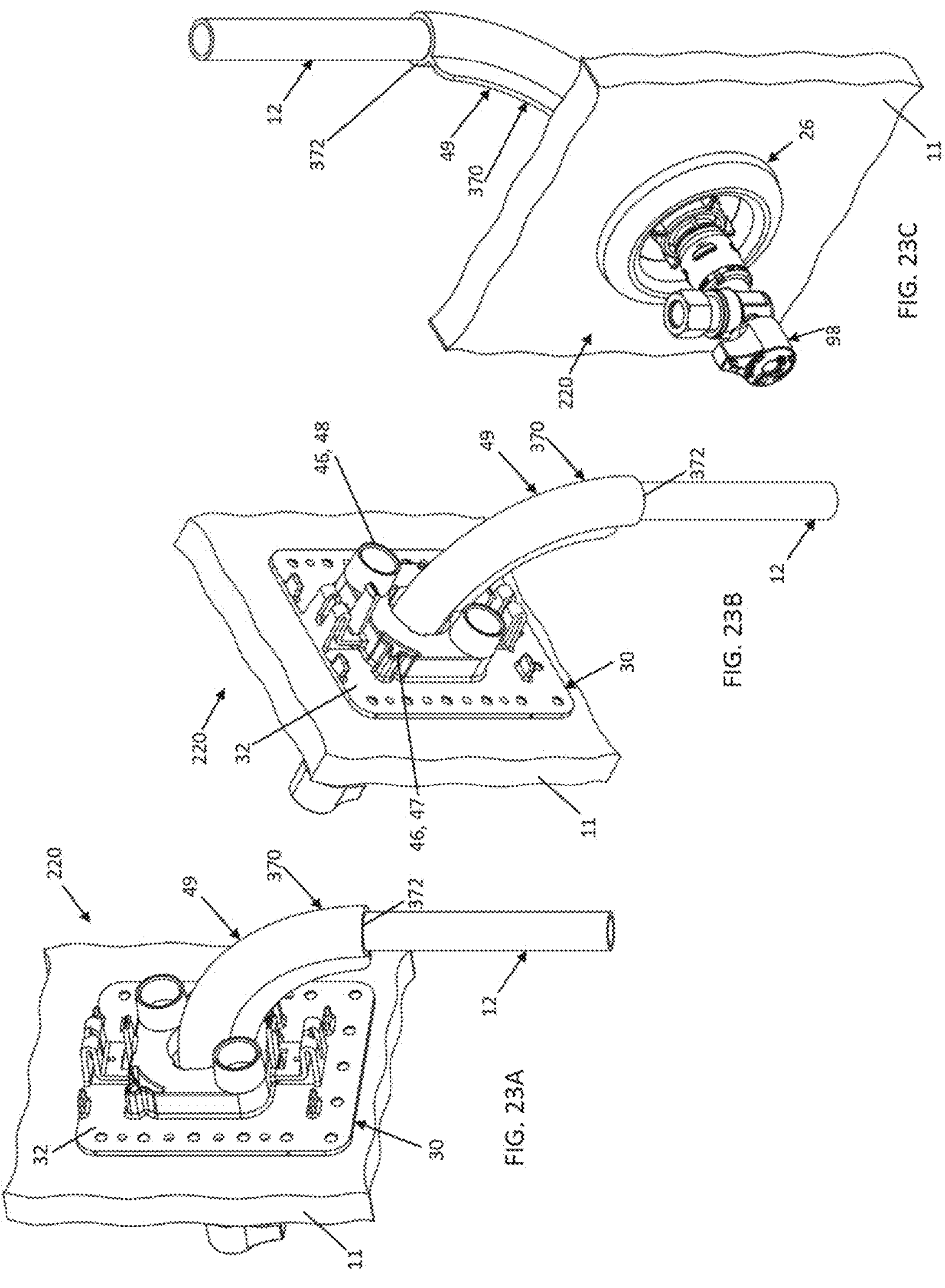
FIG. 23A is a back, perspective view of an outlet box assembly according to another embodiment.
FIG. 23B is a back, top perspective view of the outlet box assembly of FIG. 23A.
FIG. 23C is a front, top perspective view of the outlet box assembly of FIG. 23A.

As shown in FIGS. 21B-22, the straight tubing 212 extends between a first end 213 and a second end 214 and comprises a tubing wall 215 that defines a tubing passage 216 extending in a straight manner or line between the first end 213 and the second end 214. The straight tubing 212 may include a circumferential protrusion near the first end 213. Since the straight tubing 212 is instead directly received and positioned within the adapter 70 (as shown in FIG. 21B), the inner surface of the adapter 70 directly abuts the outer surface of the tubing wall 215 of the straight tubing 212. Accordingly, when the connector 50 radially compresses the adapter 70, the adapter 70 radially compresses the straight tubing 212 (as described further herein) to secure the straight tubing 212 relative to the base 30 and the wall 11.

Figure 20:
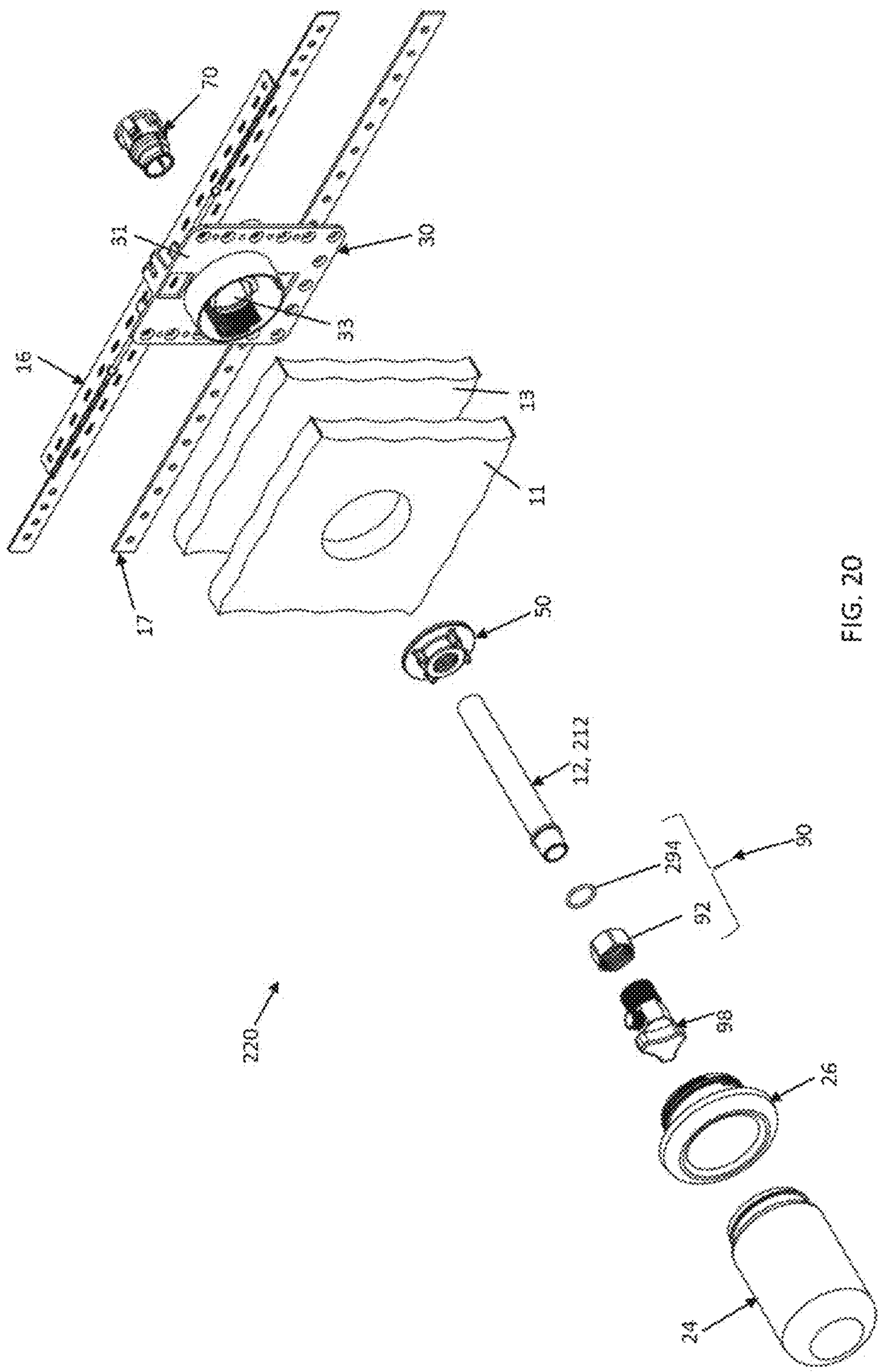
FIG. 20 is an exploded view of the outlet box assembly of FIG. 19A.

As indicated in FIGS. 20-22, instead of using the entire circlip assembly 90 to attach to the stop valve 98, the outlet box assembly 220 comprises the compression nut 92 (as described further herein) and a seal member, such as an o-ring 294, as shown in FIG. 20. As shown in FIG. 21B, the compression nut 92 and the o-ring 294 are configured to be positioned along the first end 213 of the straight tubing 212 (that is positioned along the first base side 31). The o-ring 294 is positioned radially between the compression nut 92 and the outer surface of the straight tubing 212. To attach to the stop valve 98, an end of the stop valve 98 is inserted radially between the outer surface of the straight tubing 212 and the inner surface of the compression nut 92. The stop valve 98 and the compression nut 92 are screwed together, as described further herein, until the end of the stop valve 98 presses the o-ring 294 up against an inner edge of the compression nut 92. However, instead of the o-ring 294, the outlet box assembly 220 may instead include the circlip assembly 90 or the ferrule 194, as described further herein.

Outlet Box Assembly with Turn-Out Support

FIGS. 23A-28B show another embodiment of an outlet box assembly 320. The outlet box assembly 320 includes all of the various features, aspects, and components of the outlet box assemblies 20, 120, 220, and 420 (as described further herein), unless noted otherwise in the description herein. For example, the outlet box assembly 320 also includes at least the protective cover 24, the escutcheon 26, the stop valve 98, the base 30, and the connection assembly 49 (with the connector 50 and the adapter 70), each of which are described further herein. The outlet box assembly 220 may also include other components, including but not limited to at least one of the support structures 140.

However, instead of receiving a fitting 80 (that attaches to the tubing 12), the connection assembly 49 of the outlet box assembly 320 further includes a turn-out support 370. The support elbow, PEX turn-out, pipe holder, or turn-out support 370 extends from and is a single piece with the adapter 70 (such that the turn-out support 370 and the adapter 70 together form a turn-out support assembly). In particular, the turn-out support 370 and the adapter 70 are constructed as a single-piece, in particular as a single, unitary, integral component that cannot be separated without destruction. The turn-out support 370 and the adapter 70 are together configured to directly receive a portion of the tubing 12 (including PEX pipe or other flexible tubing). When the adapter 70 is positioned within the base through-hole 33 and when the connector 50 is not secured on the adapter 70, the adapter 70 and the turn-out support 370 are rotatable together relative to the base 30 to position the tubing 12 relative to the base 30 and the wall 11. Accordingly, the turn-out support 370 is configured to attach to the base through-hole 33 via the adapter 70 (as described further herein).

As shown in FIGS. 26B-28B, the turn-out support 370 extends between a first end 371 and a second end 372. The first end 371 directly abuts and continues into the second adapter end 72, as a single, continuous component with the adapter 70. The turn-out support 370 further includes a turn-out support wall 375 that defines a turn-out support through-hole or passage 376 extending between the first end 371 and the second end 372.

Figure 24:
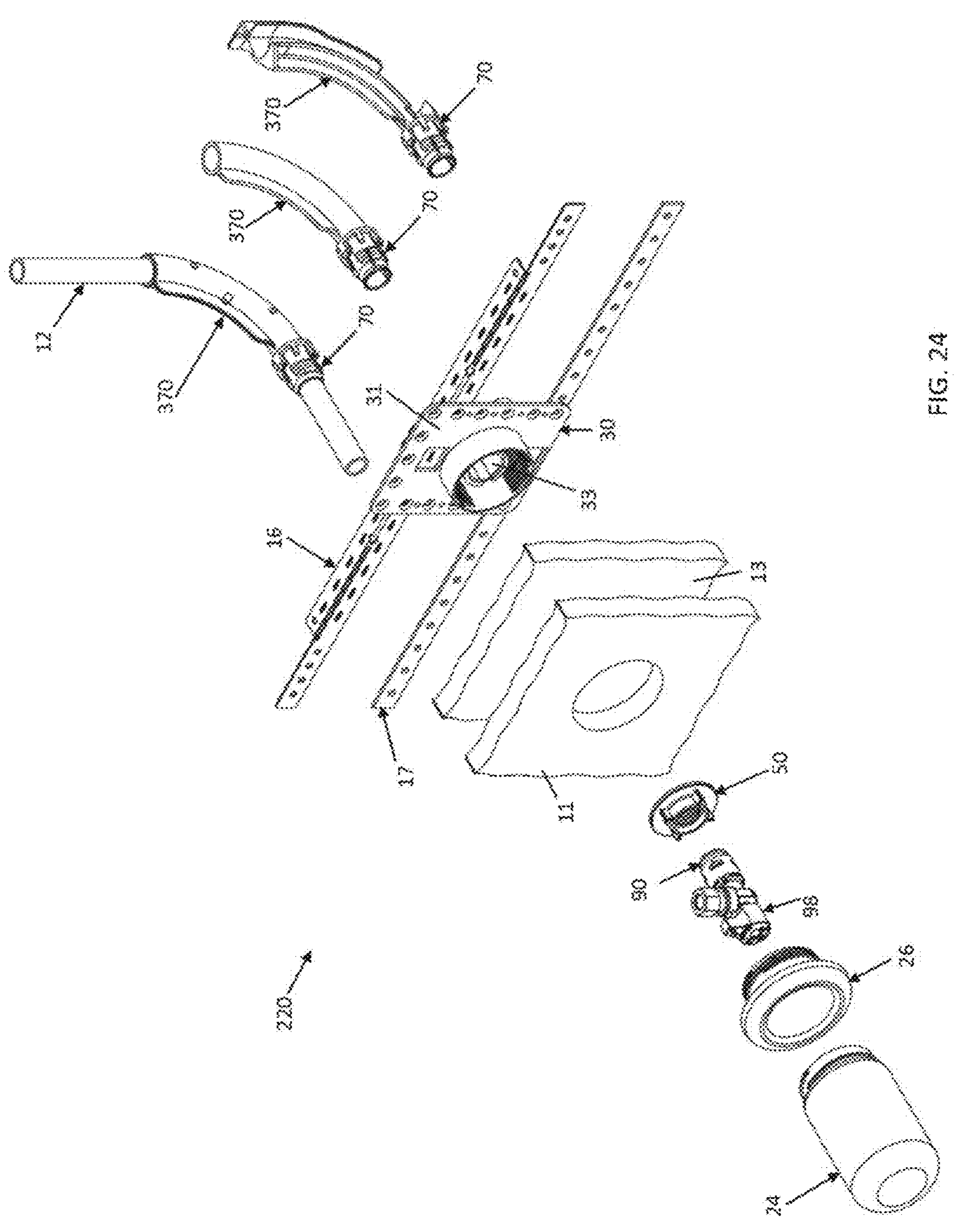
FIG. 24 is an exploded view of the outlet box assembly of FIG. 23A.
Figure 25B:
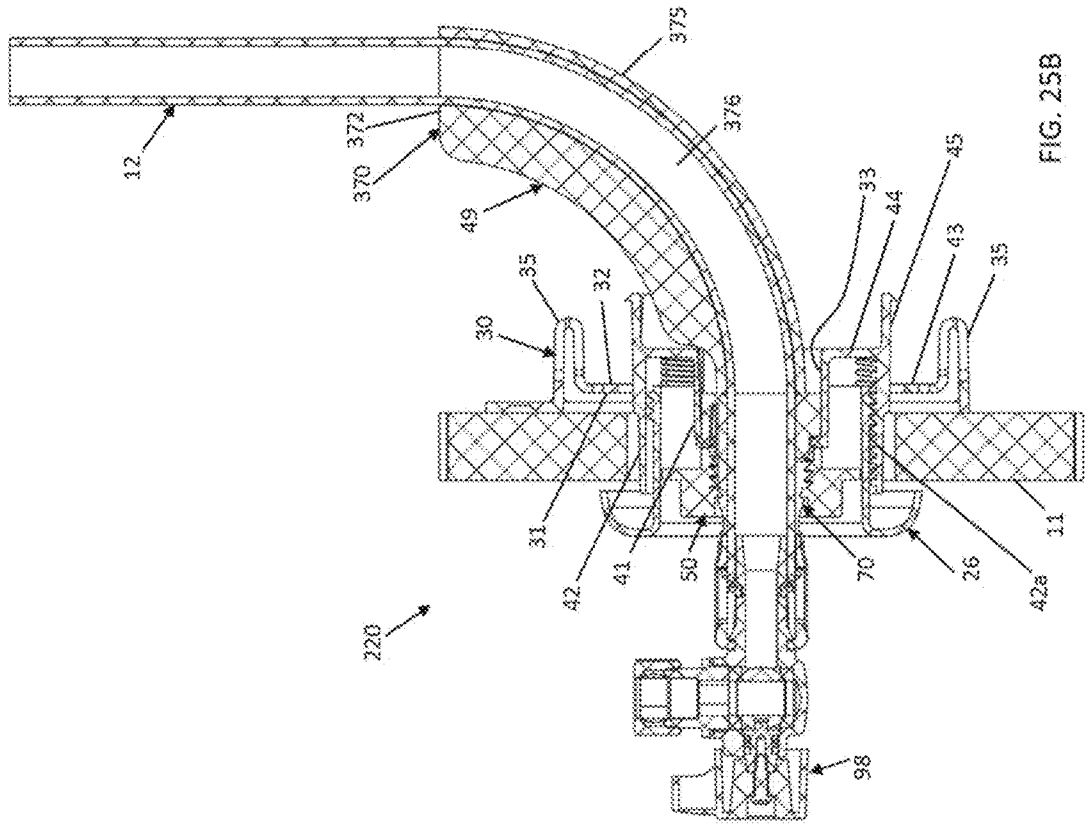
FIG. 25B is a cross-sectional view through Section 25B-25B of FIG. 25A.
Figure 25A:
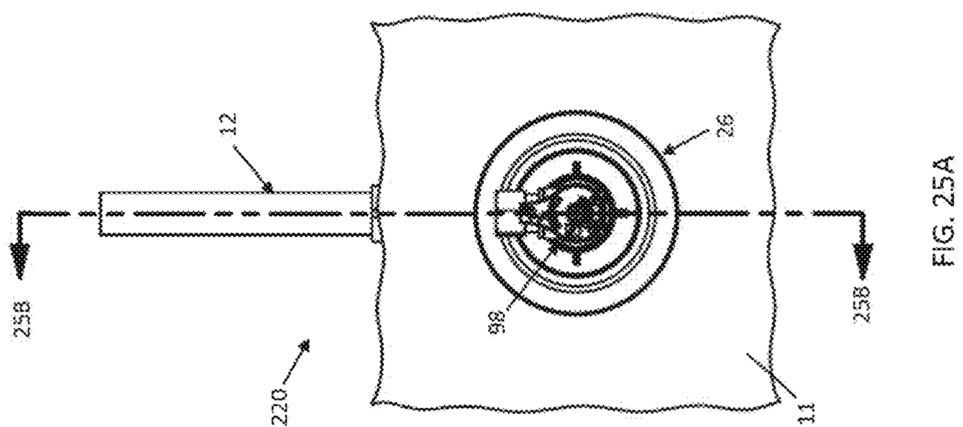
FIG. 25A is a front view of the outlet box assembly of FIG. 23A.
Figure 26B:
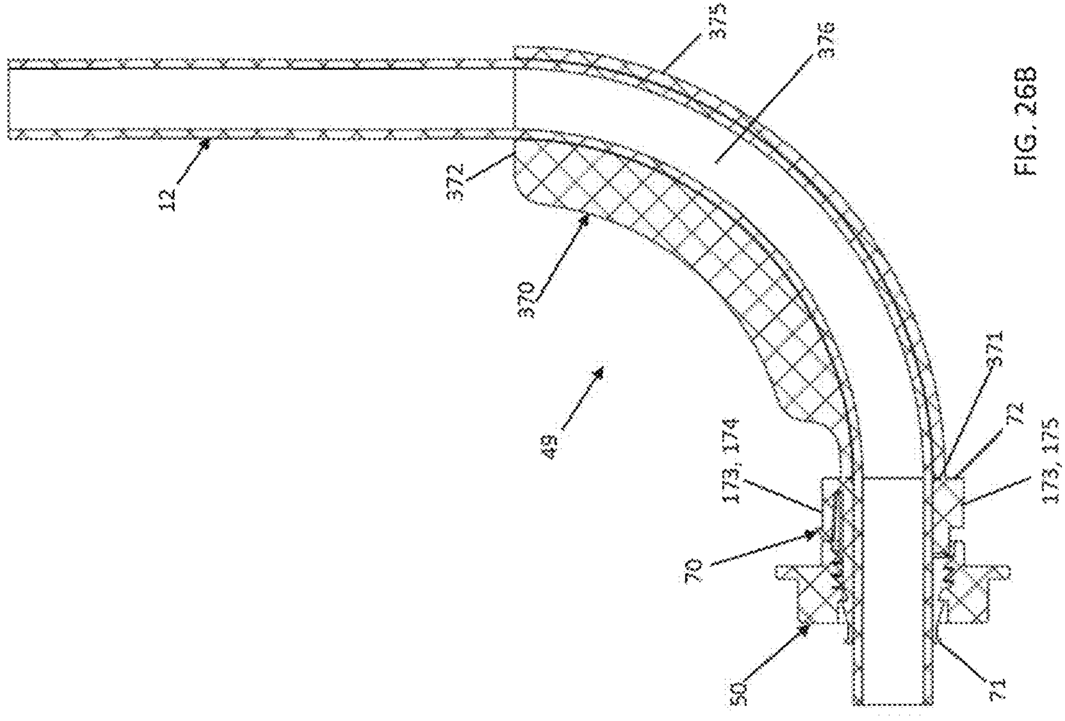
FIG. 26B is a cross-sectional view through Section 26B-26B of FIG. 26A.
Figure 26A:
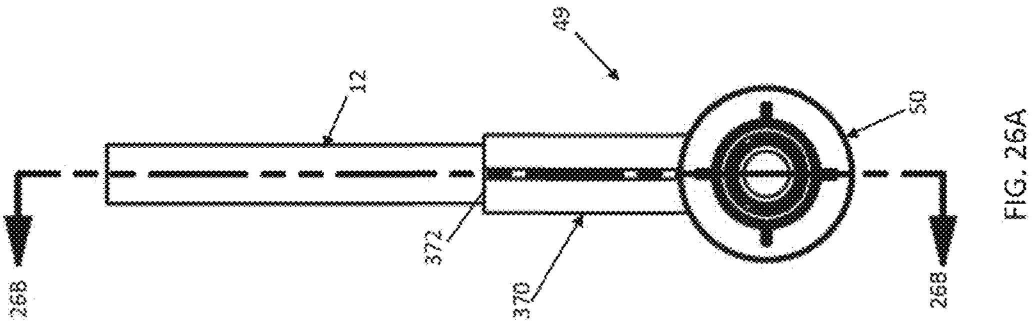
FIG. 26A is a front view of a connection assembly of the outlet box assembly of FIG. 23A.
Figures 27, 28A, 28B:
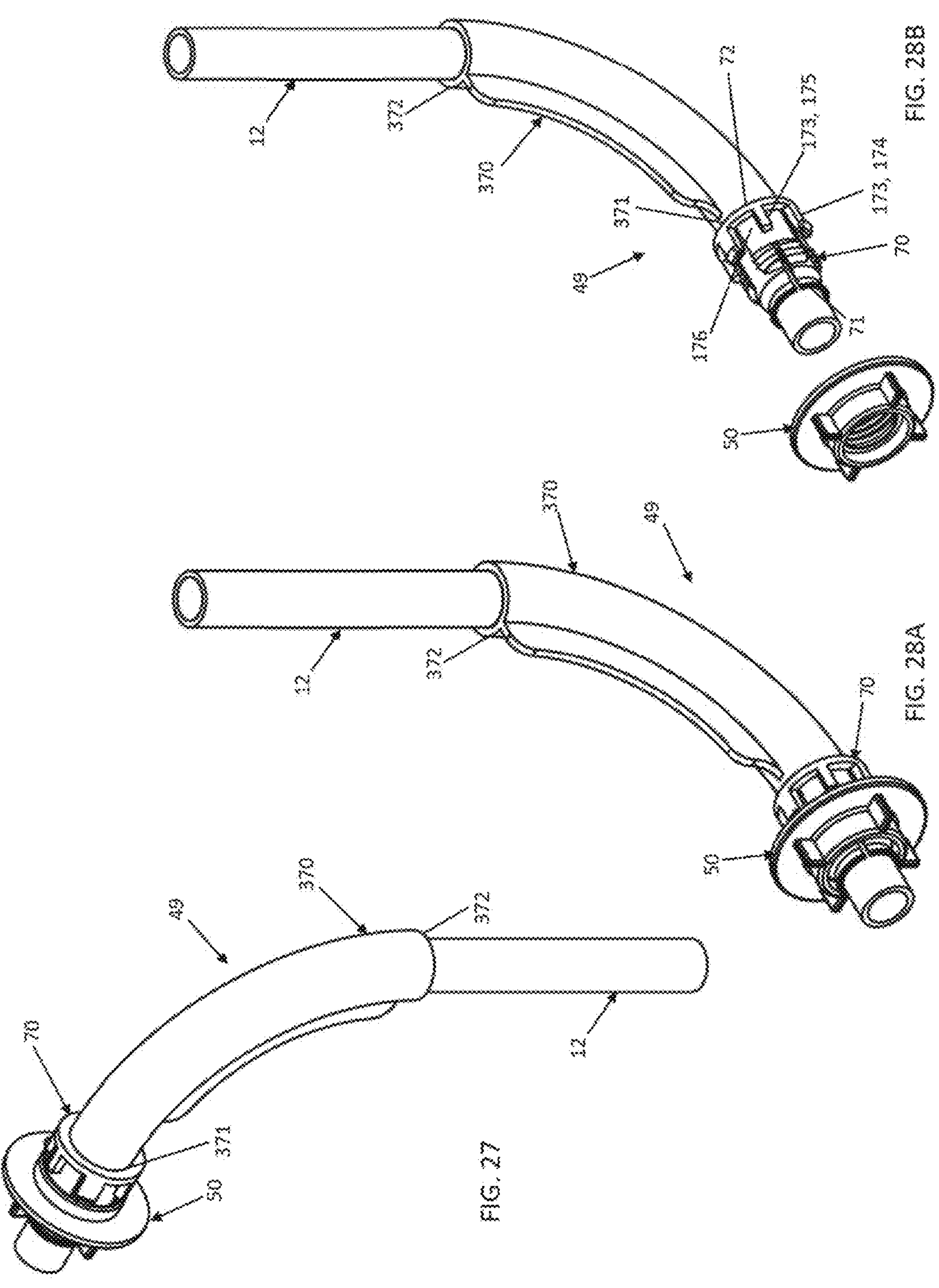
FIG. 27 is a back, perspective view of the connection assembly of FIG. 26A.
FIG. 28A is a front, perspective view of the connection assembly of FIG. 26A.
FIG. 28B is an exploded view of the connection assembly of FIG. 26A.
Figures 29A, 29B, 29C:
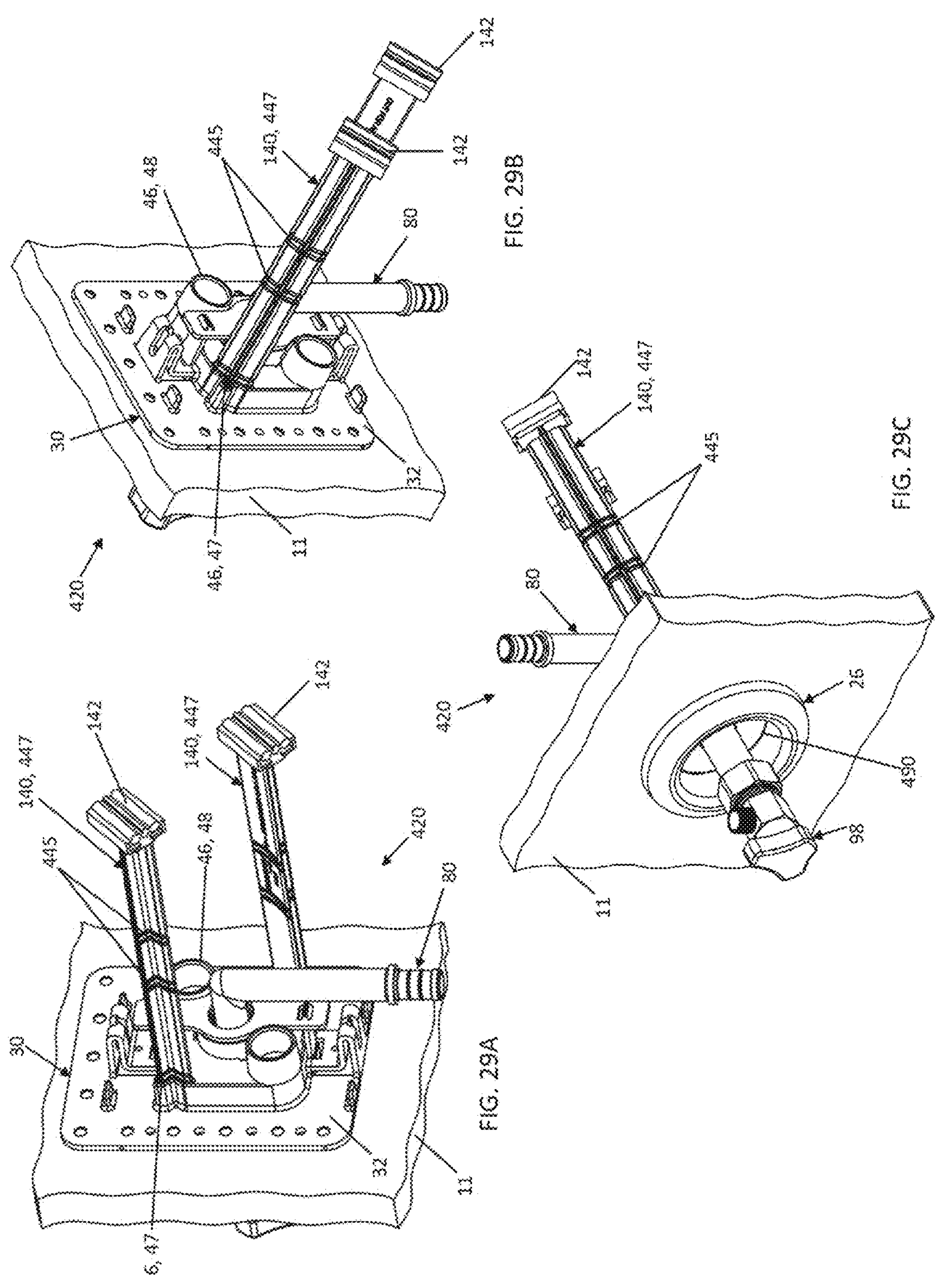
FIG. 29A is a back, perspective view of an outlet box assembly according to another embodiment.
FIG. 29B is a back, top perspective view of the outlet box assembly of FIG. 29A.
FIG. 29C is a front, top perspective view of the outlet box assembly of FIG. 29A.
Figure 30:
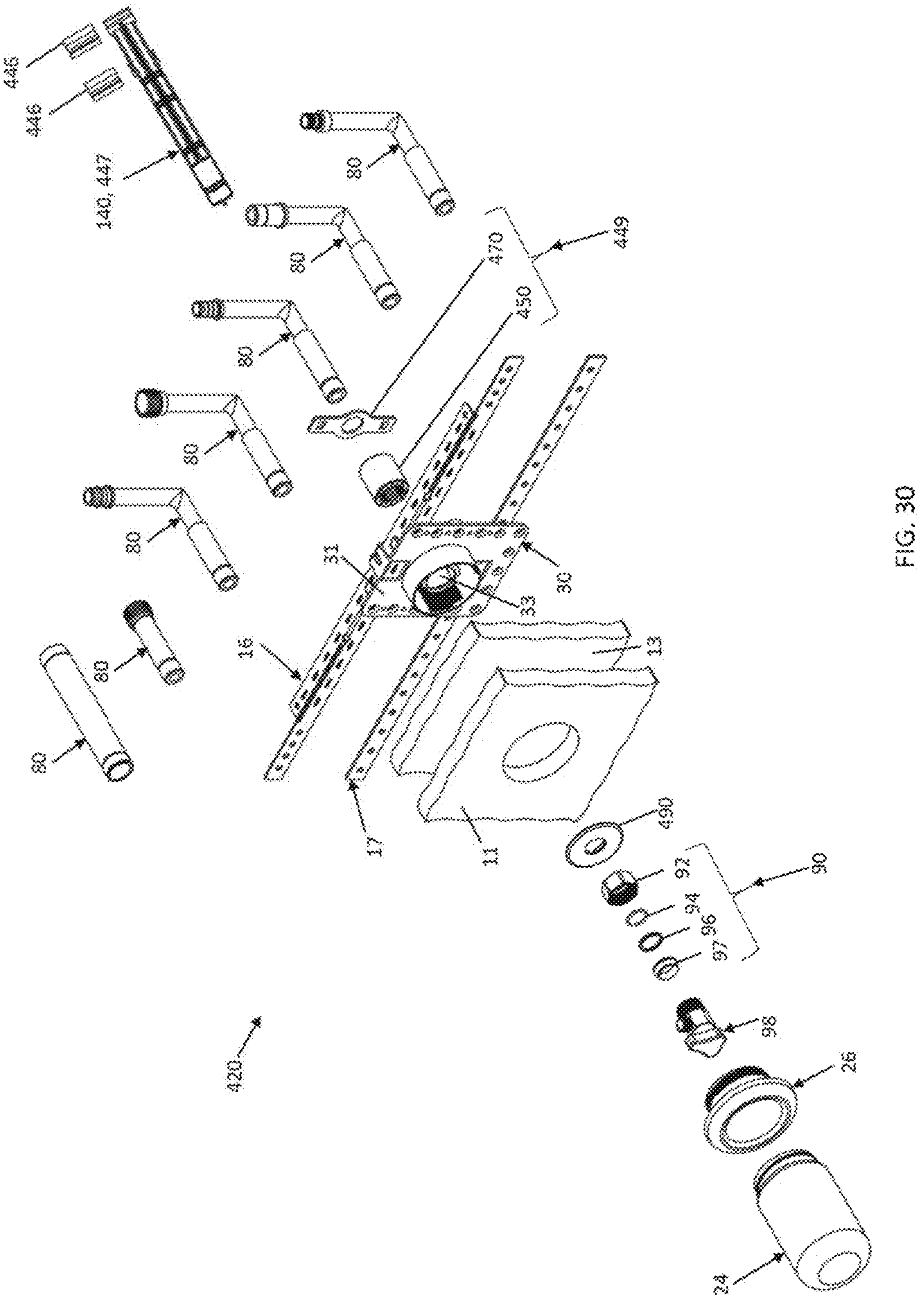
FIG. 30 is an exploded view of the outlet box assembly of FIG. 29A.
Figures 31A, 31B:
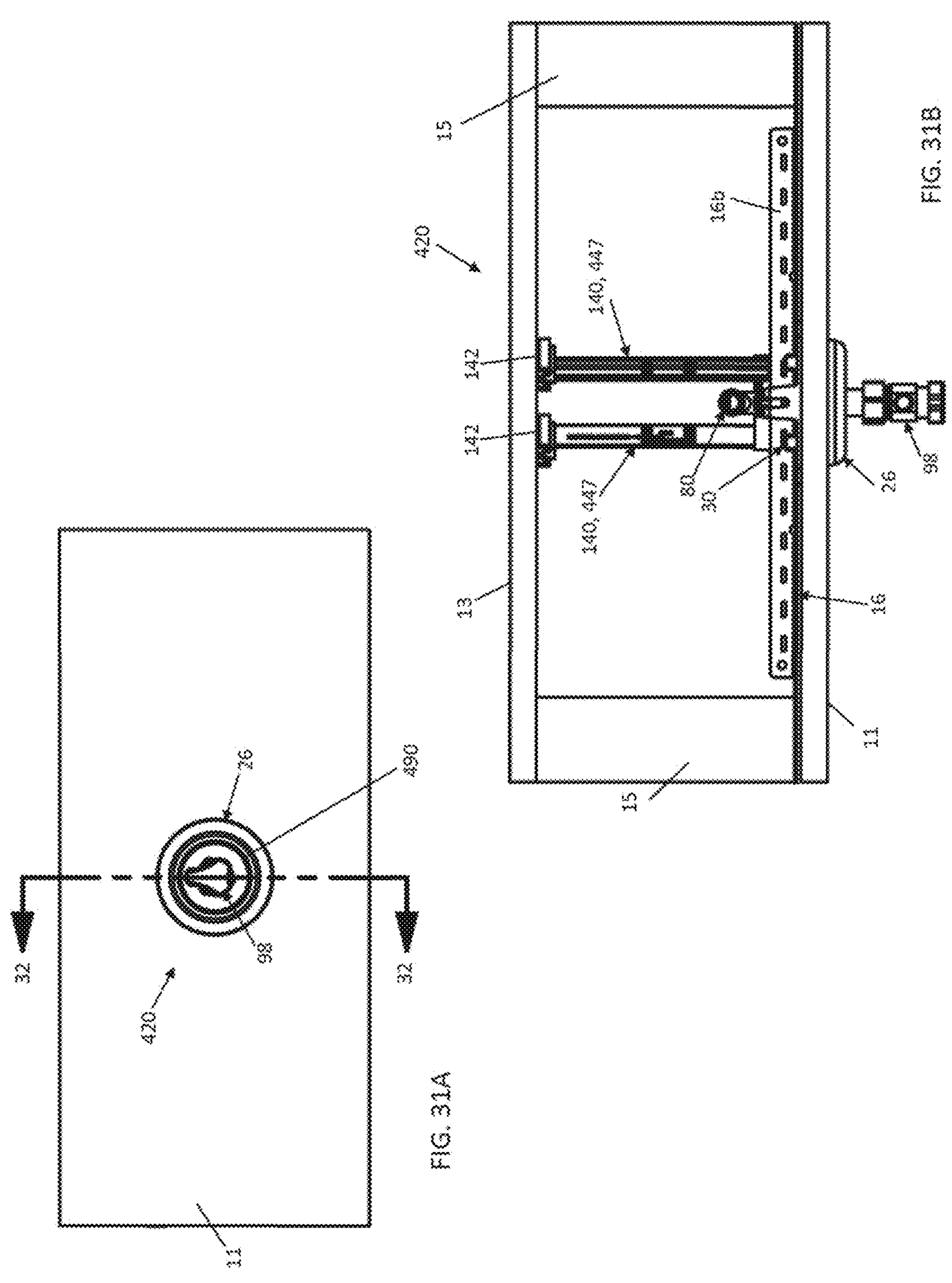
FIG. 31A is a front view of the outlet box assembly of FIG. 29A.
FIG. 31B is a top view of FIG. 31A.

The turn-out support passage 376 is configured to radially align with the base through-hole 33 along the first end 371 of the turn-out support 370. As shown in FIG. 25B, the turn-out support passage 376 (with the adapter through-hole 76) is sized and configured to receive the tubing 12 such that the tubing 12 extends through the turn-out support passage 376 and the adapter through-hole 76. Accordingly, the inner surface 74 of the adapter 70 and the inner surface of the turn-out support 370 both directly abut the outer surface of the tubing 12. As shown in FIGS. 27-28B, the adaptor 70 is still attachable to and radially compressible by the connector 50, as described further herein. FIG. 24 shows various embodiments of the PEX turn-out supports 370 that can be used within the outlet box assembly 320.

As shown in FIGS. 25B and 26B-28B, the turn-out support 370 has a curve or bend along its length between the first end 371 and the second end 372 to form a L-shape such that a first portion of the turn-out support passage 376 at the first end 371 extends approximately 90° to a second portion of the turn-out support passage 376 at the second end 372. Accordingly, the turn-out support 370 directs the tubing 12 to have the same curvature and bend radius.

Outlet Box Assembly with Acoustic Isolation

FIGS. 29A-42B show another embodiment of an outlet box assembly 420 that is configured to acoustically isolate the plumbing system from other building structures (due to the elastomeric assembly 449 and the support structure 140 that is an acoustic support structure). The outlet box assembly 420 includes all of the various features, aspects, and components of the outlet box assemblies 20, 120, 220, and 320 (as described further herein), unless noted otherwise in the description herein. For example, the outlet box assembly 420 includes at least the protective cover 24, the escutcheon 26, the stop valve 98, the base 30, the circlip assembly 90, the stop valve 98, the support structure 140 (which may optionally be a different type of support structure 140 than in the outlet box assembly 20), and the fitting 80, each of which are described further herein.

However, instead of including the connection assembly 49, the outlet box assembly 420 includes an isolator, acoustic, or elastomeric assembly 449. The elastomeric assembly 449 includes an elastomeric insert 450, a retainer 470, and a bezel 490. As shown in FIG. 32, the elastomeric insert 450 (also referred to as an elastomer, elastomeric bushing, or elastomeric fitting) is sized and configured to be at least partially positioned within the base through-hole 33 to attach, support, and secure the fitting 80 (or the tubing 12, according to various embodiments) to the outlet box assembly 420. The retainer 470 and the bezel 490 may be positioned at least partially outside of (and on opposite sides of) the base through-hole 33.

The elastomeric insert 450 extends longitudinally (along its length) between a first end 451 (that is axially closer to the first base side 31) and a second end 452 (that is axially closer to or positioned along the second base side 32), as shown in FIG. 32. The elastomeric insert 450 may be inserted into the base through-hole 33 from the second base side 32 toward the first base side 31 such that the first end 451 abuts against the stop wall 39 of the base 30 (where the inner diameter of the stop wall 39 is smaller than the outer diameter of the elastomeric insert 450). The material of the elastomeric insert 450 is sufficiently soft to absorb vibrations, thereby preventing vibrations or noise from being transferred or transmitted between the rest of the outlet box assembly 420 and the fitting 80 (or the tubing 12).

Figures 33A, 33B, 33C:
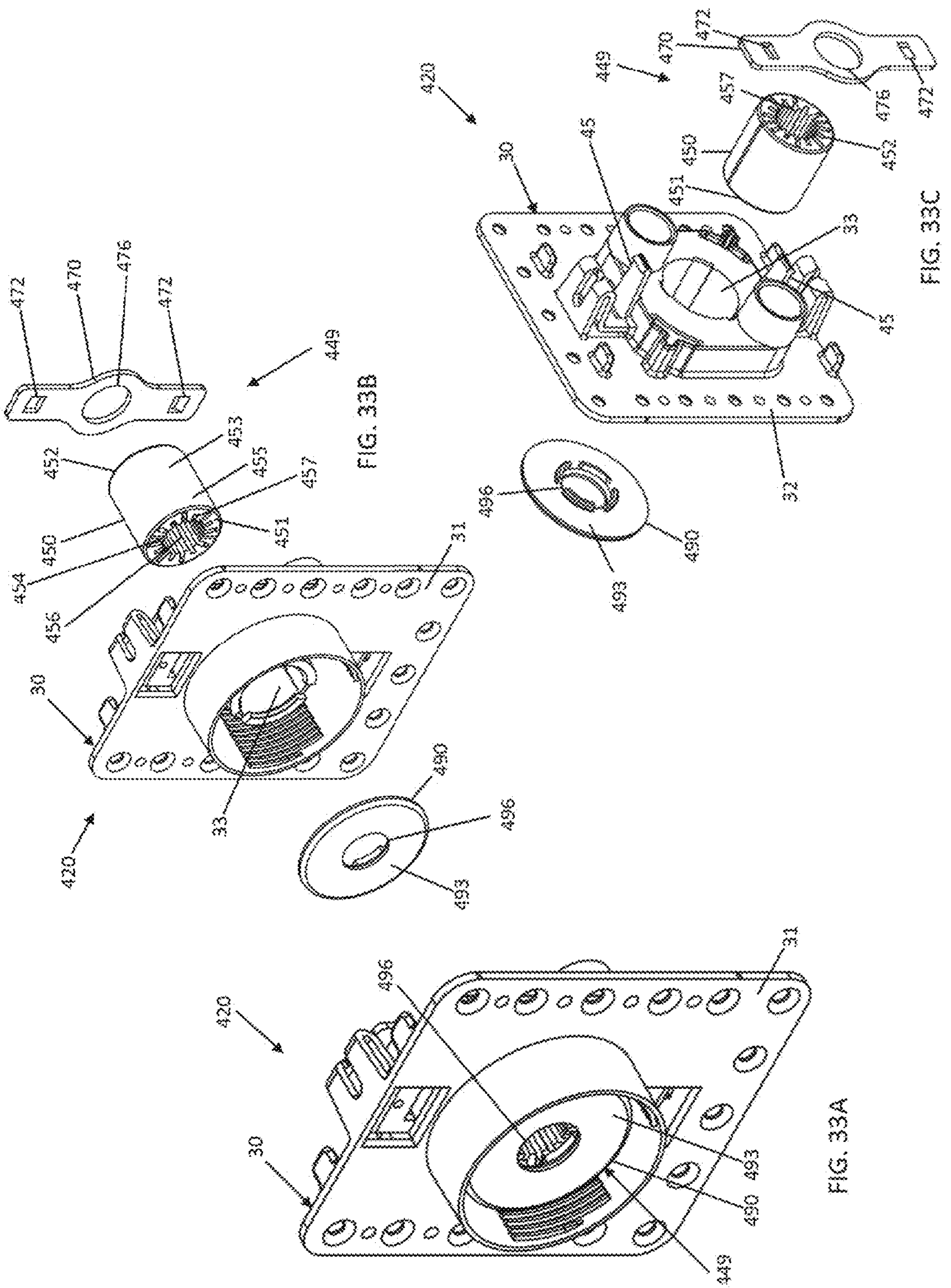
FIG. 33A is a front, perspective view of a portion of the outlet box assembly of FIG. 29A.
FIG. 33B is a front, exploded view the portion of the outlet box assembly of FIG. 33A.
FIG. 33C is a back, exploded view the portion of the outlet box assembly of FIG. 33A.

As shown in FIG. 33B, the elastomeric insert 450 includes a wall 453 with an inner surface 454 and an outer surface 455. The inner surface 454 of the elastomeric insert 450 defines a longitudinally-extending, internal insert passage or through-hole 456. The insert through-hole 456 is sized to receive a portion of the fitting 80 (or the tubing 12, according to various embodiments) to secure the fitting 80 (or the tubing 12) to the base 30. The inner diameter of the elastomeric insert 450 may optionally be approximately ½ inches.

The elastomeric insert 450 also includes a plurality of longitudinally-extending ribs 457 that extend along the length of the insert through-hole 456 and along the inner surface 454. The configuration (in particular the ribs 457) and material of the elastomeric insert 450 allows the elastomeric insert 450 to absorb vibrations and provide acoustic isolation to and from the fitting 80 (or the tubing 12).

Figure 34B:
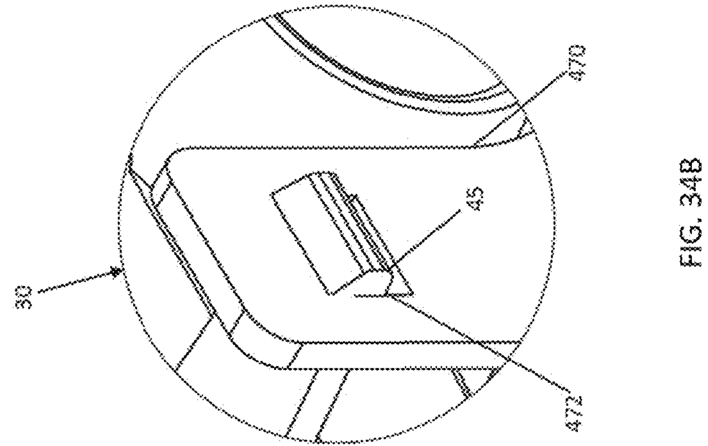
FIG. 34B is an enlarged view of a portion of FIG. 34A.
Figure 34A:
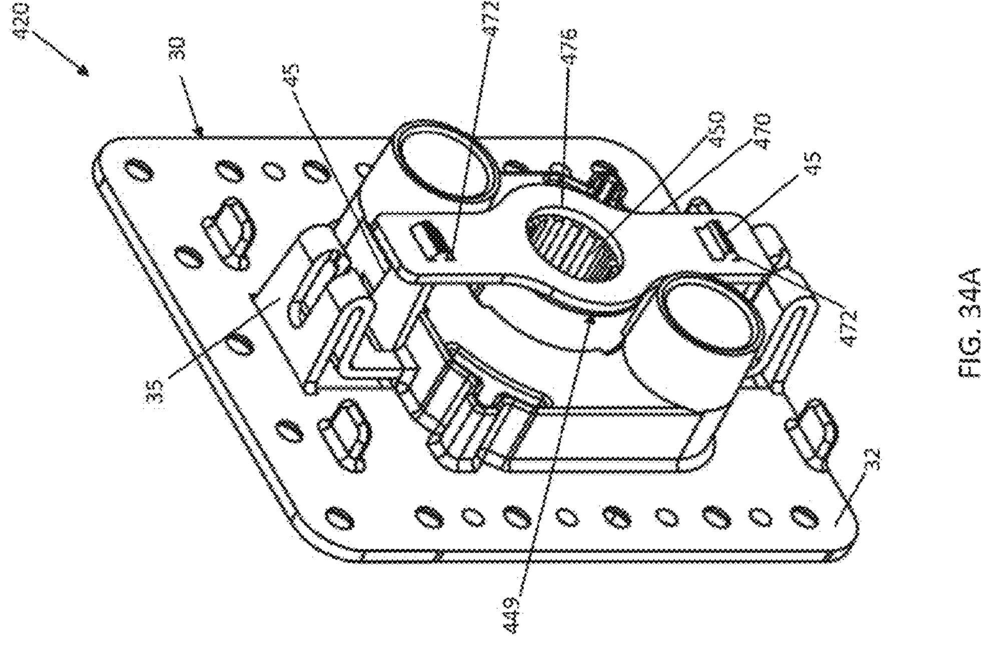
FIG. 34A is a back, perspective view the portion of the outlet box assembly of FIG. 34A.

As shown in FIGS. 32 and 34A-34B, the retainer 470 is configured to secure the elastomeric insert 450 to the base 30 and prevent axial movement of the elastomeric insert 450 relative to the base 30. Accordingly, the retainer 470 is configured to attach to the base 30 (along the second base side 32) and extend along the second end 452 of the elastomeric insert 450.

As shown in FIGS. 33B-34B, the retainer 470 defines a retainer through-hole 476 and at least one snap aperture or slot 472. As shown in FIG. 32, the retainer through-hole 476 is configured to align with the base through-hole 33 such that the fitting 80 (or the tubing 12) can extend through both the retainer through-hole 476 and the base through-hole 33 at the same time. According to various embodiments, to secure the elastomeric insert 450 within the base 30, the inner diameter of the retainer through-hole 476 may be smaller than the outer diameter of the elastomeric insert 450 (as shown in FIG. 32).

According to one embodiment, the retainer 470 defines a plurality of slots 472 (for example, two slots 472). The slots 472 are positioned along opposite sides of the retainer through-hole 476 (e.g., above and below) and are configured to attach the retainer 470 to the base 30. In particular, the base 30 comprises a corresponding number, size, configuration, and/or position of snap protrusions 45 that extend longitudinally from the second base side 32, optionally from the base wall 43 (in a direction away from the first base side 31). As shown in FIGS. 34A-34B, the slots 472 are configured to receive respective end portions of snap protrusions 45 to attach the retainer 470 to the base 30. This secures the elastomeric insert 450 within the base 30, longitudinally between the stop wall 39 of the base 30 and the retainer 470.

As shown in FIGS. 33A-33C, the bezel 490 (which also can be referred to as a faceplate or coverplate) is positioned along the first base side 31 and is configured to snap or attach onto the first circumferential wall 41 of the base 30. The bezel 490 includes a radially-extending wall 493 that includes a bezel through-hole 496 defined therein. As shown in FIG. 32, the bezel through-hole 496 is configured to align with the base through-hole 33 and the retainer through-hole 476 such that the fitting 80 (or the tubing 12) can extend through the bezel through-hole 496, the retainer through-hole 376, and the base through-hole 33 at the same time.

The radially-extending wall 493 extends radially between the retainer through-hole 376 (and the base through-hole 33) and the inner surface of the second circumferential wall 42 of the base 30. The outer diameter of the radially-extending wall 493 is smaller than the inner diameter of the second circumferential wall 42 of the base 30 such that either a portion of the protective cover 24 or a portion of the escutcheon 26 (depending on the current state of installation) can fit radially between the second circumferential wall 42 and the outer edge of the radially-extending wall 493. The distance between the outer edge of the radially-extending wall 493 and the inner edge of the second circumferential wall 42 may be approximately equal to a wall thickness of the escutcheon 26 such that the radially-extending wall 493 covers and closes off the opening within the escutcheon 26 (as shown in FIG. 32).

In one embodiment, the outlet box assembly 420 may include the fitting 80 (as described further herein). In the outlet box assembly 420, the fitting 80 is configured to be inserted into and through the elastomeric insert 450 and indirectly secured to the base 30 through the elastomeric insert 450, as shown in FIG. 32. The elastomeric insert 450 is configured to prevent any noise from traveling between the fitting 80 and the base 30.

As shown in FIGS. 31B-32 and 35A-35C, the outlet box assembly 420 also includes at least one support structure 140 (as described further herein) that is an acoustic support structure. In particular, the support structure 140 includes the T-shaped support 447 (e.g., a T-shaped support leg or extension), instead of the cylindrical support 148. For example, a plurality of support structures 140, such as two support structures 140 (that are the T-shaped supports 447). Although the outlet box assembly 420 includes the T-shaped supports 447 and other embodiments disclosed herein include the cylindrical support 148, any of the embodiments may include the T-shaped supports 447 and/or the cylindrical supports 148.

The T-shaped support 447 is a longitudinally-extending leg or extension that is configured to extend between the base 30 and the back wall 13, as shown in FIG. 32. The T-shaped support 447 has a substantially T-shaped cross-section. For example, as shown in FIGS. 29A-29C and 35A-35B, the T-shaped support 447 includes a first wall and a second wall, where the second wall extends substantially perpendicularly from a center portion of the first wall, along and from one side of the first wall.

The T-shaped support 447 defines at least one built-in notch 445 along the length of the T-shaped support 447. The notch 445 extends substantially perpendicularly to the longitudinal length of the rest of the T-shaped support 447 and extends about at least a portion of (or the entirety of) the perimeter of the T-shaped support 447. The notch 445 is an area of the T-shaped support 447 that has a smaller thickness and therefore defines an area where the T-shaped support 447 is frangible and can be easily cut or broken to size to shorten the length of the T-shaped support 447. Optionally, as shown in FIG. 32, the notch 445 may be two notches or recesses with a bump in between.

Due to the notches 445, the length of the T-shaped support 447 may be easily adjusted on site by the user in accordance with the particular dimensions of the entire structure (e.g., how far the back wall 13 is from the front wall 11). The notches 445 may be positioned in accordance with a variety of common plumbing wall dimensions.

As shown in FIG. 32, the second end 142 of the T-shaped support 447 is a substantially flat base and includes an acoustic damper, isolator, or liner 446 (which may be a 270 isolator). The acoustic liner 446 is an elastomeric component that is configured to absorb vibrations to prevent noise or vibration from being transferred or transmitted between and provide acoustic isolation between the outlet box assembly 420 and the back wall 13. The material of the acoustic liner 446 is sufficiently soft to absorb vibrations. The acoustic liner 446 is configured to directly abut the front side of the back wall 13 (i.e., the side of the back wall 13 that is facing the front wall 11).

Figures 36A, 36B:
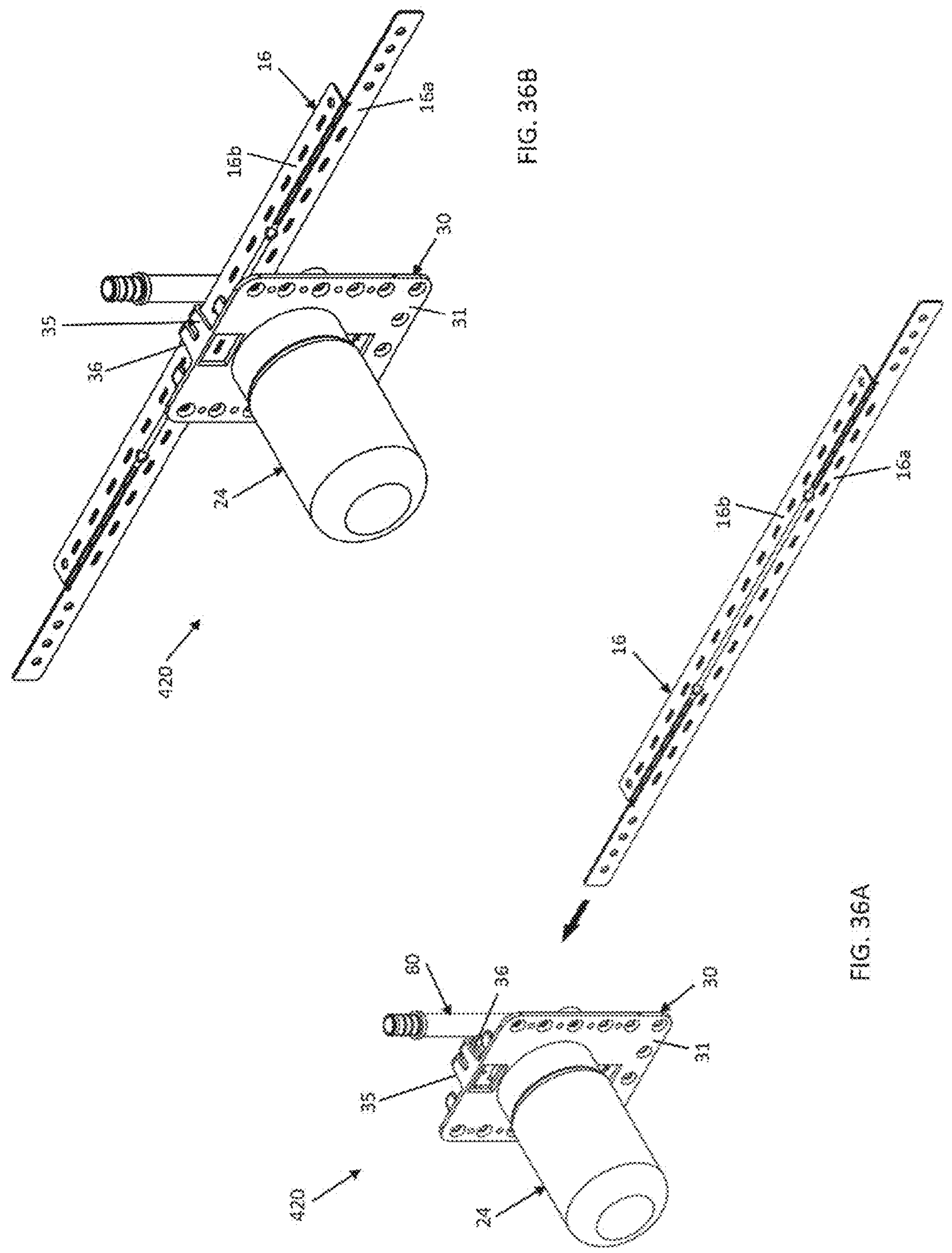
FIGS. 36A-36B are perspective views of the bracket being attached to the outlet box assembly of FIG. 29A.

FIGS. 36A-42B show the outlet box assembly 420 being assembled and attached to the wall 11. As shown in FIGS. 36A-36B, the bracket 16 is attached to the base 30 by sliding the bracket 16 into the L-shaped slot 36 of the bracket support 35 of the base 30 (and positioned along the first base side 31). The base 30 is positioned along a center portion of the bracket 16. As shown in FIGS. 37A-37B, the two opposite ends of the bracket 16 are subsequently attached to two studs 15, thereby positioning the base 30 in between the two studs 15. As shown in FIGS. 38A-38B, the support structure 140 (in particular the T-shaped support 447) is attached to the base 30 by inserting the first end 141 of the support structure 140 into the support receptacle 46 (in particular the T-shaped hole 47, as shown in FIG. 35C).

Figures 40A, 40B:
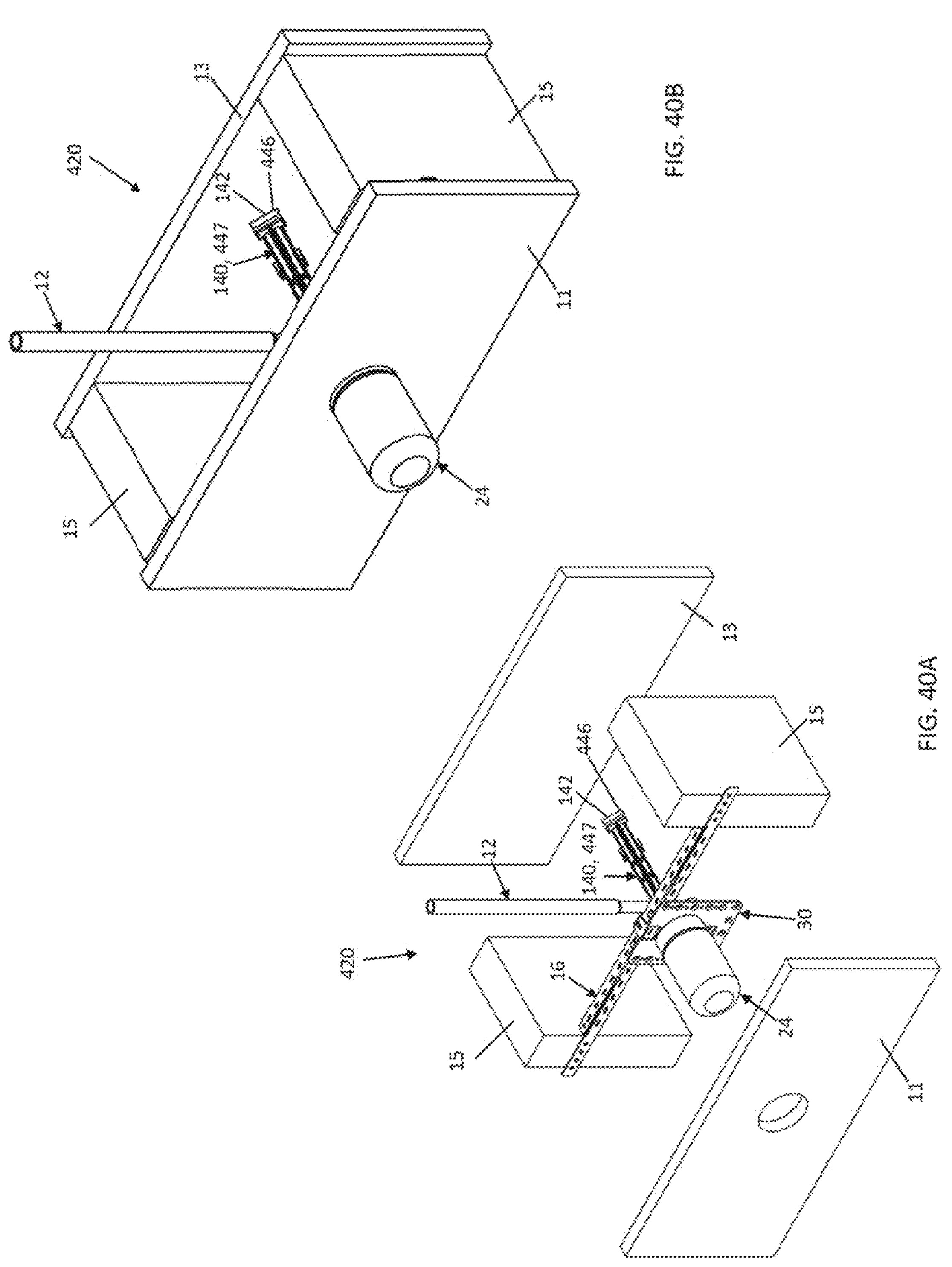
FIGS. 40A-40B are perspective views of the walls being attached to the studs around the outlet box assembly of FIG. 29A.

As shown in FIGS. 39A-39B, the tubing 12 is attached to the second end 82 of the fitting 80. In particular, the second end 82 of the fitting 80 is inserted into the tubing 12. As shown in FIGS. 40A-40B, the walls 11 and 13 are each attached to the studs 15 (along opposite sides), thereby positioning the base 30 between the walls 11 and 13. The wall 11 includes a through-hole that at least a portion of the outlet box assembly 420 is inserted into and through. The second end 142 of the support structure 140 abuts the inner surface of the back wall 13. As shown in FIG. 41, the protective cover 24 is removed from the base 30 (and the rest of the outlet box assembly 420), thereby exposing the stop valve 98 that was positioned within the protective cover 24. As shown in FIGS. 42A-42B, the escutcheon 26 replaces the previously-removed protective cover 24 and is attached to the base 30 (and the rest of the outlet box assembly 420) to finalize the attachment of the outlet box assembly 420 to the walls 11 and 13.

Figure 43:
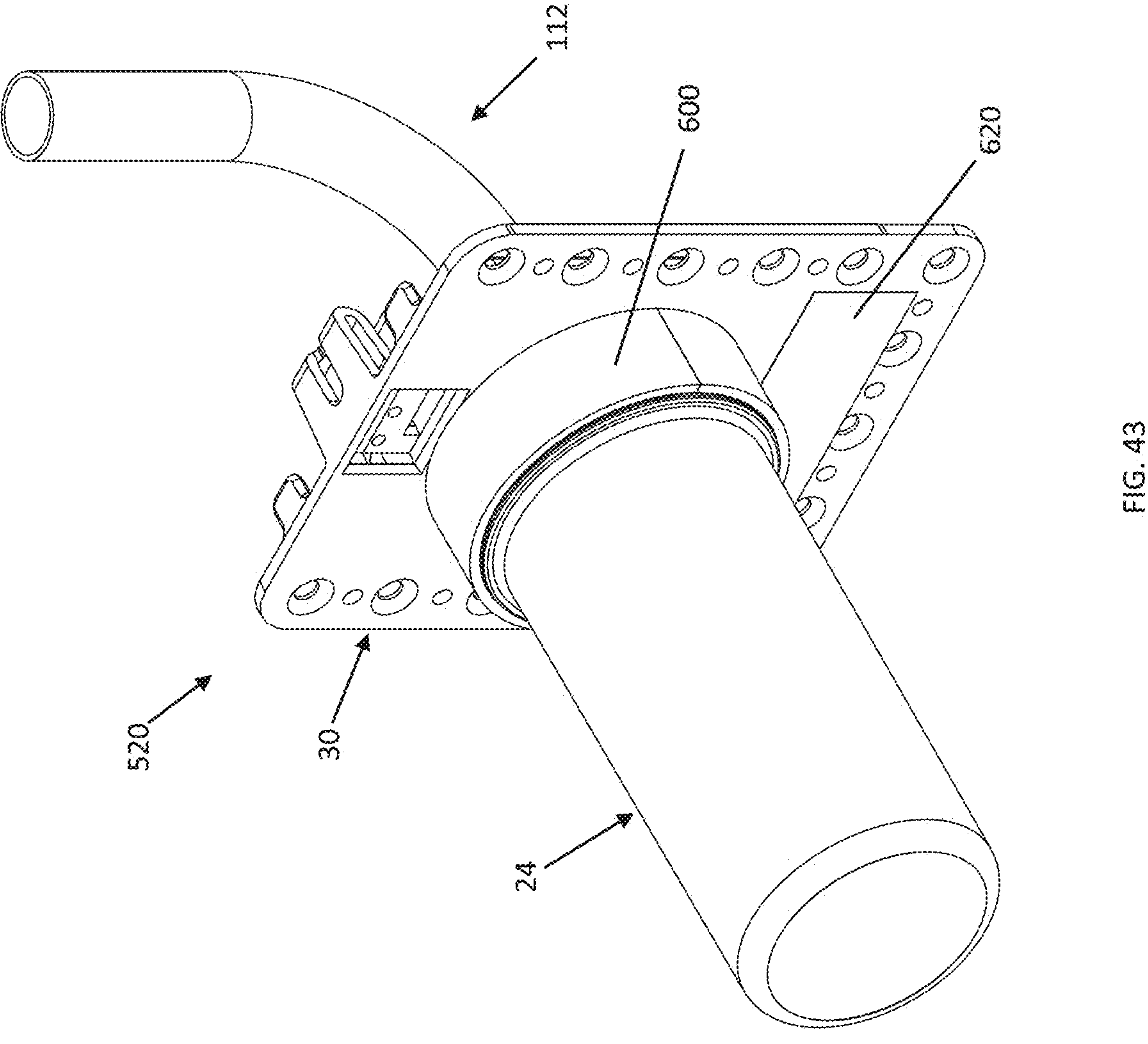
FIG. 43 is a front, top perspective view of a portion of an outlet box assembly with a protective cover attached according to one embodiment.

FIG. 43 shows another embodiment of an outlet box assembly 520. The outlet box assembly 520 includes all of the various features, aspects, and components of the outlet box assemblies 20, 220, 320, and 420 (as described further herein), unless noted otherwise in the description herein. For example, the outlet box assembly 420 also includes at least the protective cover 24, the stop valve 98, the circlip assembly 90 that includes the rounded ring or ferrule 194 and the compression connector or nut 92, the base 30, and the adapter 70, each of which are described further herein. The outlet box assembly 520 may also include other components, including but not limited to at least one of the support structures 140 and the curved tubing 112 which is configured to be received in the adapter 70. The curved tubing 112 includes all the various features, aspects, and components of the tubing 12, unless noted otherwise in the description herein.

The outlet box assemblies 20, 220, 320, 420 and 520 (as described further herein) may also be designed to maintain a fire-rating of a construction to meet building codes that require firestopping of penetrations in fire resistant rated walls. The outlet box assemblies 20, 220, 320, 420 and 520 may create penetration within fire rated walls that need to be fire stopped to maintain the fire ratings of the fire walls. In certain examples, the outlet box assemblies 20, 220, 320, 420 and 520 may be made of flammable materials to maintain the required fire ratings. In other examples, the outlet box assemblies 20, 220, 320, 420 and 520 may include intumescent pads to prohibit the passage of flame or hot gasses.

ASTM E814 "Standard Test Method for Fire Tests of Through-Penetration Fire Stops" defines a method for testing firestopping or fire rated components to ensure that they will restore a rating of a wall construction, whether the fire-rated wall assembly breach is caused by a through penetration or a membrane penetration. It is known that a F rating of a fire rated component indicates the duration for which the fire rated component will prevent the passage of smoke and flame. However, the F rating does not include limiting the rise of temperature on an un-exposed side. While the temperature component is part of the F Rating for a floor or wall, it has been separated from the F Ratings for through penetrations. The ability of a fire rated system to prevent the temperature from rising on the un-exposed side of the assembly is recorded as the T/FT Rating. However, in ASTM E814 testing, T Ratings are not required.

Figure 44:
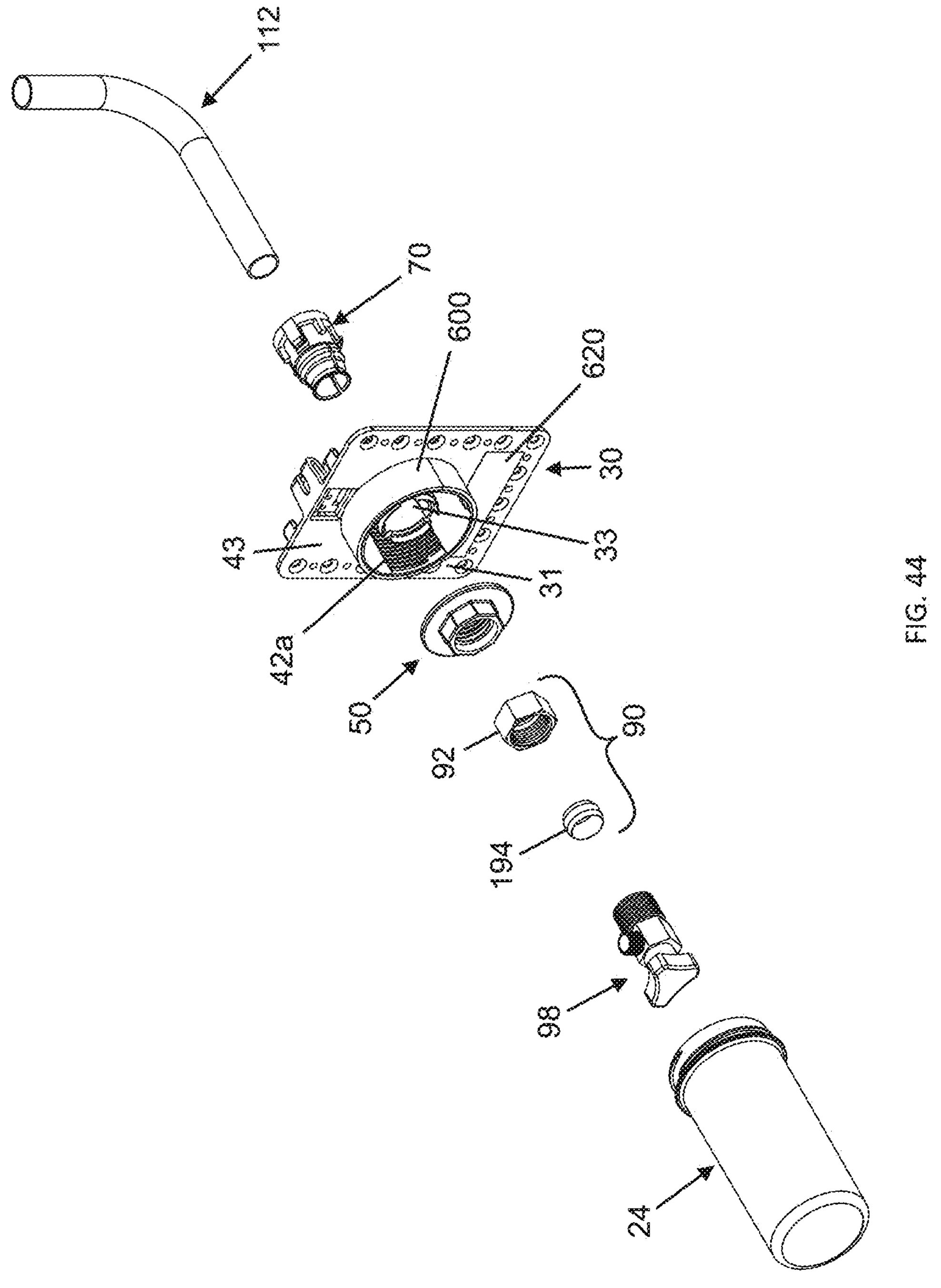
FIG. 44 is an exploded view of the outlet box assembly of FIG. 43.
Figure 45:
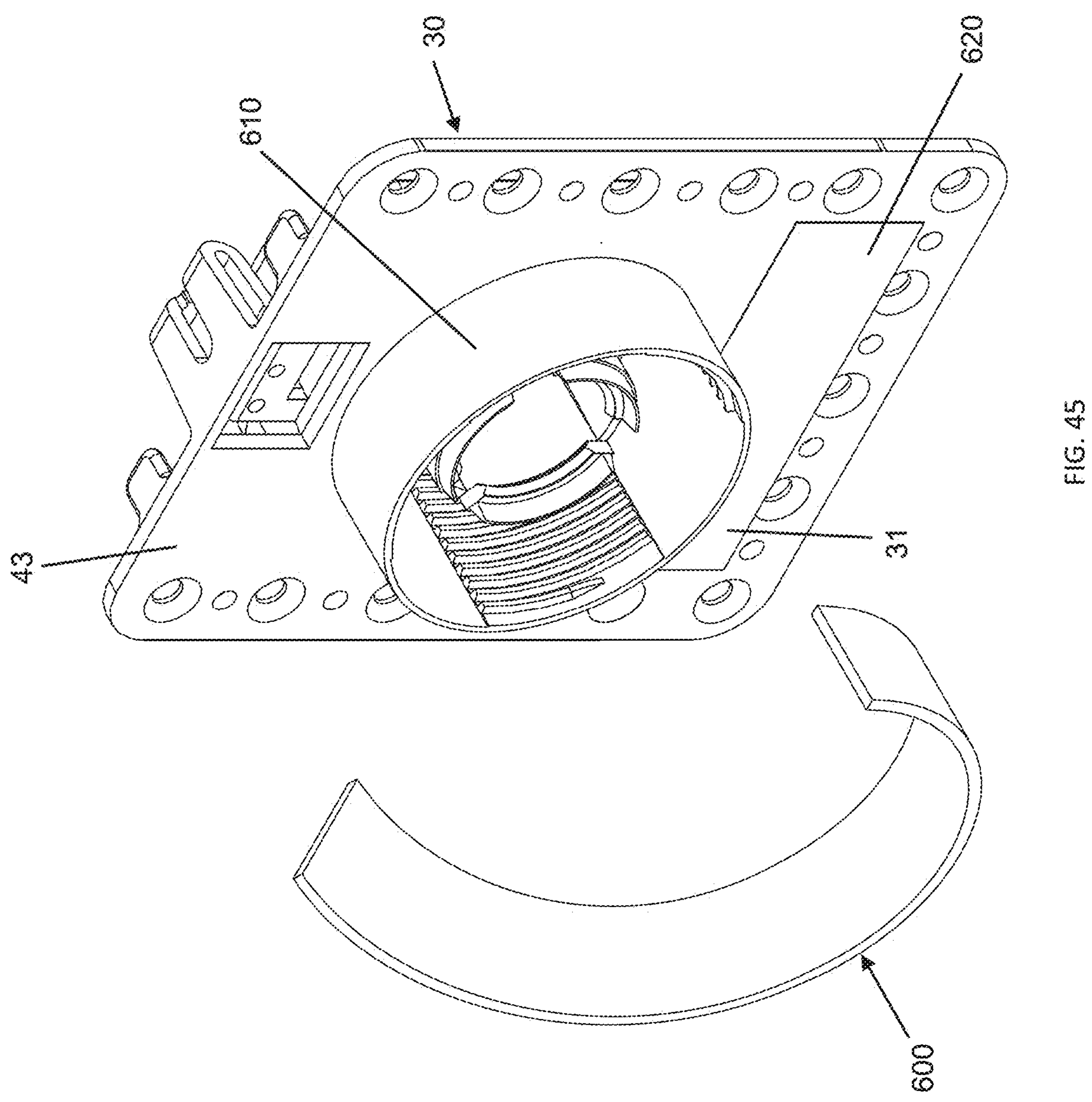
FIG. 45 is a perspective view showing an intumescent material exploded from the outlet box assembly of FIG. 43.

Referring to FIGS. 44-45, the outlet box assembly 520 includes an intumescent material 600 disposed on an outer surface 610 of the second circumferential wall 42 of the base 30 to maintain fire ratings and to prevent fire and smoke from spreading. That is, the intumescent material 600 can be applied around the outer surface 610 of the second circumferential wall 42. In certain examples, the intumescent material 600 may include an adhesive backed fire wrap tape that may be adhesively adhered to the outer surface 610, although alternatives are possible. In certain examples, the intumescent material can be pre-incorporated (e.g., secured, attached, carried) with the base 30 of the outlet box assembly 520 prior to installation of the outlet box assembly 520. As such, the intumescent material may be carried with the base 30 of the outlet box assembly 520 when the outlet box assembly 520 is in use. In still other examples, the intumescent material 600 may be applied around a perimeter of an access opening prior to installing the outlet box assembly 520 to a wall to restore the fire-rating.

In certain examples, the intumescent material 600 may have a pre-shaped structure in the form of strips, a continuous intumescent ring, or an intumescent pad. The intumescent strips, continuous intumescent ring, or intumescent pad can include a protective liner that is removable to expose an adhesive backing which permits the intumescent material 600 to be secured to the outer surface 610 of the base 30. The protective liner can be made from a film material formed from polyethylene or the like. The intumescent strips, intumescent ring, and intumescent pad may be constructed in accordance with U.S. Patent Application No. 63/229,314. The disclosure in the aforementioned U.S. Patent Application No. 63/229,314 is hereby incorporated herein in its entirety by this reference thereto. However, it should be understood that the intumescent material 600 may have a construction which is different than the construction of the intumescent described in U.S. Patent Application No. 63/229,314.

It will be appreciated that the intumescent material 600 may be cut-to-length based on varying diameters of the base 30 of the outlet box assembly 520 for a given access opening. For example, if using intumescent strips, the number of strips that may be adhered to the second circumferential wall 42 of the base 30 may vary with the different outer diameter OD sizes of the base 30. That is, each intumescent strip can be cut at a desired length and width to correspond with the base's diameter for an access opening in a wall.

The outer surface 610 of the second circumferential wall 42 faces, and optionally directly abuts, the through-hole extending through a wall when the outlet box assembly 520 is mounted to the wall. The intumescent material 600 can fill the gap between the wall and the outlet box assembly 520 to ensure a complete seal when the outlet box assembly 520 is completely assembled and attached to the wall. The intumescent material 600 is designed to expand to fill in holes when heated by a fire to close off penetration made by outlet box assemblies. As such, when the intumescent material 600 becomes hot, it will expand rapidly into the open areas around it. That is, when the temperature rises near a wall surface, the intumescent material 600 will heat up and char when exposed to flames. When the intumescent material 600 becomes hot enough, it will quickly expand to multiple times its original volume. This expansion will help to create a barrier, or seal, substantially preventing fire, heat, and smoke from moving from one area of a building to another for at least some period of time. Having the intumescent material 600 disposed on the outer surface 610 of the second circumferential wall 42 adjacent the access opening in the wall improves the fire-stopping process as the intumescent expands when heated by a fire to fill in holes and close off penetration made by the outlet box assembly 520.

When intumescent material is not disposed adjacent to an access opening in a wall, there may be a risk of not effectively sealing gaps formed between the outlet boxes and the wall. For example, if intumescent material is placed on the front (within an outlet box assembly) or back faces of an outlet box assembly (outside the box and within the wall), fire and heat may pass through gaps between the outlet box assembly thereby increasing the chance of a fire burning through a wall by allowing fire and heat to enter a wall cavity. Thus, it is advantageous to have an intumescent material disposed adjacent to an access opening such that the intumescent material can expand to fill in holes when heated by a fire to close off penetration made by outlet box assemblies.

In certain examples, the base 30 may further include an intumescent label 620. The intumescent label 620 may be attached to the first base side 31 of the base 30 to identify the outlet box assembly 520 as a fire-stopping product.

As also shown in FIG. 43, an inner surface of the second circumferential wall 42 of the base 30 defines an internal, front cavity and includes at least one inner thread (preferably a plurality of threads), referred to herein as base threads 42*a*. The internal base threads 42*a* are positioned along the first base side 31 and within the front cavity and are configured to attach or mount to a various other components, such as at least one of the protective cover 24 or an escutcheon (not shown). Accordingly, the base 30 is configured to receive and interchangeably, removably, reattachably, and threadably attach to (via the base threads 42*a*) either the protective cover 24 or an escutcheon (as shown in FIG. 3B), depending on the stage of assembly to the base 30.

According to one embodiment, the outlet box assembly 520 may include two brackets 16 that are positioned above and below the base through-hole 33 (as described further herein). The base wall 43 may optionally be fastened to the inner surface of the wall 11 (i.e., the surface facing the back wall 13), to studs (e.g., wood or metal studs), and/or to the brackets 16 via at least one fastener extending through the base wall 43 and into the wall 11, studs, or brackets 16 (as shown in FIG. 2). Alternatively, as shown in FIG. 13, the outlet box assembly 520 may include one first bracket 16 (as described further herein) and one second bracket 17 that is a HYCO bar positioned above and below the base through-hole 33, respectively. The configuration of the first bracket 16 is shown in FIG. 17 and described further herein. As shown in FIG. 18, the second bracket 17 is a flat bar (without the L-shape).

Each of the various implementations disclosed herein may have any of the aspects, features, components, and configurations of the other implementations, except where noted otherwise. For example, each of the various features, components, and aspects of the outlet box assemblies 20, 120, 220, 320, 420, and 520 can be integrated into any of the other implementations of the outlet box assemblies 20, 120, 220, 320, 420, and 520.

As utilized herein, the term "approximately" and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary implementations, and that such variations are intended to be encompassed by the present disclosure.

It is important to note that the construction and arrangement of the various exemplary implementations are illustrative only. Although only a few implementations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative implementations. Other substitutions, modifications, changes and omissions may also be made in the design, operating conditions and arrangement of the various exemplary implementations without departing from the scope of the present invention.

What is claimed is:

1. An outlet box assembly comprising:

a base having a bracket support configured to receive a support bracket for mounting the outlet box assembly to a wall, the base having a first circumferential wall defining a base through-hole, and a second circumferential wall radially surrounding the first circumferential wall; and an elastomeric insert configured to be at least partially positioned within the base through-hole, the elastomeric insert defining an insert through-hole, the insert through-hole including a plurality of longitudinally-extending ribs that extend along a length of the insert through-hole;

wherein the insert through-hole is sized to receive a portion of one of a tubing or a fitting to secure the one of the tubing or the fitting to the base;

wherein the elastomeric insert is configured to absorb vibrations and provide acoustic isolation to and from the one of the tubing or the fitting; and wherein the base comprises internal base threads along the second circumferential wall configured to attach to at least one of a protective cover or an escutcheon.

2. The outlet box assembly of claim 1, further comprising a retainer configured to attach to the base along an end of the elastomeric insert, wherein a retainer through-hole is aligned with the base through-hole.

3. The outlet box assembly of claim 1, wherein the fitting is configured to be inserted into and through the elastomeric insert and indirectly secured to the base through the elastomeric insert.

4. The outlet box assembly of claim 1, wherein a portion of the fitting positioned within the elastomeric insert has a constant outer diameter.

5. The outlet box assembly of claim 1, further comprising a circlip configured to be positioned within a divot along an outer circumference of the fitting, wherein the circlip is configured to be compressed between the divot and a compression nut, wherein the compression nut is configured to attach the fitting to a stop valve.

6. The outlet box assembly of claim 1, wherein the bracket support defines an L-shaped cross-section that corresponds with an L-shaped cross-section of the support bracket.

7. The outlet box assembly of claim 1, further comprising a retainer configured to be attached to the base, wherein when attached, the retainer is positioned at least partially outside of the base through-hole.

8. The outlet box assembly of claim 7, wherein, when attached to the base, the retainer secures the elastomeric insert to the base to prevent axial movement of the elastomeric insert relative to the base.

9. The outlet box assembly of claim 7, wherein the retainer defines a retainer through-hole that aligns with the base through-hole such that the fitting extends through both the retainer through-hole and the base through-hole.

10. The outlet box assembly of claim 9, wherein the retainer defines two slots respectively positioned on opposite sides of the retainer through-hole to attach the retainer to the base.

11. The outlet box assembly of claim 1, further comprising a support structure having a longitudinally extending leg between the base and the wall.

12. The outlet box assembly of claim 11, wherein the support structure has a substantially T-shaped cross-section.

13. The outlet box assembly of claim 11, wherein the support structure defines at least one built-in notch along a length of the support structure that defines a frangible area.

14. The outlet box assembly of claim 11, wherein the support structure has a flat base that includes an acoustic liner to absorb vibrations between the outlet box assembly and the wall.

15. The outlet box assembly of claim 11, wherein the base comprises at least one support receptacle configured to receive a first end of the support structure.

16. An outlet box assembly comprising:

a base having a bracket support configured to receive a support bracket for mounting the outlet box assembly to a wall, the base having a first circumferential wall defining a base through-hole, and a second circumferential wall radially surrounding the first circumferential wall; and an elastomeric insert configured to be at least partially positioned within the base through-hole, the elastomeric insert defining an insert through-hole, the insert through-hole including a plurality of longitudinally-extending ribs that extend along a length of the insert through-hole;

wherein the insert through-hole is sized to receive a portion of one of a tubing or a fitting to secure the one of the tubing or the fitting to the base;

wherein the elastomeric insert is configured to absorb vibrations and provide acoustic isolation to and from the one of the tubing or the fitting; and wherein the outlet box assembly comprises a circlip configured to be positioned within a divot along an outer circumference of the fitting, wherein the circlip is configured to be compressed between the divot and a compression nut, wherein the compression nut is configured to attach the fitting to a stop valve.

* * * * *